(12) United States Patent
Bricaud et al.

(10) Patent No.: US 6,869,302 B2
(45) Date of Patent: Mar. 22, 2005

(54) SMART CARD CONNECTOR WITH LOCKING SWITCH

(75) Inventors: Herve'Guy Bricaud, Dole (FR); Yves Pizard, Dole (FR)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 389 days.

(21) Appl. No.: 10/054,432

(22) Filed: Jan. 22, 2002

(65) Prior Publication Data
US 2004/0161965 A1 Aug. 19, 2004

Related U.S. Application Data

(63) Continuation-in-part of application No. PCT/EP00/06949, filed on Jul. 20, 2000.

(30) Foreign Application Priority Data

Jul. 23, 1999 (FR) .............................. 99 09598

(51) Int. Cl.[7] .............................................. H01R 13/62
(52) U.S. Cl. ...................................... 439/326; 439/331
(58) Field of Search .............................. 439/326, 630, 439/331; 235/486

(56) References Cited

U.S. PATENT DOCUMENTS

| | | | | |
|---|---|---|---|---|
| 5,320,552 A | | 6/1994 | Reichardt et al. | |
| 5,603,629 A | * | 2/1997 | DeFrasne et al. | ............ 439/331 |
| 5,813,878 A | * | 9/1998 | Kuwata et al. | .............. 439/326 |
| 5,911,587 A | | 6/1999 | Vermeersch | |
| 5,961,338 A | * | 10/1999 | Wu et al. | ..................... 439/326 |
| 5,984,707 A | * | 11/1999 | Kuwata | ........................ 439/326 |
| 5,996,891 A | * | 12/1999 | Braun | .......................... 235/441 |
| 6,024,593 A | * | 2/2000 | Hyland | ......................... 439/326 |
| 6,062,889 A | * | 5/2000 | Hyland et al. | ............... 439/326 |
| 6,095,868 A | * | 8/2000 | Hyland et al. | ............... 439/630 |
| 6,099,337 A | * | 8/2000 | Chan | ........................... 439/326 |
| 6,106,317 A | * | 8/2000 | Michaelis et al. | ........... 439/326 |
| 6,149,466 A | * | 11/2000 | Bricaud et al. | .............. 439/630 |
| 6,174,188 B1 | * | 1/2001 | Martucci | ..................... 439/326 |
| 6,176,721 B1 | * | 1/2001 | Gottardo et al. | ............. 439/260 |
| 6,210,193 B1 | * | 4/2001 | Ito et al. | ...................... 439/326 |
| 6,220,882 B1 | * | 4/2001 | Simmel et al. | .............. 439/326 |
| 6,227,893 B1 | * | 5/2001 | Kaneko | ....................... 439/326 |
| 6,234,810 B1 | * | 5/2001 | Schnell et al. | .............. 439/76.1 |
| 6,241,545 B1 | * | 6/2001 | Bricaud et al. | .............. 439/326 |
| 6,273,739 B1 | * | 8/2001 | Konno et al. | ................ 439/331 |

(List continued on next page.)

FOREIGN PATENT DOCUMENTS

| | | |
|---|---|---|
| DE | 9407486 U1 | 10/1995 |
| EP | 0417616 A2 | 3/1991 |
| FR | 2763412 A1 | 11/1998 |
| WO | WO98/33138 | 7/1998 |

*Primary Examiner*—Ross Gushi
(74) *Attorney, Agent, or Firm*—Roger C. Turner

(57) ABSTRACT

A smart card connector (30) which includes a base (36) that can mount on a circuit board and a cover (76) that can hold a card (C) and that has a rear end pivotally connected to the base. The cover has a cover frame (77) and has a locking member (140) movable on the cover frame, so when the cover is closed on the base the locking member can be moved to lock the cover down against the base. A switch means mounted on the base and lying in the path of the locking member, detects movement of the locking member between its unlocked and locked positions, to operate circuitry that prevents reading a card until the cover is fully pivoted down and the locking member has moved to its locked position. One type of switch means includes a pair of switch blades (200, 202) lying at opposite sides of the base and engaging side portions (154, 156) of the locking member as the locking member becomes fully locked. Another type of switch means includes conductive traces on the circuit board that engage and disengage from the side portions of the locking member as the locking member moves between its locked and unlocked positions.

18 Claims, 74 Drawing Sheets

U.S. PATENT DOCUMENTS

| | | | |
|---|---|---|---|
| 6,319,036 B1 * | 11/2001 | Zheng et al. | 439/326 |
| 6,334,786 B1 * | 1/2002 | Lee | 439/331 |
| 6,358,074 B2 * | 3/2002 | Bricaud et al. | 439/188 |
| 6,383,027 B2 * | 5/2002 | Cabane et al. | 439/630 |
| 6,468,101 B2 * | 10/2002 | Suzuki | 439/326 |
| 6,471,550 B2 * | 10/2002 | Maiterth et al. | 439/631 |
| 6,485,319 B2 * | 11/2002 | Bricaud et al. | 439/188 |
| 6,547,138 B1 * | 4/2003 | Braun et al. | 235/441 |
| 6,663,408 B2 * | 12/2003 | Sato | 439/331 |
| 6,719,579 B2 * | 4/2004 | Tisserand et al. | 439/331 |
| 6,743,035 B1 * | 6/2004 | Yang | 439/326 |

* cited by examiner

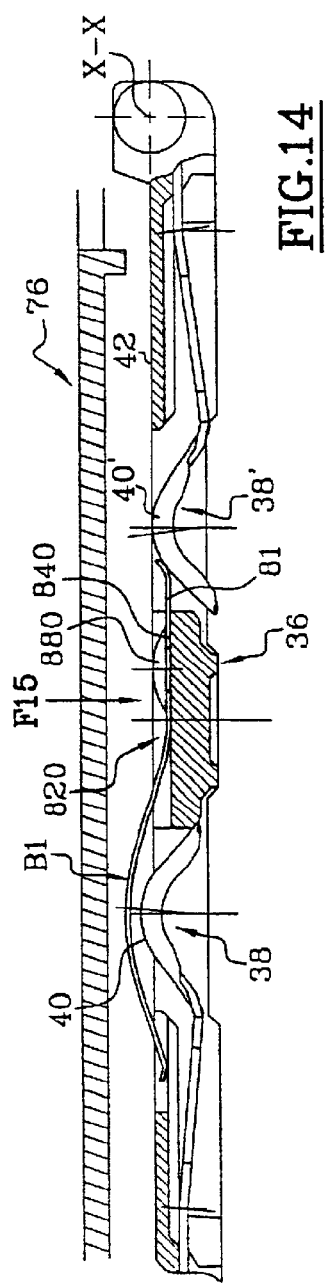
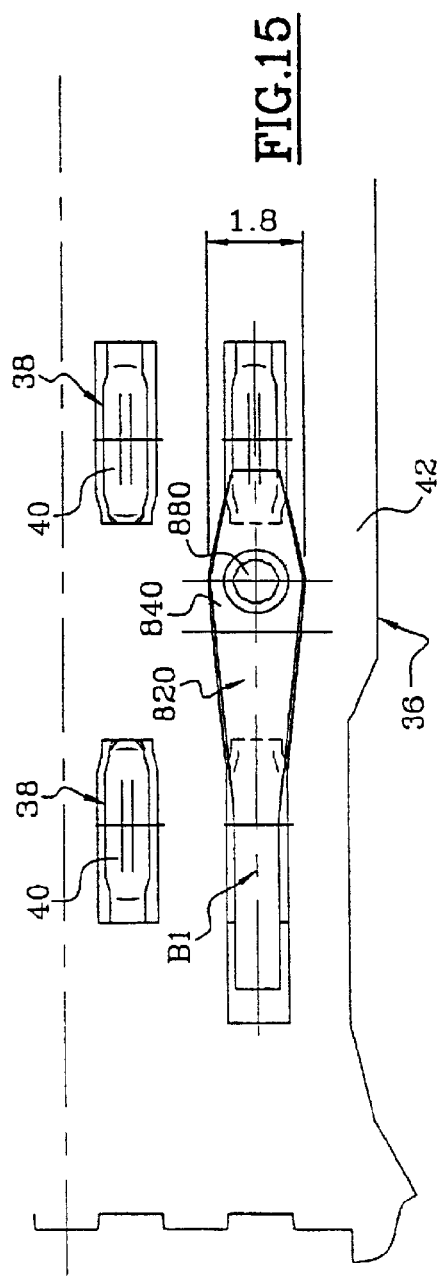
FIG.14
FIG.15

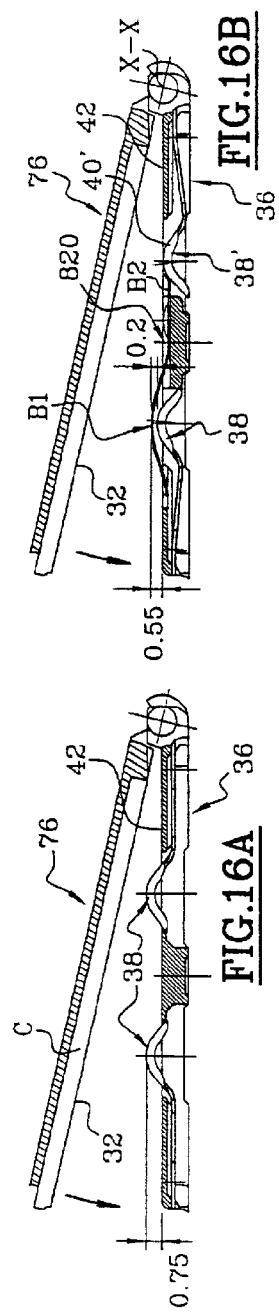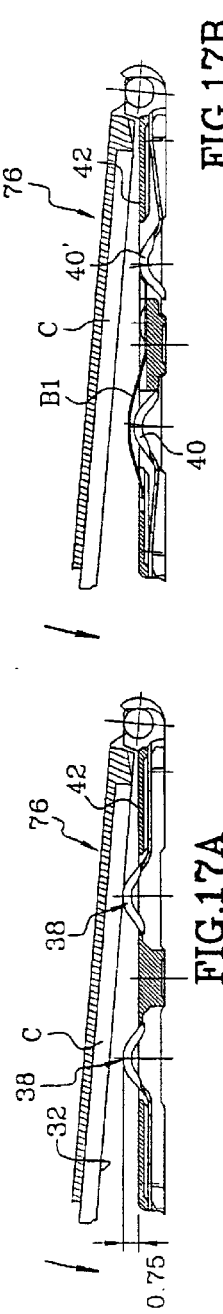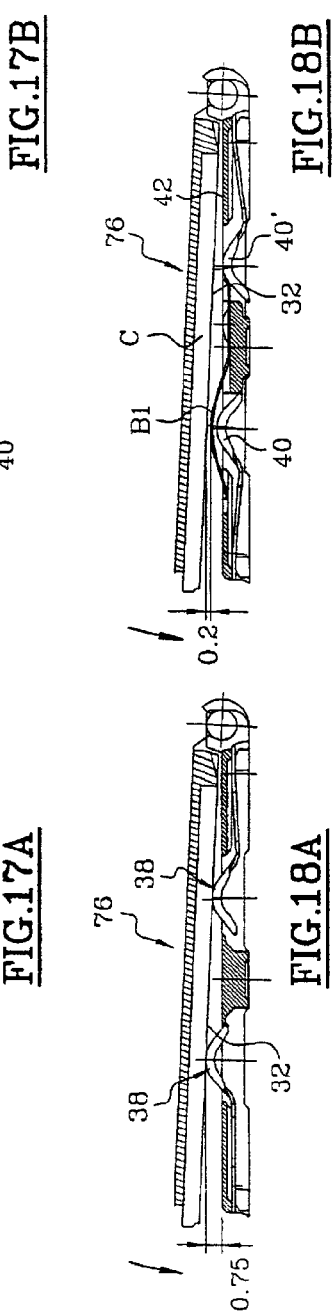

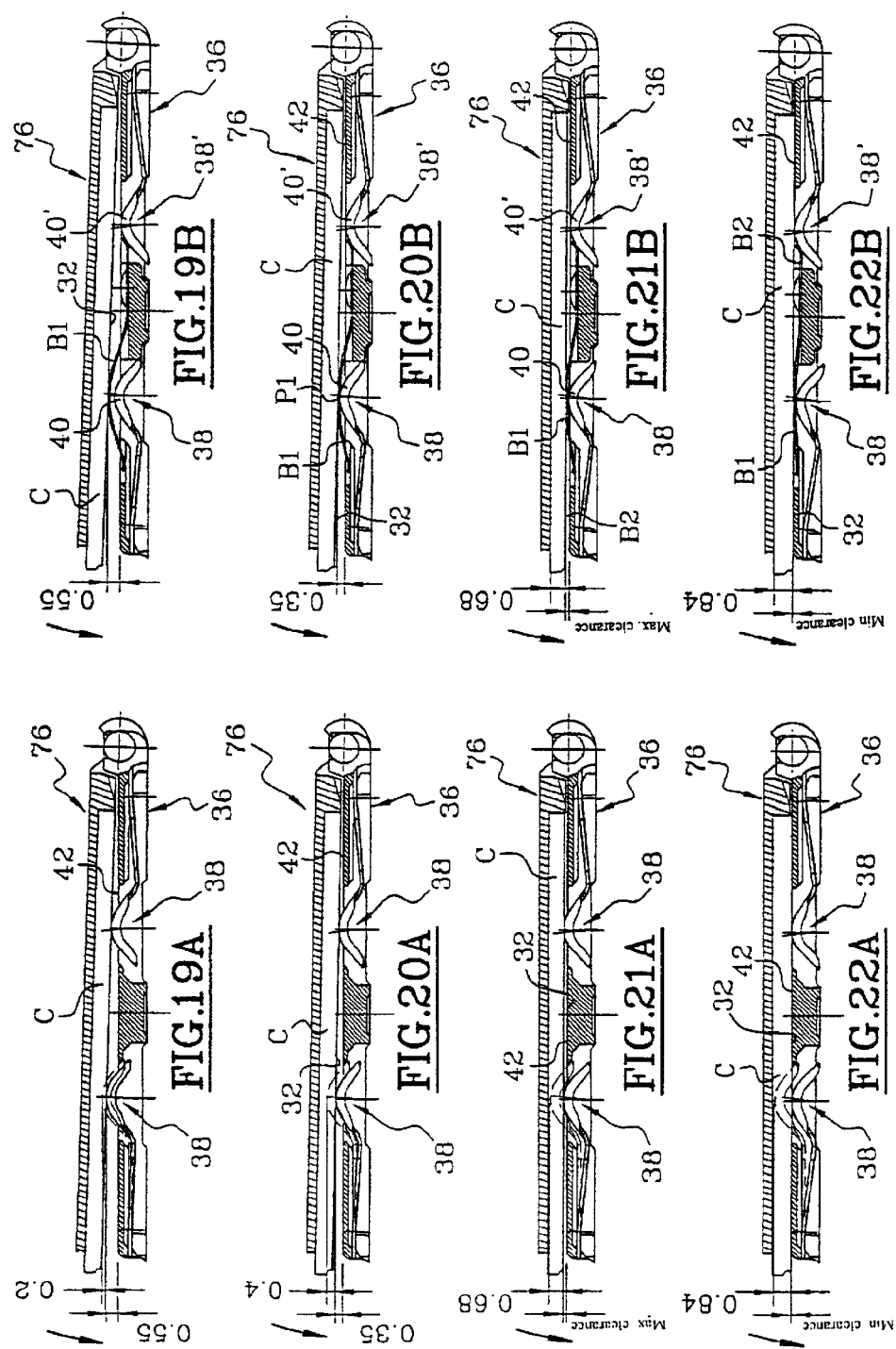

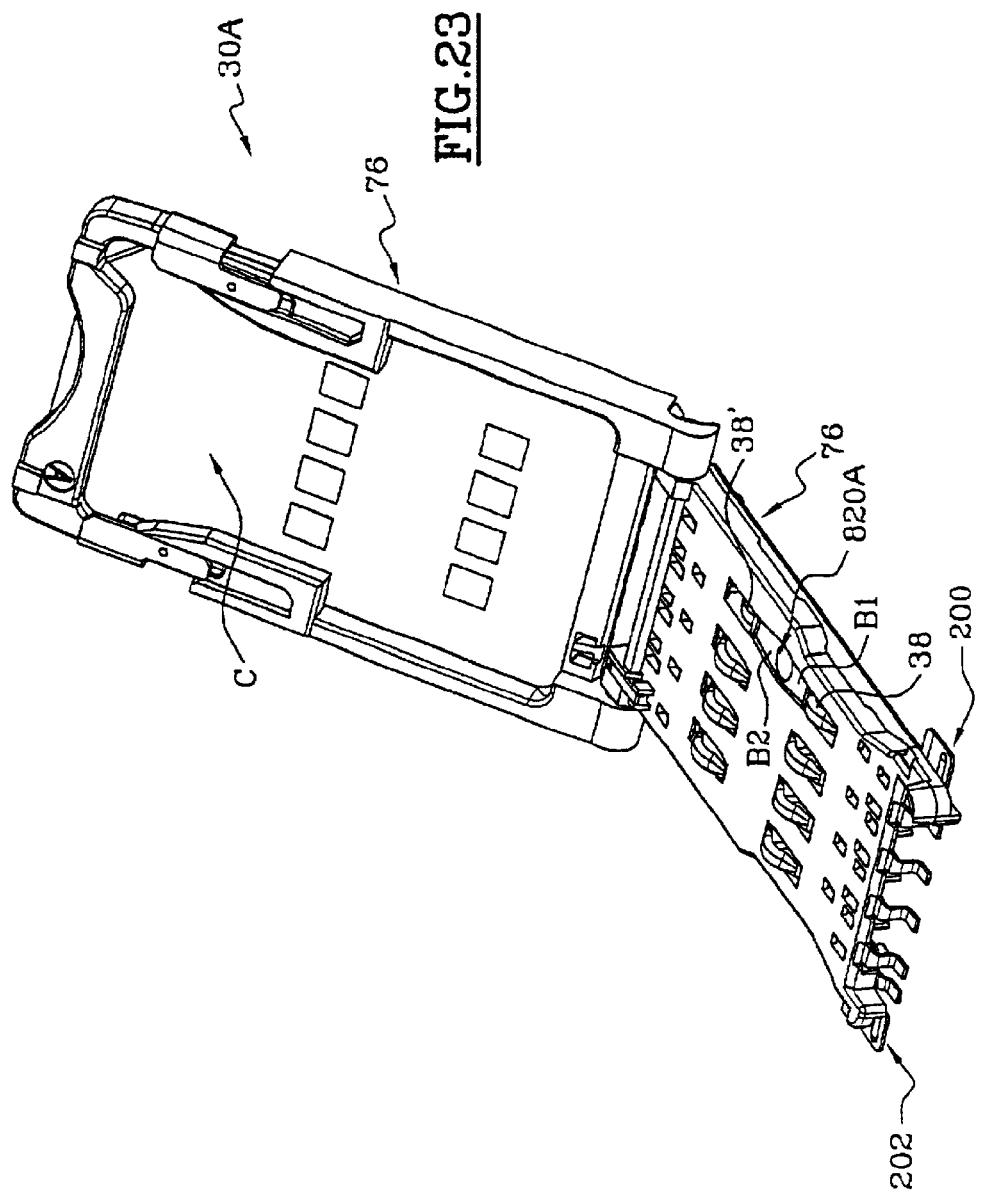

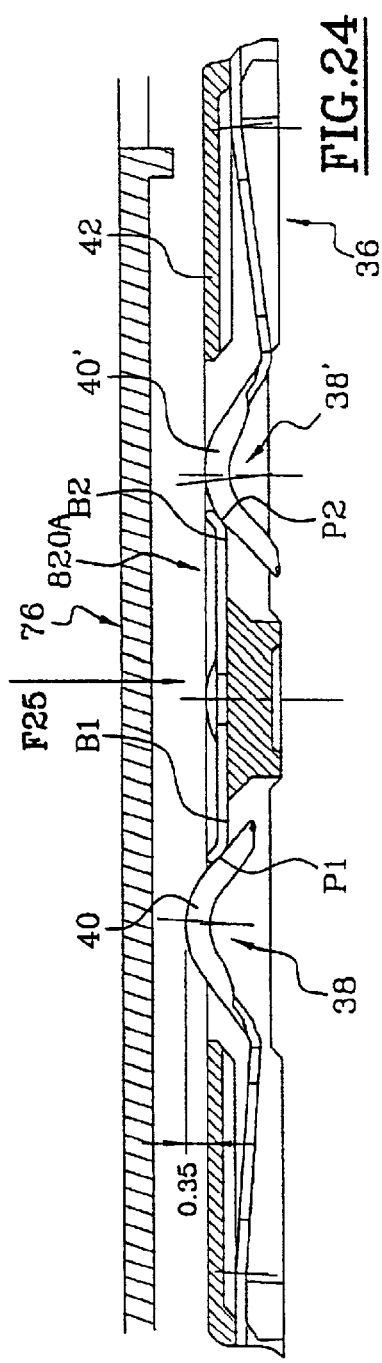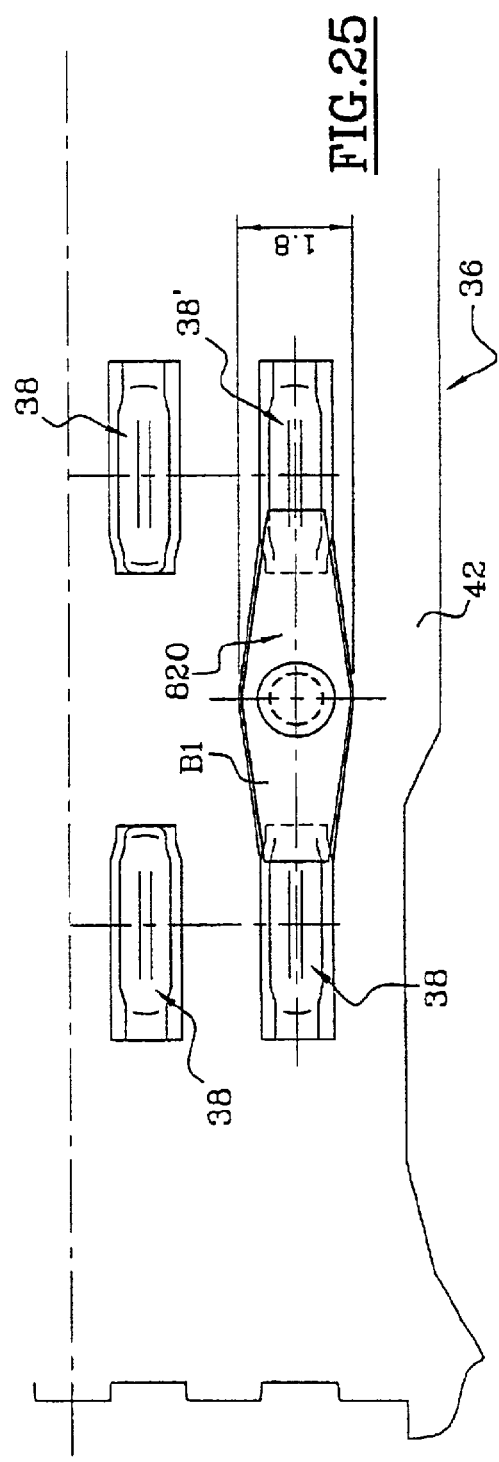

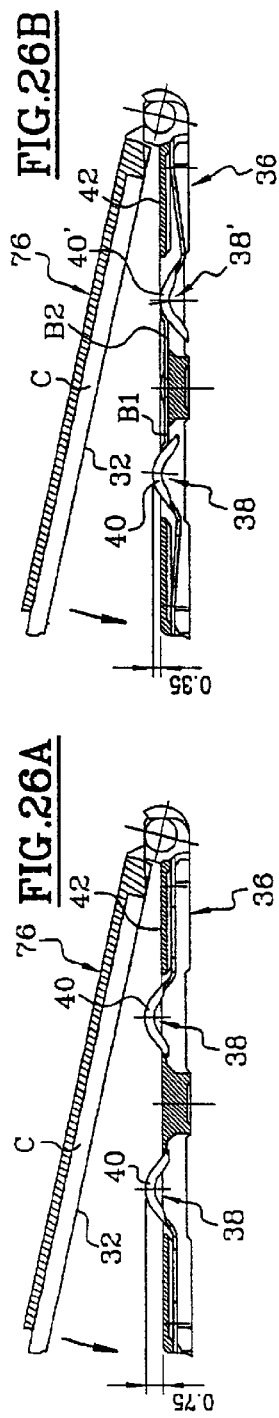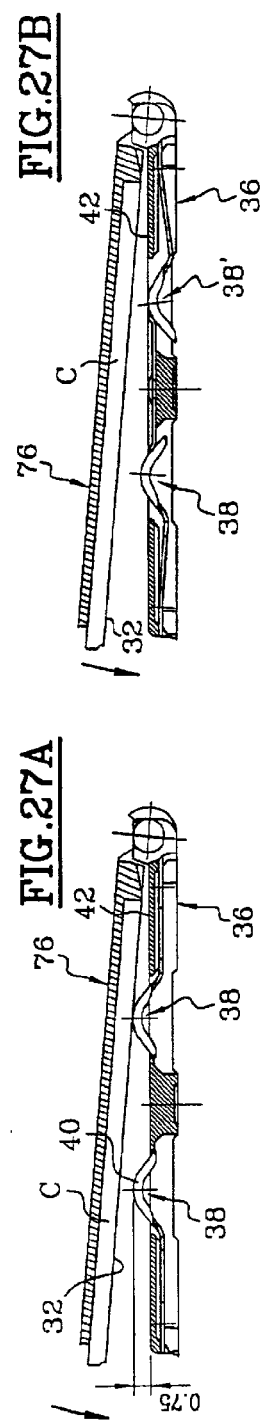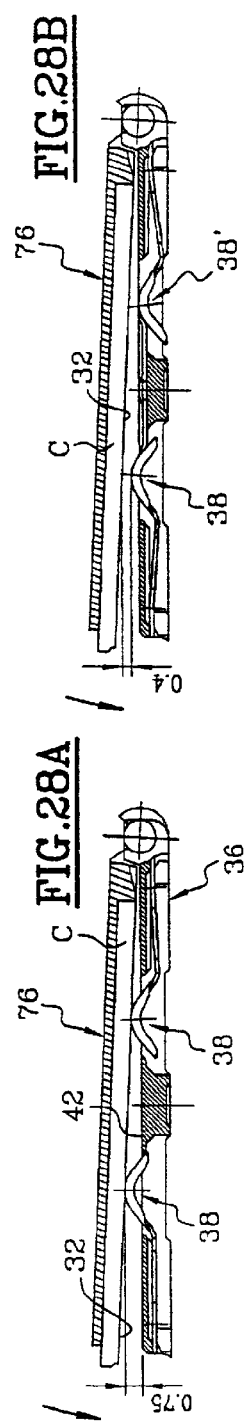

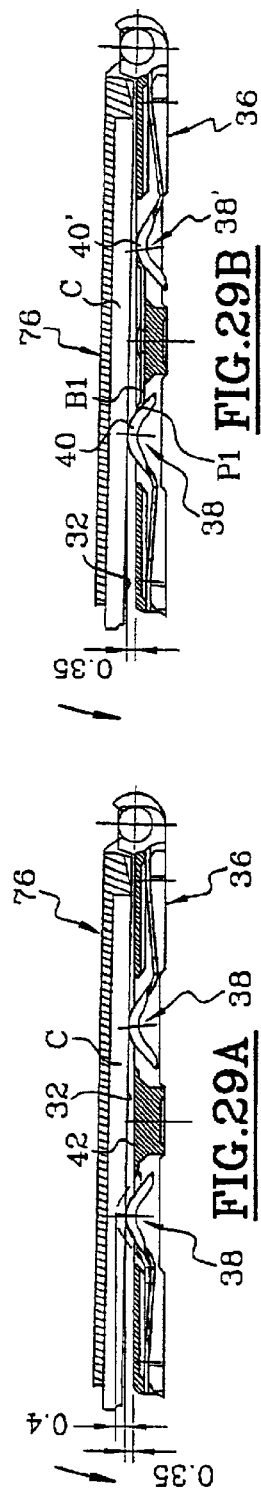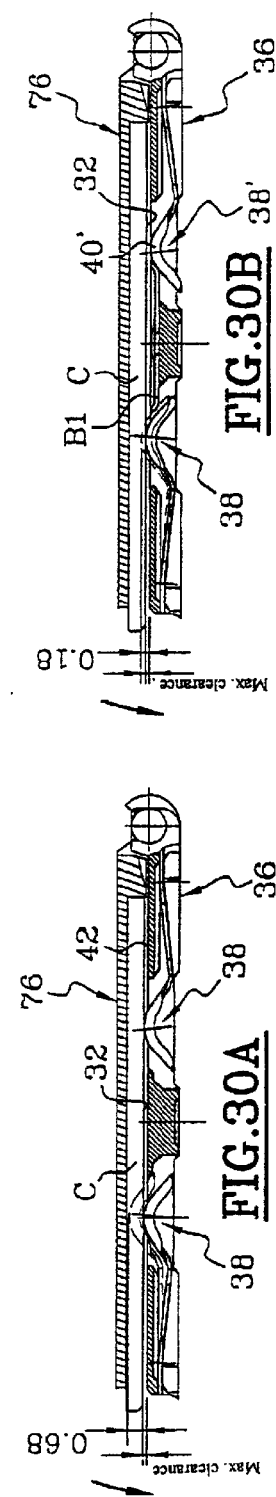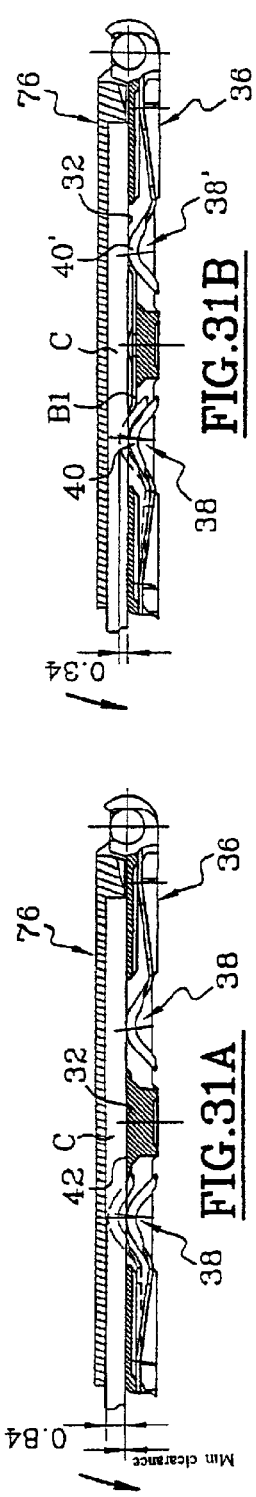

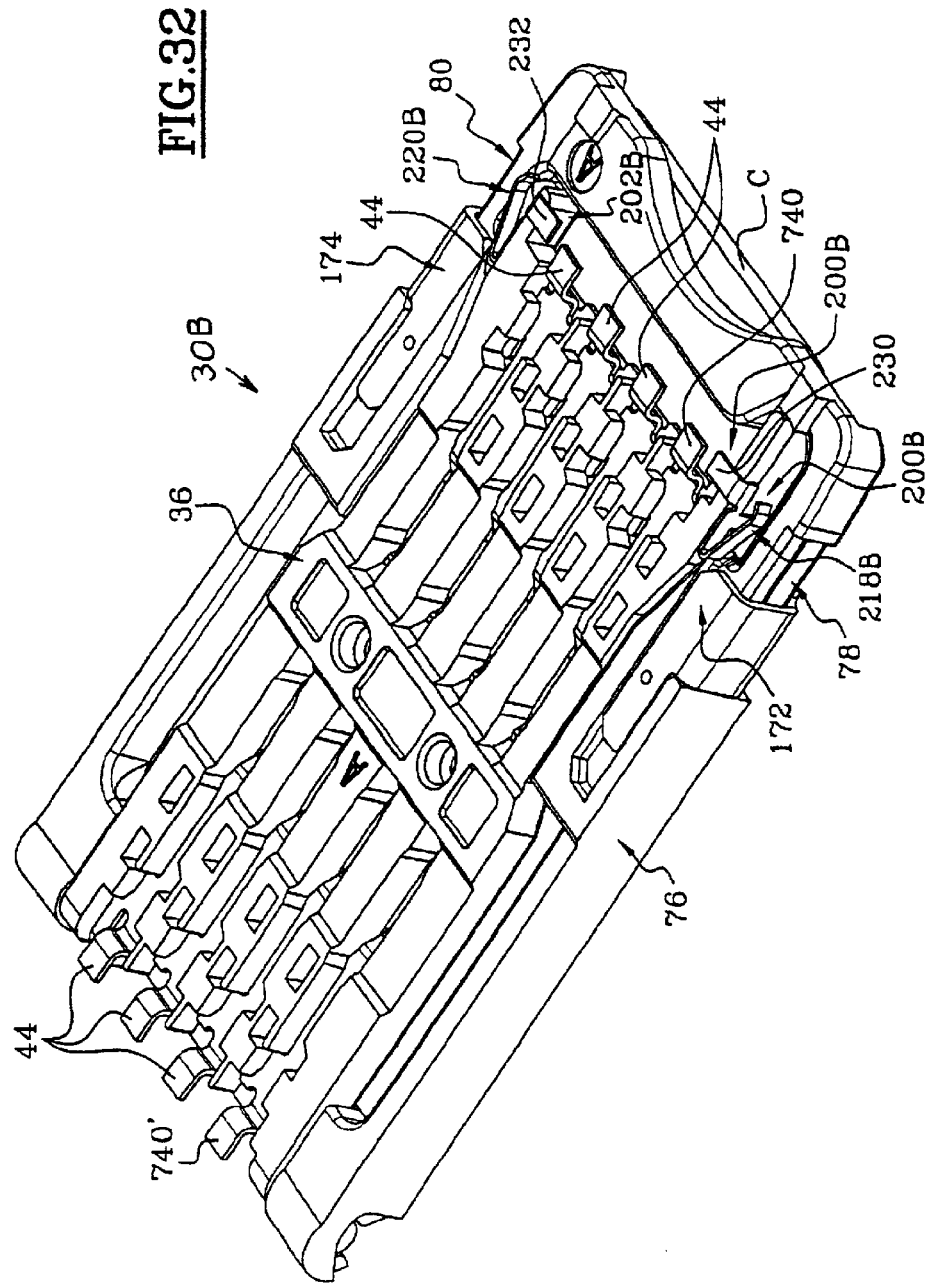

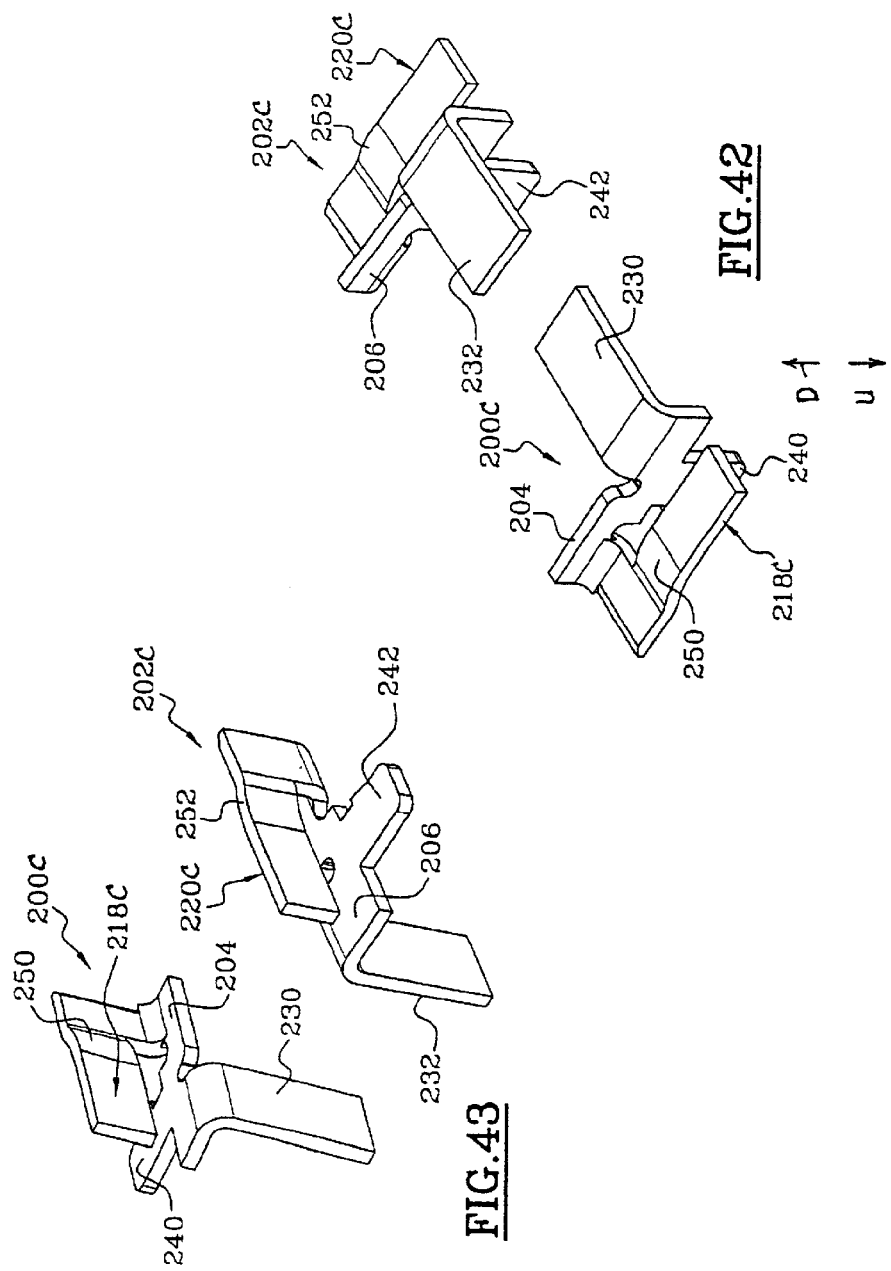

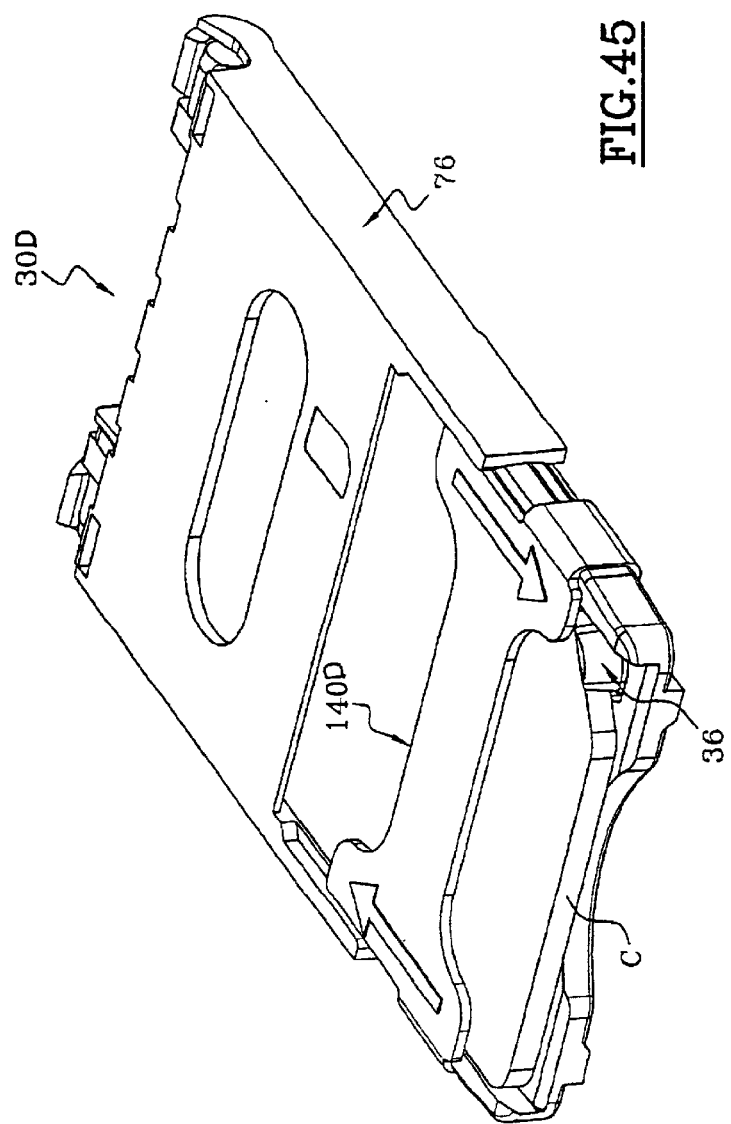

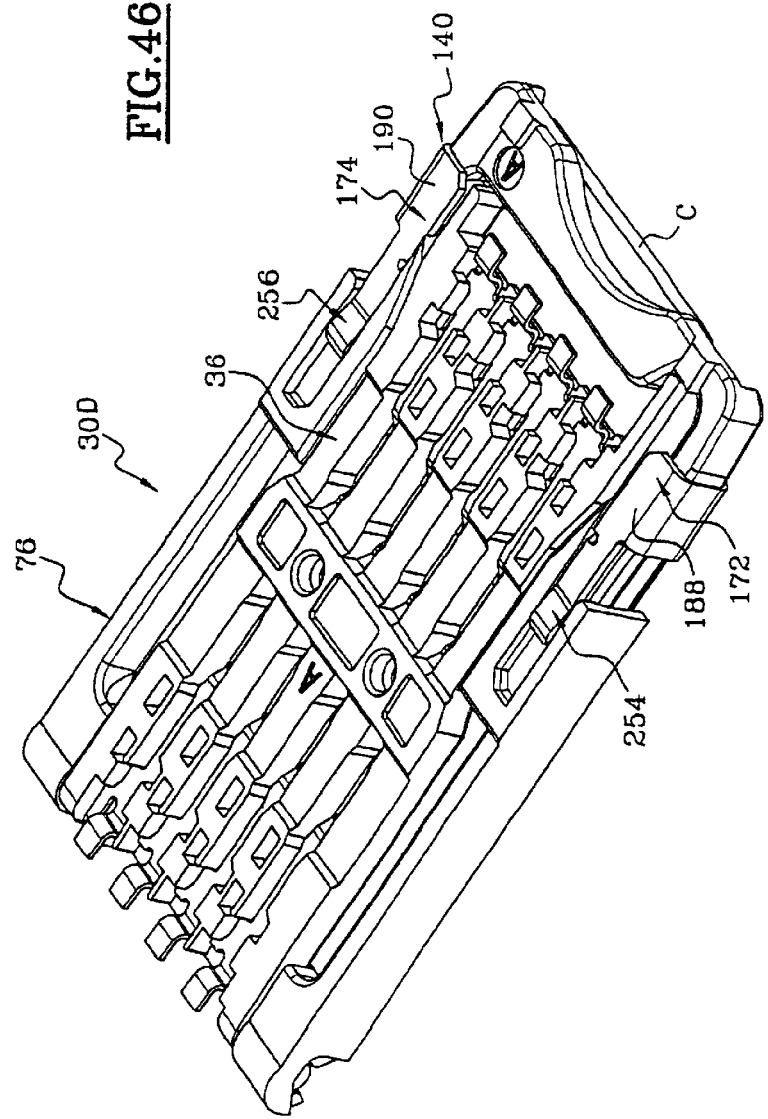

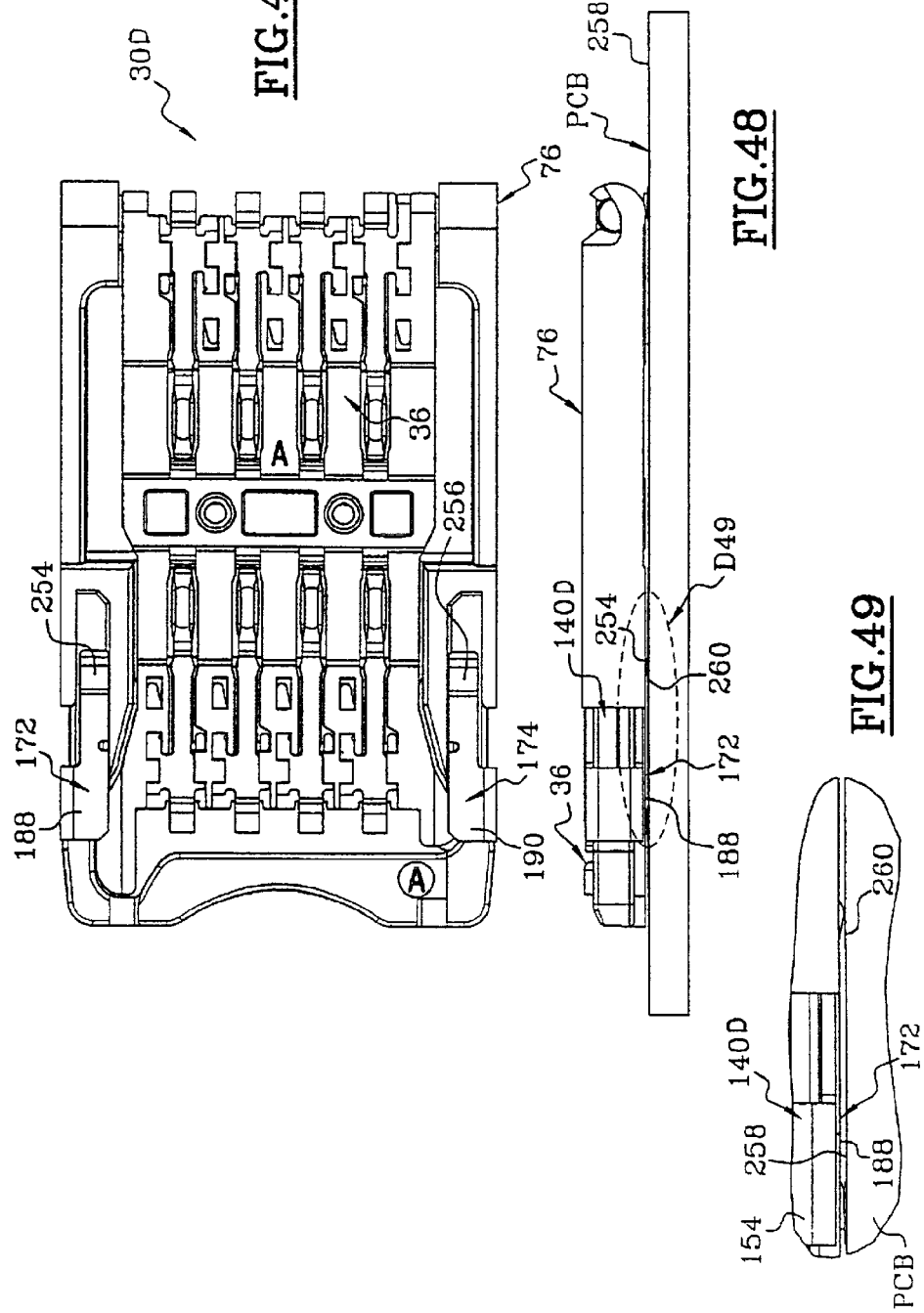

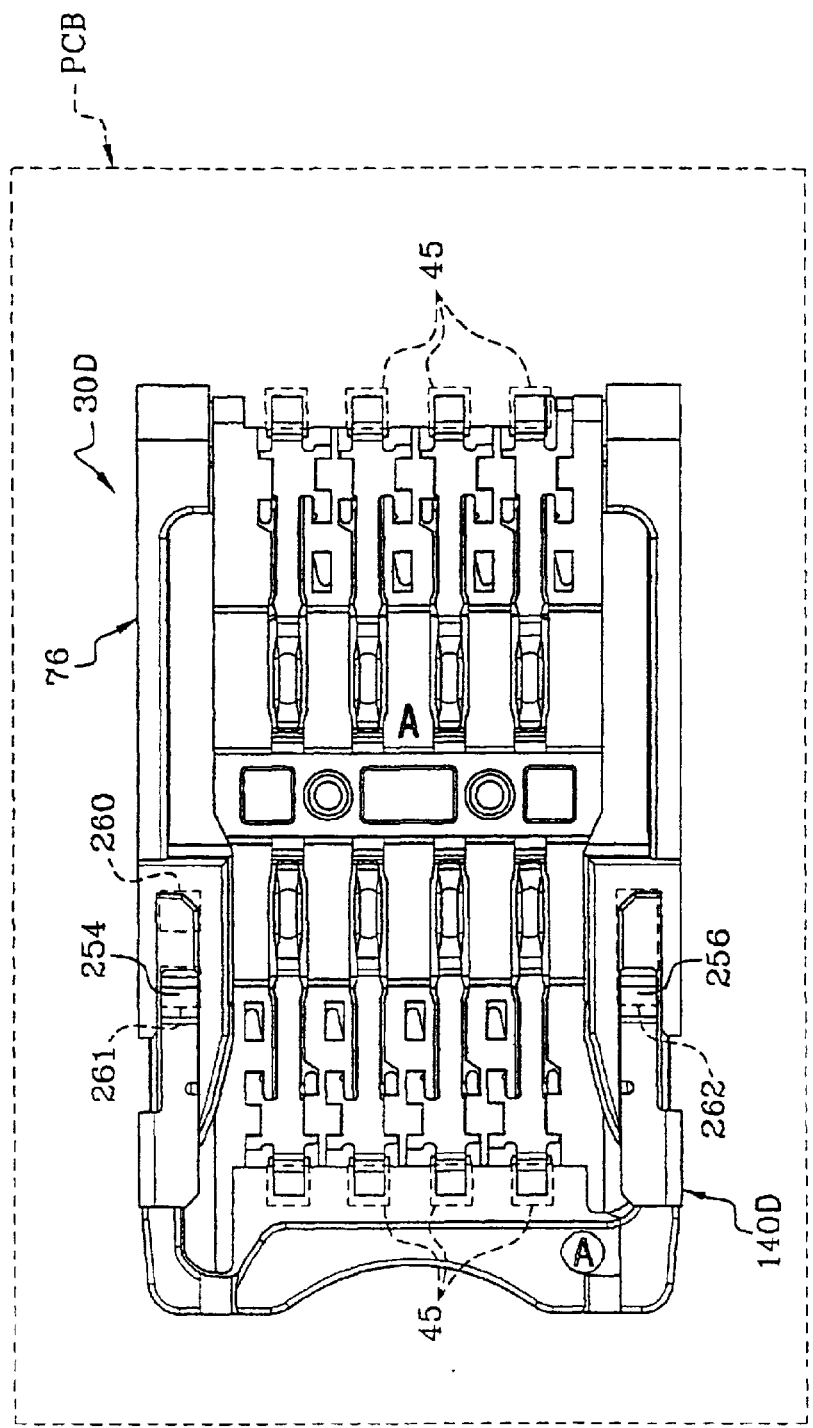

US 6,869,302 B2

SMART CARD CONNECTOR WITH LOCKING SWITCH

CROSS-REFERENCE TO RELATED APPLICATION

This is a continuation-in-part of PCT/EP00/06949 filed Jul. 20, 2000 and claims priority from French Application No. 9909598 filed Jul. 23, 1999.

BACKGROUND OF THE INVENTION

One type of smart card connector includes an insulative base that is usually mounted on a circuit board and that holds contacts with tails soldered to traces on the circuit board, and a cover that can hold a smart card and that is pivotally connected to the base. The cover has a cover frame and a locking member that is movable on the cover frame. When the cover is moved fully down against the base, the locking member can be moved from an unlocked position to a locked position to hold down the cover to the base. With the cover pivoted down and locked to the base, contact pads on the card firmly engage contacts on the base. It is noted that the locking member is usually made to slide forward and rearward away and towards the pivot axis of the cover, although other locking motions are possible such as where the locking member pivots between its two positions.

A switch can be used to detect when the cover is fully closed. However, if the cover is closed but not locked in its closed position, then errors can be made in the reading of the smart card. This may occur, for example if a first side of the cover, where a closing-sensing switch is located, is fully depressed, while an opposite second side is not fully depressed. This could result in card pads near the second side not properly engaging contacts near the second side of the base. A device for sensing not only when the cover is closed, but when a fully closed cover had been properly locked in the closed position, would be of value.

Smart card readers are used in a variety of applications, including on portable or cellular telephones. For many of such applications, it is desirable that the smart card reader occupy little space, and especially that it have a very small thickness. A smart card reader that could sense when a cover has been fully closed and properly locked in the closed position, and which was of small height, would be of substantial value.

SUMMARY OF THE INVENTION

In accordance with one embodiment of the present invention, a smart card connector is provided of the type that has a base with contacts and a cover that is pivotally mounted on the base and that holds a smart card with contact pads that engage contacts on the base when the cover is closed, which includes a switch means for detecting when the cover has been fully closed and properly locked in the closed position. The cover includes a cover frame and a locking member that is movable on the cover frame between locked and unlocked positions. When moved to the locked position, lock parts of side portions of the locking member move under largely downwardly-facing shoulders of the base to lock opposite sides of a fully closed cover to the base. The switch means has switch parts lying in the paths of the opposite side portions of the locking member as it moves between the locked and unlocked positions, to detect movement of the locking member if the cover is fully closed.

One switch means includes a pair of switch blades lying at opposite sides of the base and having tails connected to traces on the circuit board. Each switch blade has a deflectable part lying in the path of one of the locking member side portions to make and break contact with the corresponding side portion as the locking member moves between its locked and unlocked positions. The locking member is formed of sheet metal so current can flow between the contact blades and through the locking member in one position of the locking member. The base has a largely downwardly-facing base shoulder and each lock part of the locking member moves under the shoulder to lock the fully closed cover on the base. In one arrangement, the contacting portion of each switch blade lies below the shoulder to directly engage a lock part of the locking member as the locking member moves under the base shoulder.

Another switch means includes switching tracks formed on a circuit board on which the connector is mounted. In that case, side portions of the conductive locking member slide into and out engagement with the switching traces on the circuit board to indicate the position of the locking member.

The novel features of the invention are set forth with particularity in the appended claims. The invention will be best understood from the following description when read in conjunction with the accompanying drawings.

BRIEF DESCRIPTION OF THE DRAWINGS

FIG. 6A is partial sectional view of the connector of FIG. 6, with a lock part of the locking member side portion in its unlocked position and showing, in phantom lines, the lock part in its fully locked position.

FIG. 14 is an enlarged partial sectional view showing a switch for detecting full closure of the cover on the base, which can be useful in conjunction with the locking member that locks the cover to the base.

FIG. 15 is a top view taken along arrow F15 of FIG. 14.

FIGS. 16A and 16B are sectional views respectively of the card pad-engaging contacts and of a normally open switch arrangement for sensing when the cover is fully closed, with the cover in the same largely open position for each figure.

FIGS. 17A and 17B are similar to those of FIGS. 16A and 16B, but with the cover closer to its closed position.

FIGS. 18A and 18B are similar to those of FIGS. 17A and 17B, but with the cover closer to its closed position.

FIGS. 19A and 19B are views similar to that of FIGS. 18A and 18B, but with the cover closer to its fully closed position.

FIGS. 20A and 20B are views similar to those of FIGS. 19A and 19B, but with the cover closer to its fully closed position.

FIGS. 21A and 21B are views similar to those of FIGS. 20A and 20B, but with the cover very close to its fully closed position.

FIGS. 22A and 22B are views similar to those of FIGS. 21A and 21B, but with the cover fully closed.

FIG. 23 is an isometric view of another smart card connector shown with the cover fully open and a smart card fully installed in the cover, which includes a normally closed switch arrangement for sensing when the cover is fully closed.

FIG. 24 is a partial sectional view showing the closure-sensing switch arrangement of FIG. 23 when there is no card in the cover.

FIG. 25 is a partial plan view taken on line F25 of FIG. 24.

FIGS. 26A and 26B are sectional views respectively of the contacts that engage contact pads of the card, and of contacts that sense when the cover is fully closed, with the cover in the same largely open position for each figure.

FIGS. 27A and 27B are views similar to that of FIGS. 26A and 26B, but with the cover approaching its closed position.

FIGS. 28A and 28B are views similar to FIGS. 27A and 28B, but with the cover closer to its closed position.

FIGS. 29A and 29B are similar to FIGS. 28A and 28B, but with the cover closer to its fully closed position.

FIGS. 30A and 30B are similar to FIGS. 29A and 29B, but with the cover even closer to its fully closed position.

FIGS. 31A and 31B are similar to FIGS. 30A and 30B, but with the cover fully closed.

FIG. 32 is a bottom isometric view of a connector of another embodiment of the invention, with the locking member in its unlocked position, and with switch blades that are deflected horizontally instead of downwardly.

FIG. 42 is a bottom isometric view of the contact blades of the connector of FIG. 38.

FIG. 43 is an isometric view of the contact blades of FIG. 42, but with each contact blade pivoted 90° about two perpendicular axes from its orientation in FIG. 42.

FIG. 45 is an isometric view similar to that of FIG. 44, but without showing the circuit board.

FIG. 46 is a bottom isometric view of the connector of FIG. 45, with the locking member also shown in its locked position.

FIG. 47 is a bottom plan view of the connector of FIG. 46.

FIG. 48 is a side elevation view of the combination of connector and circuit board of FIG. 44, with the locking member also shown in its locked position.

FIG. 49 is an enlarged view of region D49 of FIG. 48.

FIG. 50 is a bottom view of the connector of FIG. 47, but also showing, in phantom lines, a circuit board and traces on the circuit board, the locking member of the connector also being shown in its locked position.

DESCRIPTION OF THE PREFERRED EMBODIMENTS

Figure 1:
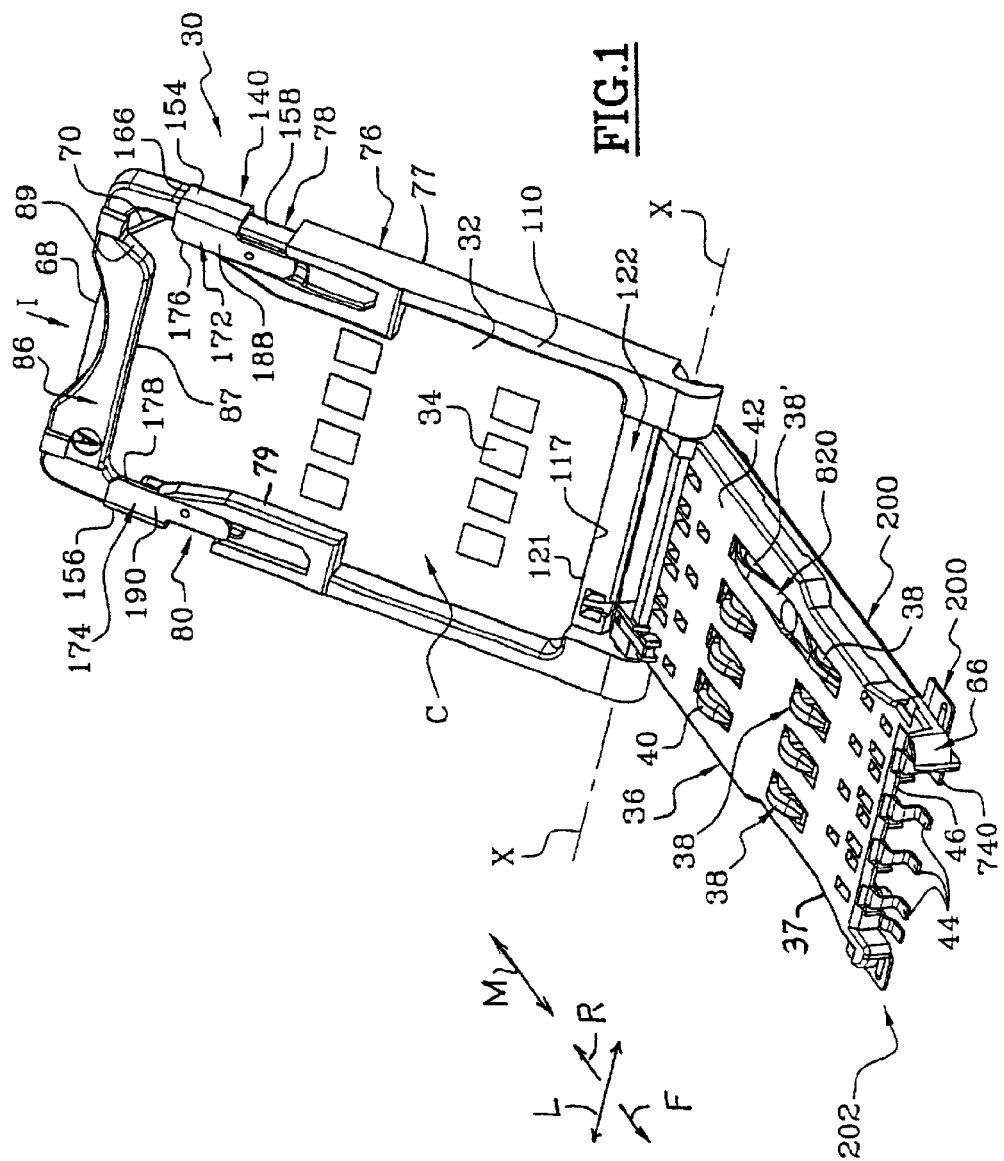
FIG. 1 is an isometric view of a first embodiment of a smart card connector of the invention, with the cover shown in its open position and a smart card fully installed in the cover.

FIG. 1 illustrates a smart card connector 30 for reading and writing information out of and into a smart card C which has a lower face 32 with contact pads 34 that connect to circuitry embedded in the smart card. The connector includes a base 36 that has a base frame 37 and signal contacts 38 mounted on the base frame. The particular connector illustrated has six signal contacts 38, each with a pad-engaging end 40 projecting above an upper face 42 of the base frame to engage the contact pads of the smart card. Each contact also has tails 44 that are connected, as by soldering, to conductive traces on a circuit board. The connector has a cover 76 with a cover frame 77 that holds the smart card.

The cover is pivotally connected about an axis X—X to the base. The axis extends in lateral directions L and lies at the rear end of the base. The contact tails 44 are located at front and rear ends of the base. The front and rear directions F, R are longitudinal M directions. Corresponding directions with respect to the cover 76 assume that the cover is closed, rather than open as in FIG. 1.

Figure 2:
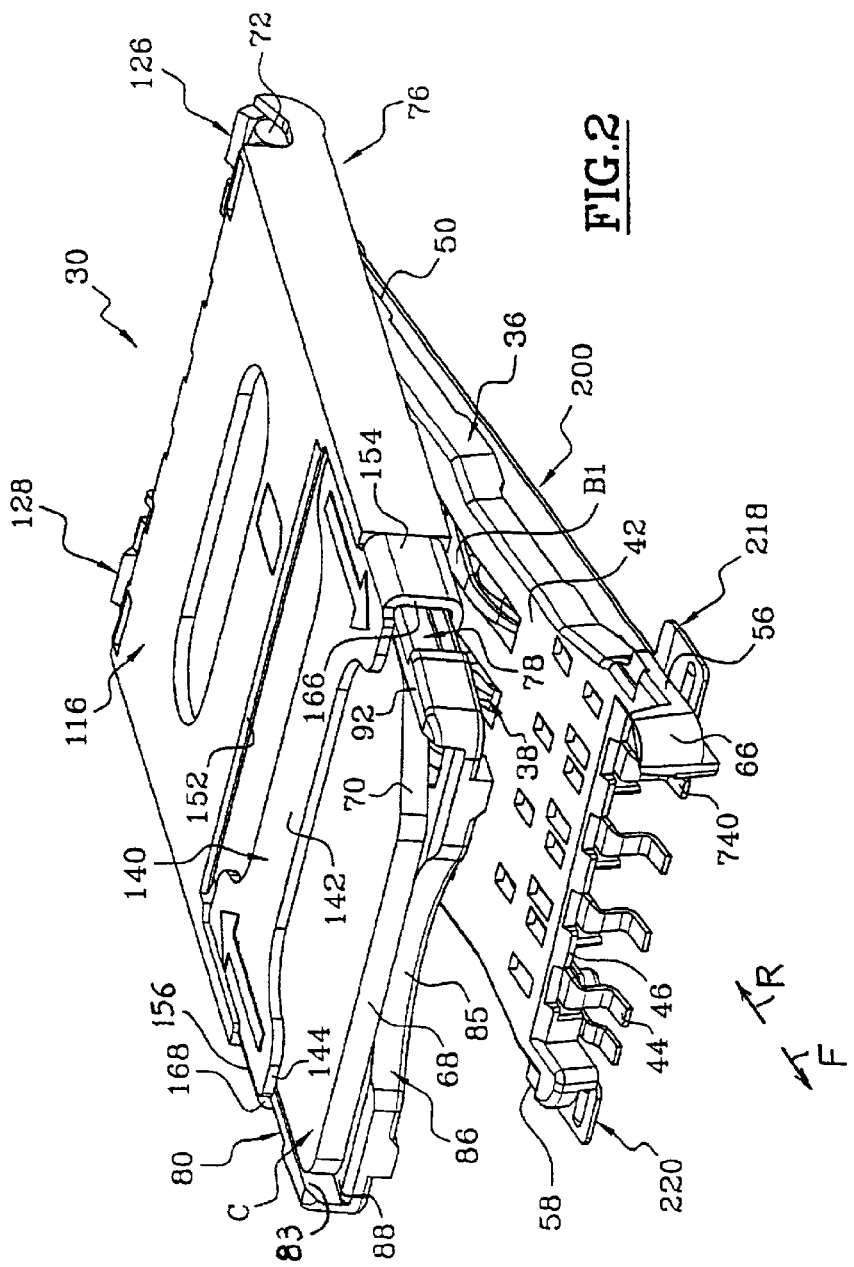
FIG. 2 is a view similar to that of FIG. 1, but with a cover shown partially closed.

The cover frame 77 includes retention walls 79,86 that abut the lower face of the card. FIG. 2 shows that the cover frame has a rearward-upper plate part 116 that lies against the upper face of the card. The card can be inserted rearwardly R into a space between the retention walls of the cover frame. The cover frame has side walls 78, 80 with inner sides that have flanges 83 that help trap a card as it is inserted into the cover.

Figure 3:
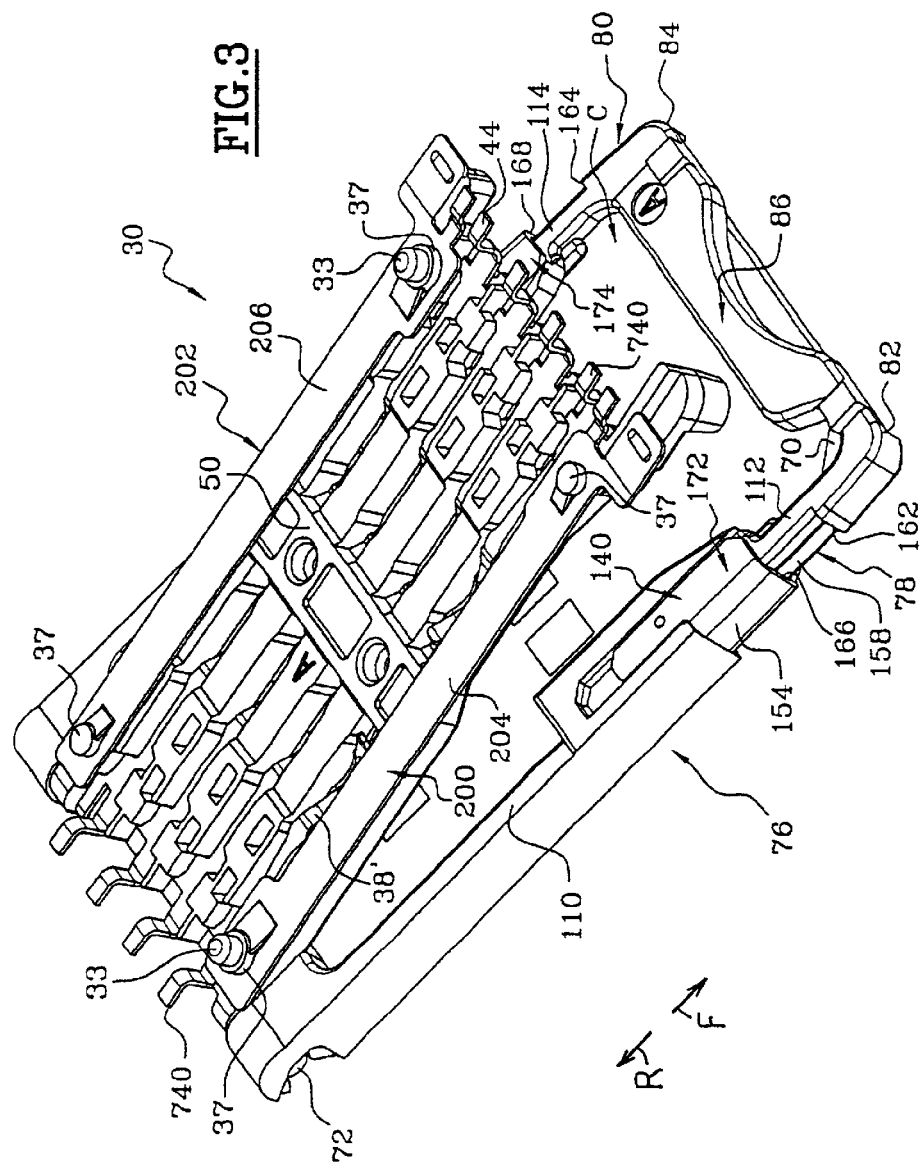
FIG. 3 is a bottom isometric view of the partially closed connector of FIG. 2.
Figure 13:
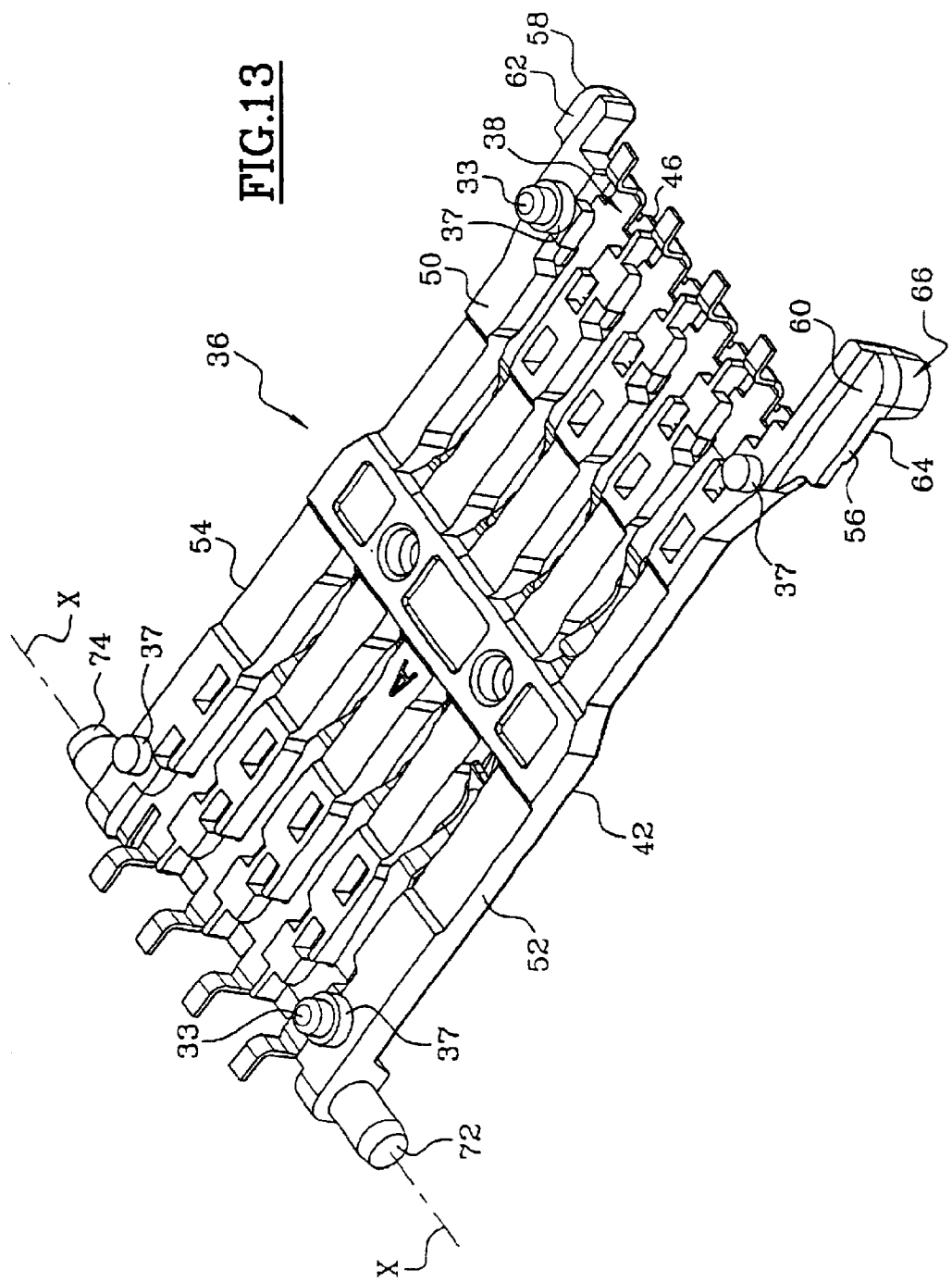
FIG. 13 is a bottom isometric view of only the base of the smart card connector of FIG. 1, without the contact blades.
Figure 33:
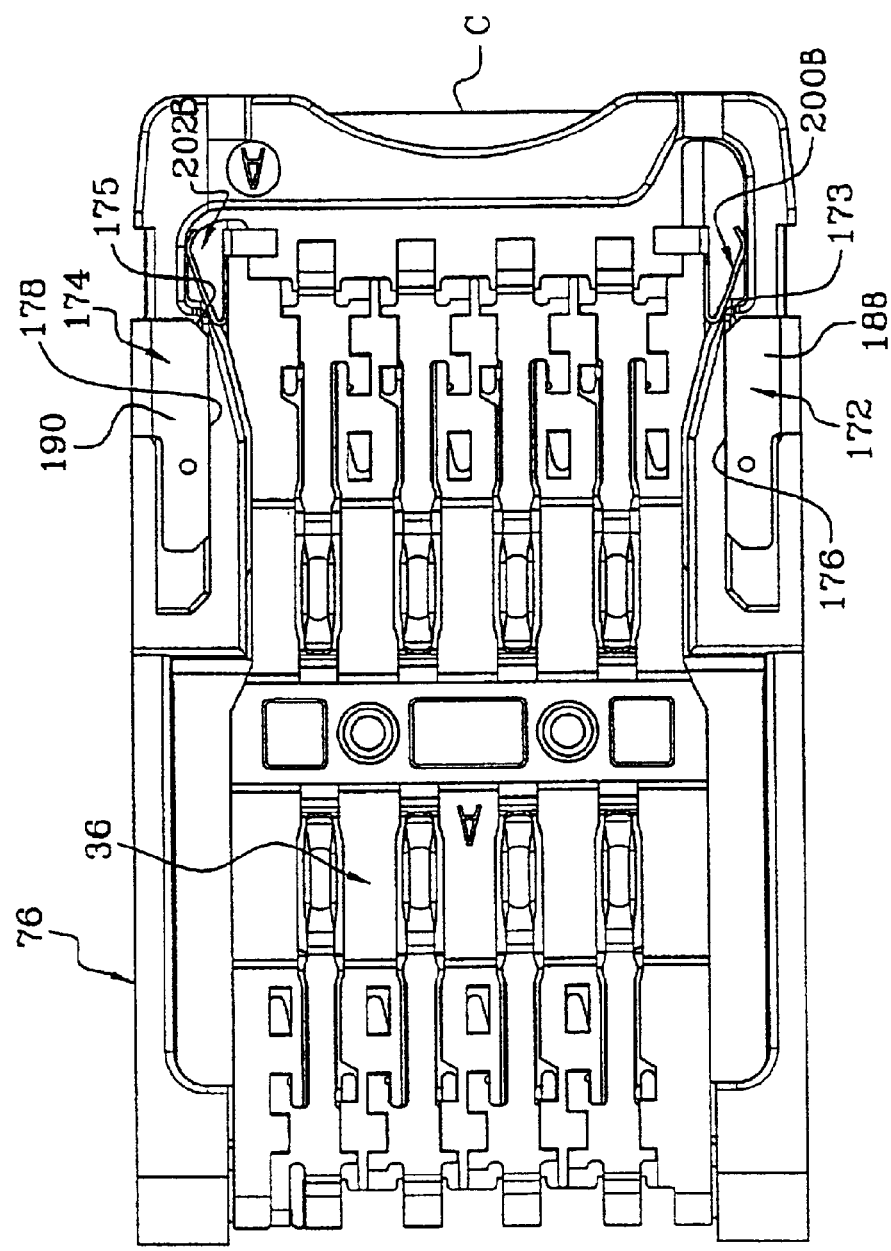
FIG. 33 is a bottom plan view of the connector of FIG. 32.
Figure 34:
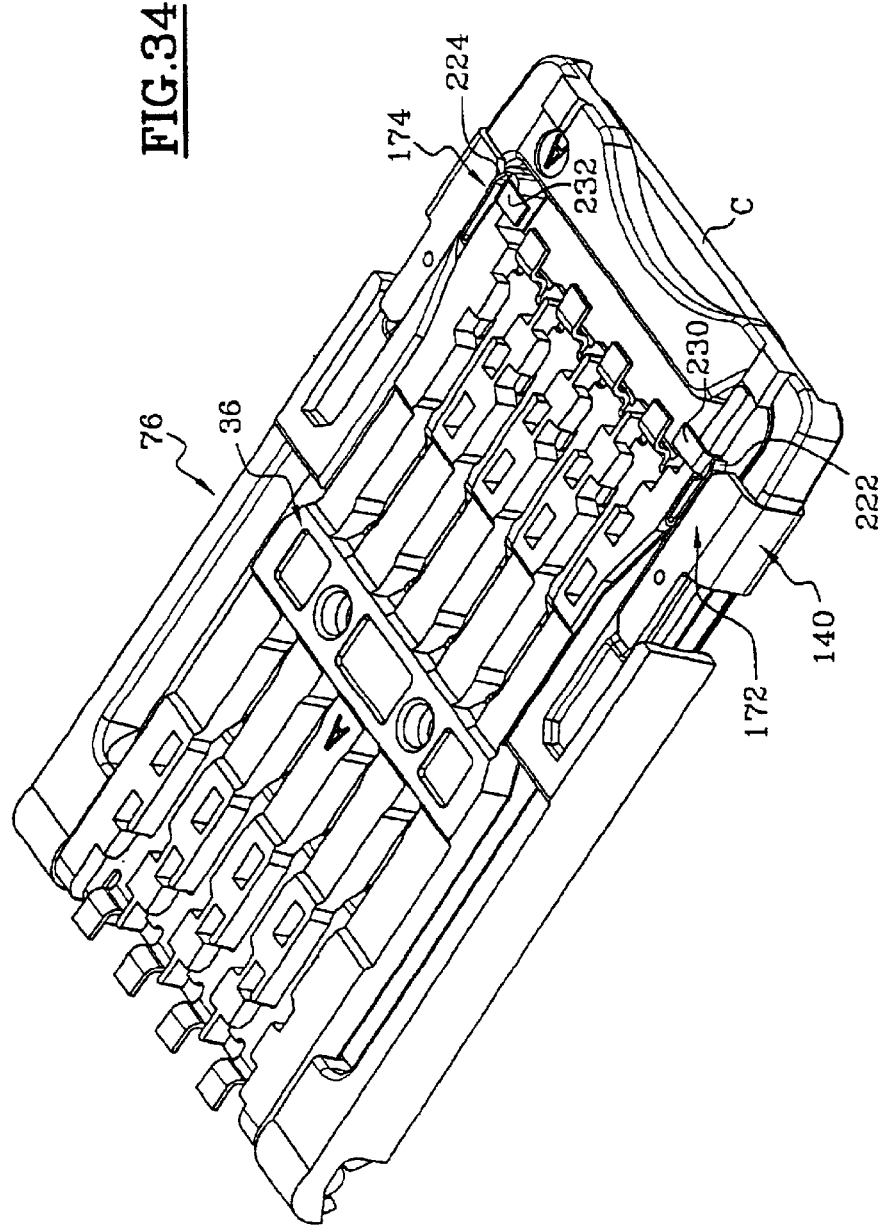
FIG. 34 is a view similar to FIG. 32, but with the locking member in its fully locked position.
Figure 35:
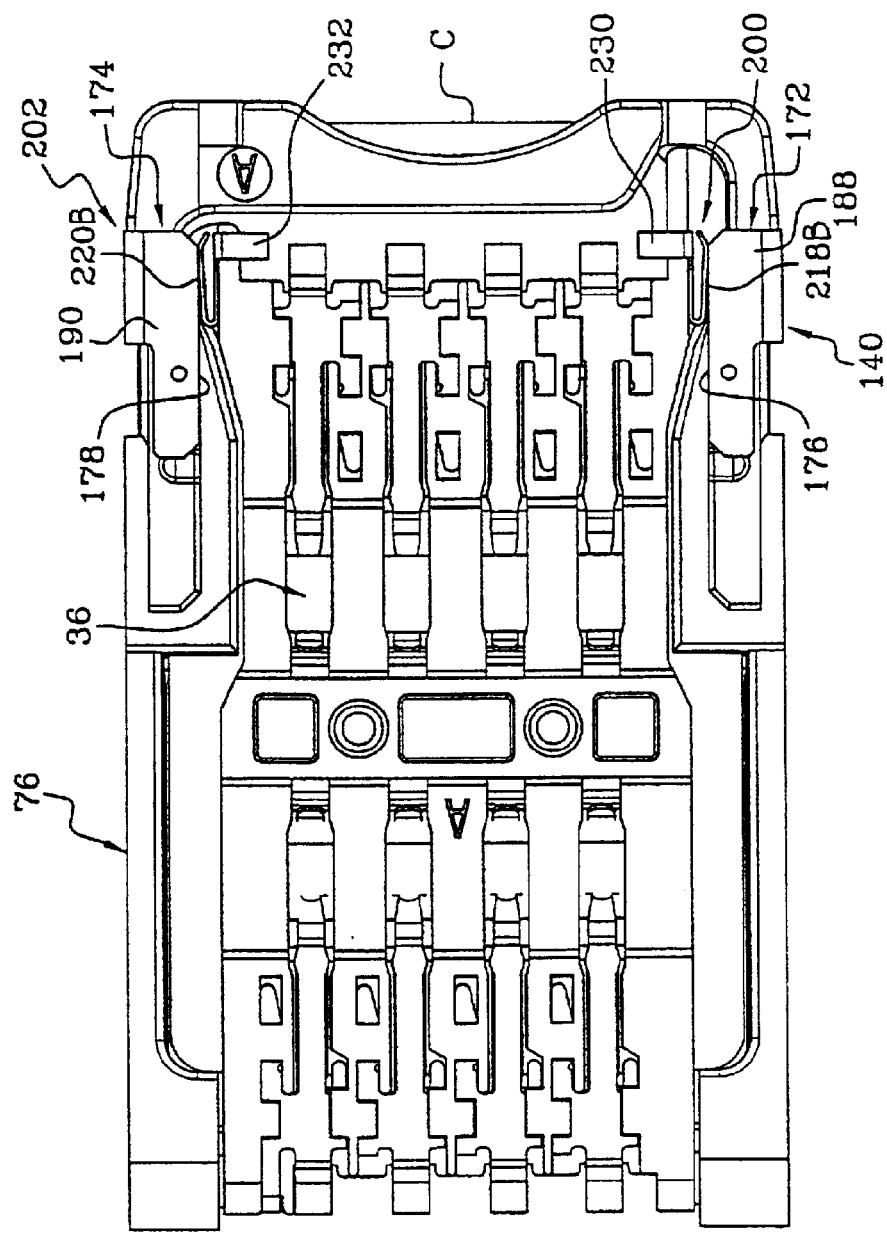
FIG. 35 is a bottom plan view of the connector of FIG. 34 with the lock member in its fully locked position.

The cover includes a locking bar or member 140 which has an upper plate part 142 and opposite cheeks or locking member side portions 154, 156. As shown in FIG. 3 the locking member side portions such as 154 have lower tabs or lock parts 172, 174 which are designed to move under shoulders at opposite sides of the base. As shown in FIG. 13, the base has largely downwardly-facing shoulders 60, 62. FIG. 6A shows that when each lock part such as 172 of the locking member side portion moves forwardly F to its locked position, the lock part 172 moves under a downwardly-facing base shoulder such as 60, to thereby lock the cover in it fully downward or closed position on the base.

Figure 5:
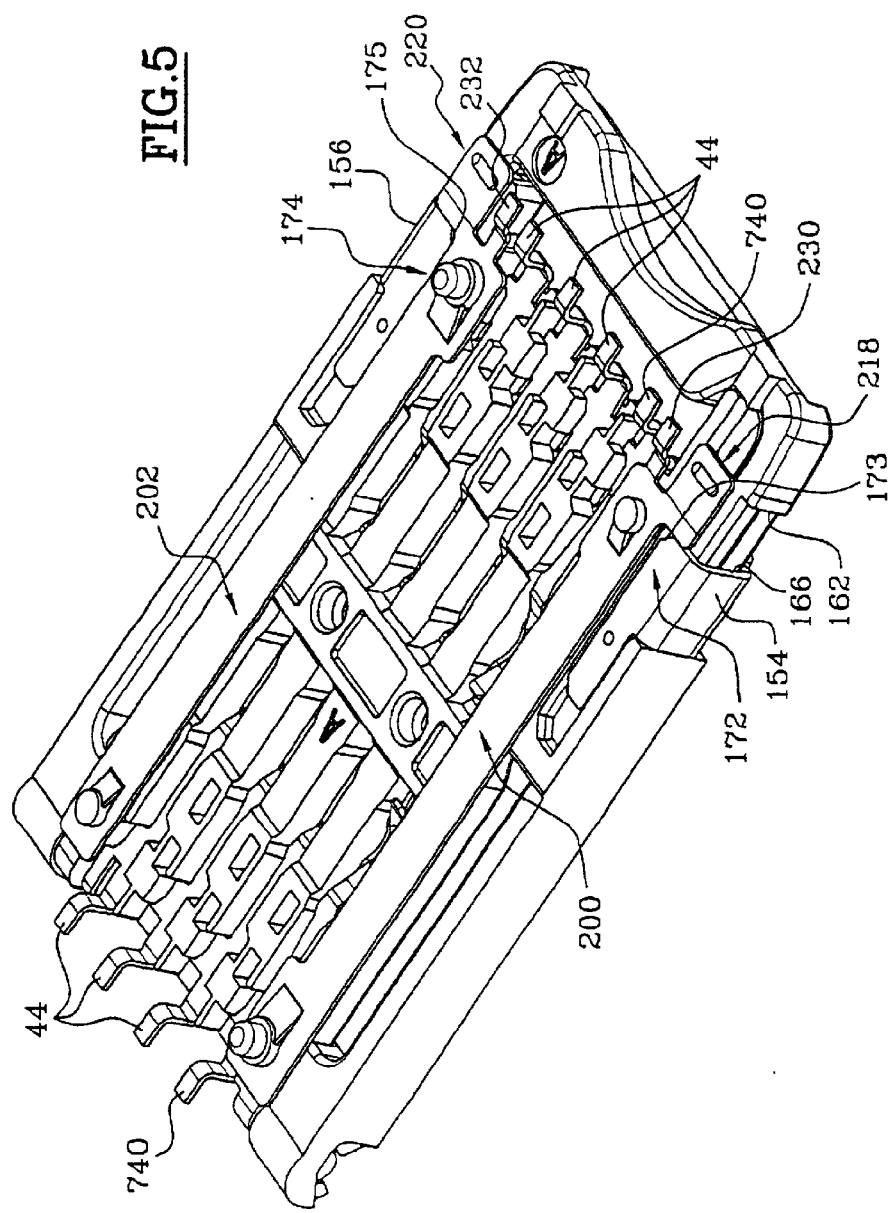
FIG. 5 is a bottom isometric view of the connector of FIG. 4 wherein the locking member is in the unlocked position.
Figure 11:
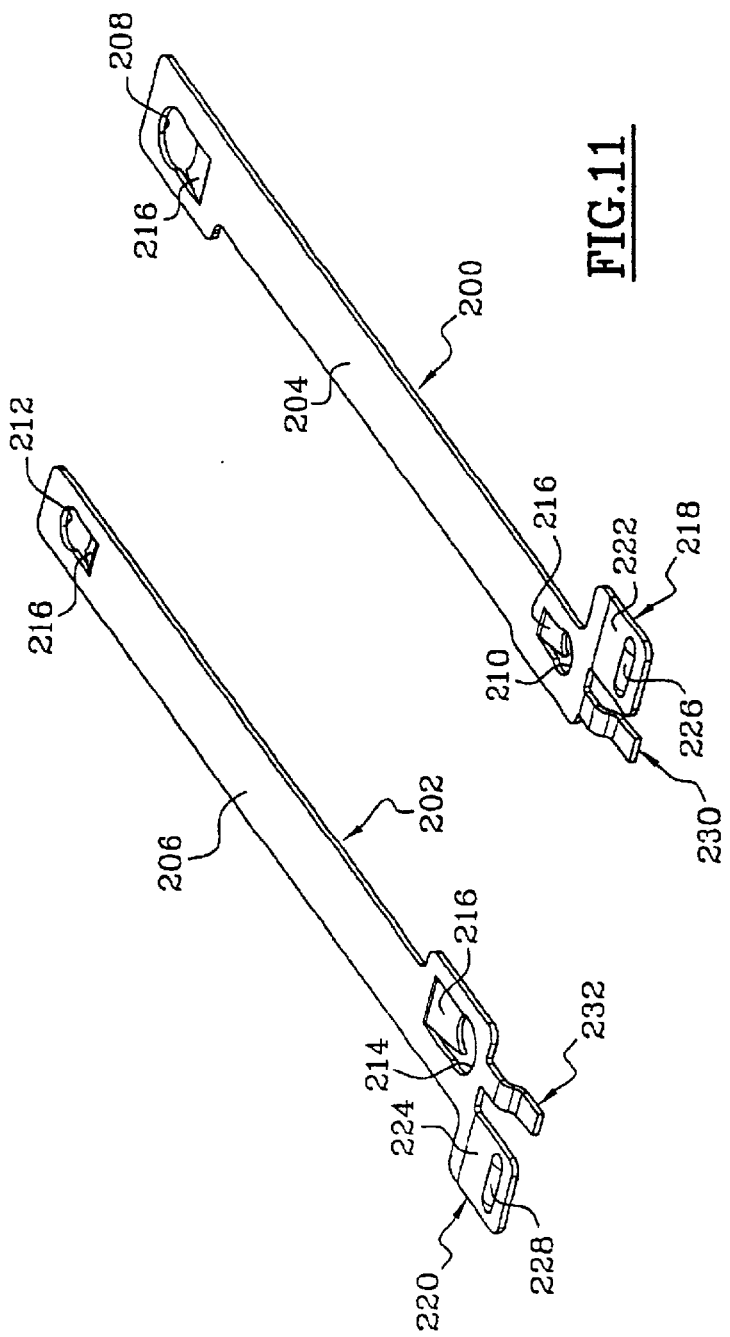
FIG. 11 is a top isometric view of two contact blades of the smart card connector of FIG. 1.

FIG. 3 shows that the connector has a pair of switch blades 200, 202 at its laterally opposite sides which forms a switch means. Each switch blade, which is a conductive switching element, has a pair of holes that receives studs 37, with half of the studs having feet 33 that project into circuit board holes. As shown in FIG. 5, each switch blade 200, 202 has a tail 230, 232 that can be soldered to a circuit board trace. When the locking member 140 is moved forwardly F toward its locked position, the lock parts 172, 174 of the side portions engage bosses on contact tabs 218, 220 of the switch blades. FIG. 11 shows that each switch blade 200, 202 has a middle portion 204, 206 and has front portions that form the active portions that move and that form the contact tabs 218, 220. The contact tabs extend laterally outwardly, that is, away from each other, and contact bosses 226, 228 project upwardly. As shown in FIG. 6A, when each lock part 172 of the locking member moves under a downwardly-facing base shoulder 60, the lock part also moves into a gap 173 between the shoulder and switch blade tab 218 and the lock part of the side portion engages the contact boss 226 and the base shoulder 60. Thus, when the locking member moves forwardly, it not only locks the cover down against the base, but also its side portions engage the switch blades, especially at the bosses 226. FIG. 6A also shows a circuit board 99 on which the base lies.

The lock member shown at 140 in FIG. 2, is preferably formed of a single piece of sheet metal, with the side portions 154 bent down and with their lower ends bent inwardly toward one another to form the lock parts. As a result, when the lock parts 172, 174 of FIG. 5 engage the switch blade tabs 218, 220, the locking member connects the tails 230, 232 of the switch blades to one another. A circuit connected through circuit board traces to the switch blade tails, then detects that both sides of the cover have been locked to opposite sides of the base. The circuit then enables read out and read in of information from and to the smart card through the connector.

It is noted that the contact pads 218, 220 project outwardly, away from each other, from middle portions of the switch blades. This results in the middle portions of the switch blades not lying directly under the lock portions 172, 174 of the locking member to prevent contact between them.

FIG. 1 shows a switch member 820 and contacts labeled 38, 38'. These contacts are used to detect closing of the cover, but not locking of the cover in the closed position. FIG. 14 shows that the switch member 820 has branches B1, 81 that extend respectively forward and rearward from a fixed portion 840. If a card is installed in the cover, then the card will depress the forward branch B1 against the contact 38, allowing current to flow from contact 38 through member 820 to contact 38'. This enables a circuit to detect that the cover has been closed and that a card lies in the cover. Soon thereafter, circuitry should detect that the locking member has locked the cover in its closed position.

FIG. 23 illustrates another connector 30A wherein switch member 820A is of a different construction. As shown in FIG. 24, the switch member has rigid blades B1, B2 that initially engage the contacts 38, 38'. When a card lies in the cover and the cover is closed on the base, the contact 38 is depressed, thereby opening a circuit that previously allowed current to pass through the switch member 820A.

Figures 36, 37:
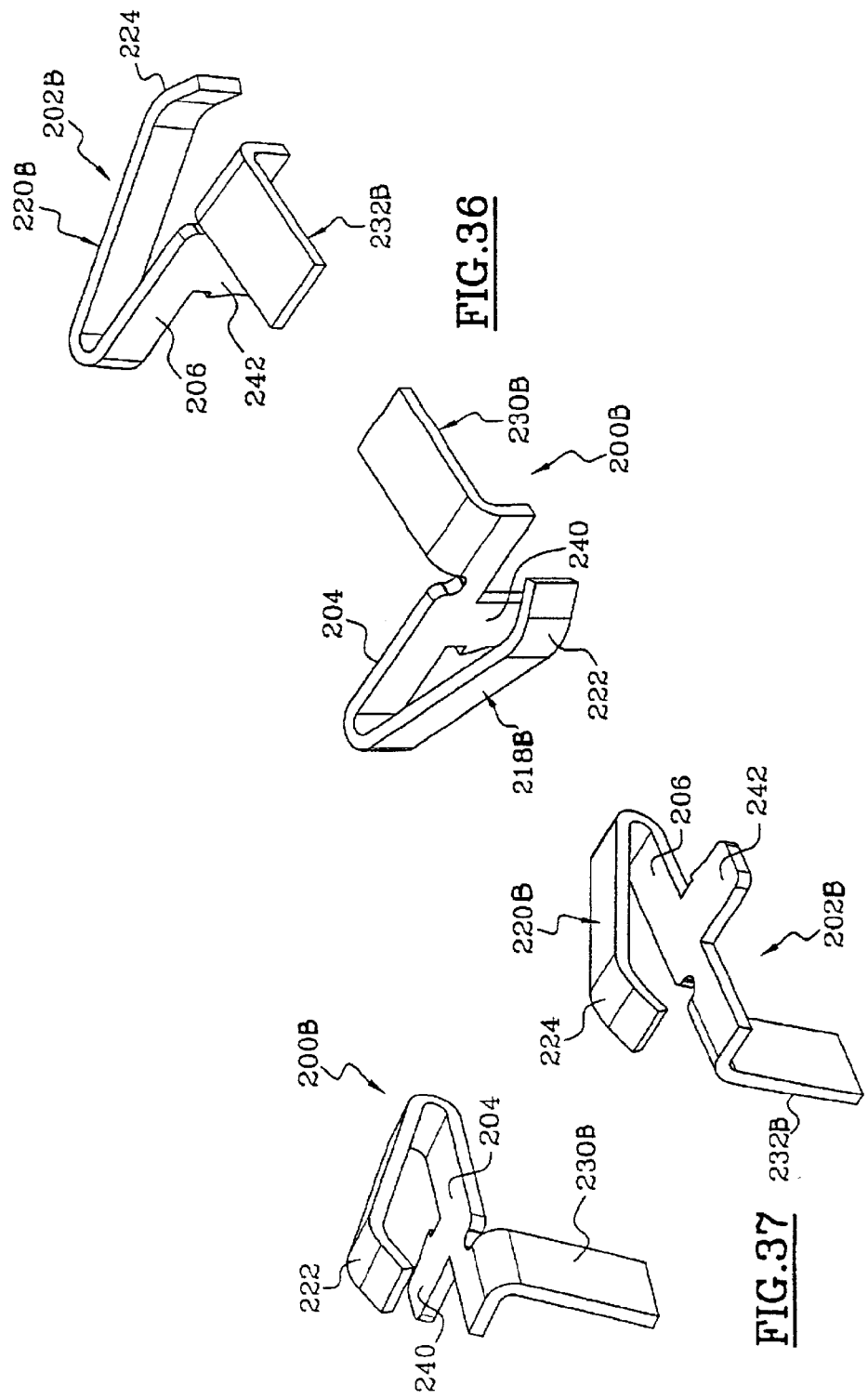
FIG. 36 is a bottom isometric view showing the contact blades of the connector of FIG. 32.
FIG. 37 is an isometric view of the contact blades of FIG. 36, but with each contact blade shown rotated 90° from its corresponding position in FIG. 36.

FIG. 32 shows another connector 30B with switch means formed by active or deflectably blade parts 218B, 220B that are deflected horizontally, or inwardly towards each other, when the lock parts 172, 174 of the locking member side portions move forwardly to the locked position. FIG. 36 shows that each switch blade 200B, 202B includes a harpoon 240, 242 which locks the switch blade to the base frame, and tails 230B, 232B that can be soldered to traces on a circuit board. The switch blades also have the active blade parts 218B, 220B that can engage the locking member side portions and that can deflect towards each other. Due to the fact that the active blade portions 218B, 220B move horizontally towards each other rather vertically down towards the circuit board, space is not required under the tabs or blade portions that move, so the base can lie closer to the circuit board and the connector can have a smaller height.

Figure 38:
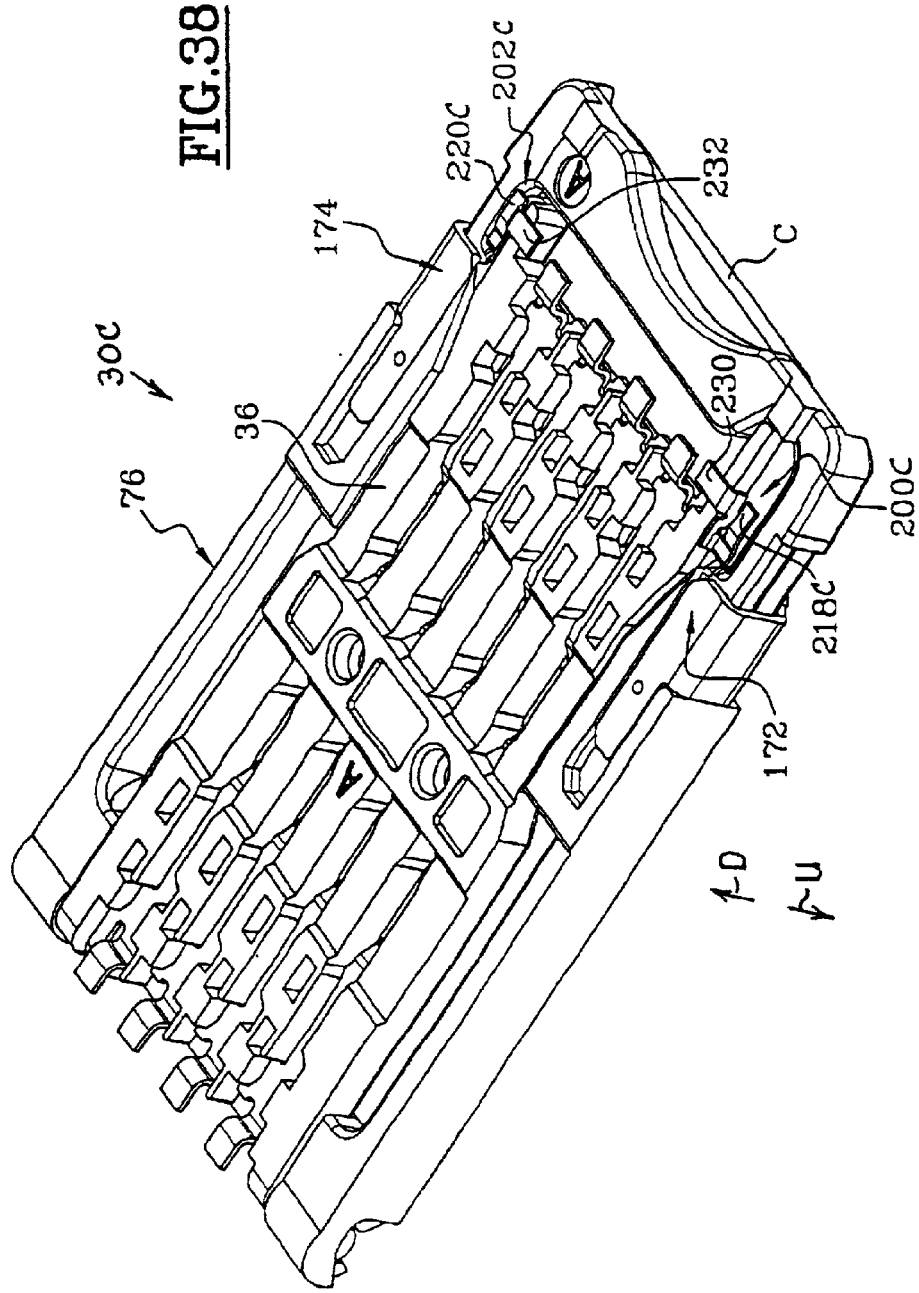
FIG. 38 is a bottom isometric view of a smart card connector of another embodiment of the invention, wherein the contact blades are deflected upwardly as the locking member moves to its locked position, but with the locking member shown in its unlocked position.
Figure 39:
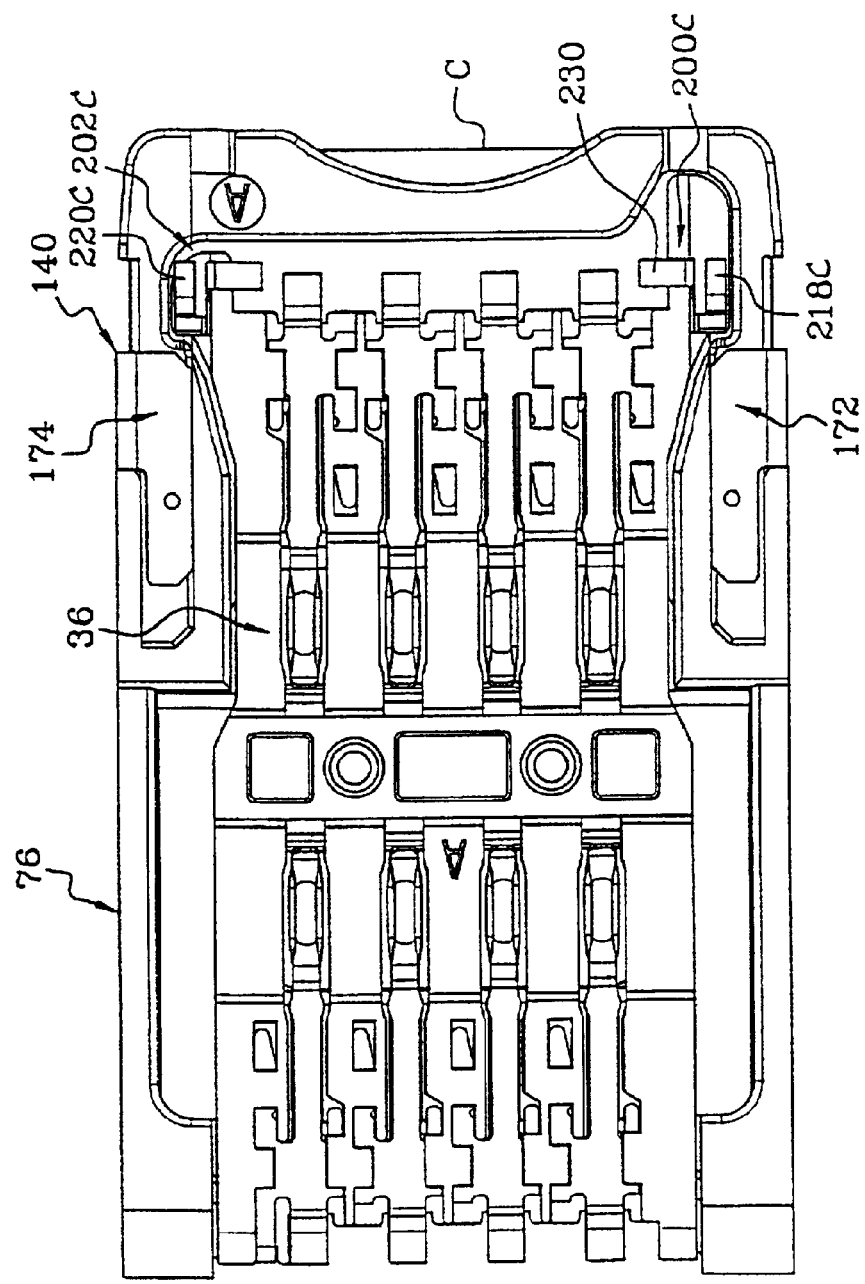
FIG. 39 is a bottom plan view of the connector of FIG. 38.

FIG. 38 shows another connector 30C wherein the contact blades 200C, 202C that form a switch means, are of a different construction, wherein active parts 218C, 220C that are deflected, are deflected upwardly U, rather than downwardly D or horizontally. As shown in FIG. 42, the active portions 218C, 220C of the switch blades 200C, 202C can be deflected upwardly U by the side portions of the locking member.

Figure 44:
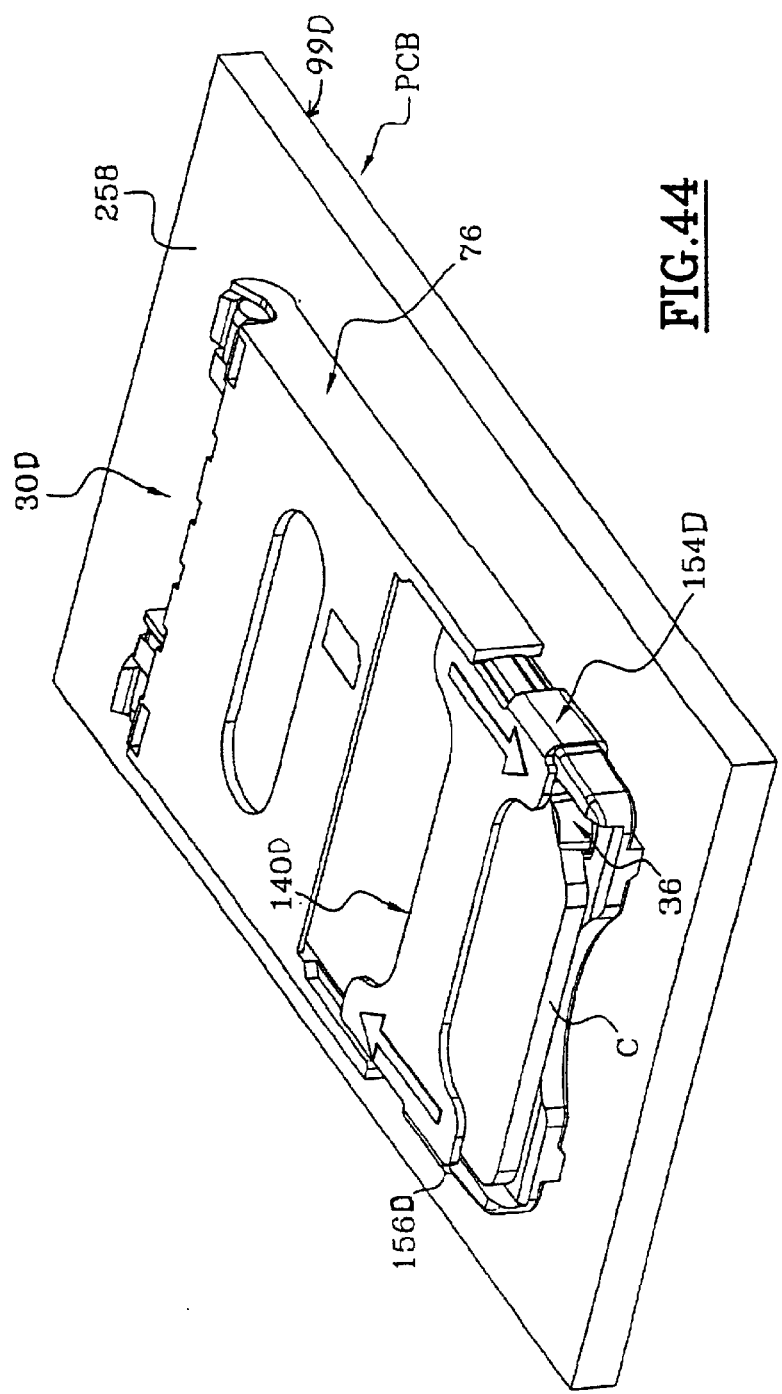
FIG. 44 is an isometric view of a combination of a smart card connector and circuit board of another embodiment of the invention, wherein the locking member engages and disengages from traces on an upper face of the circuit board rather than from contact blades, the locking member being shown in its locked position.
Figure 51:
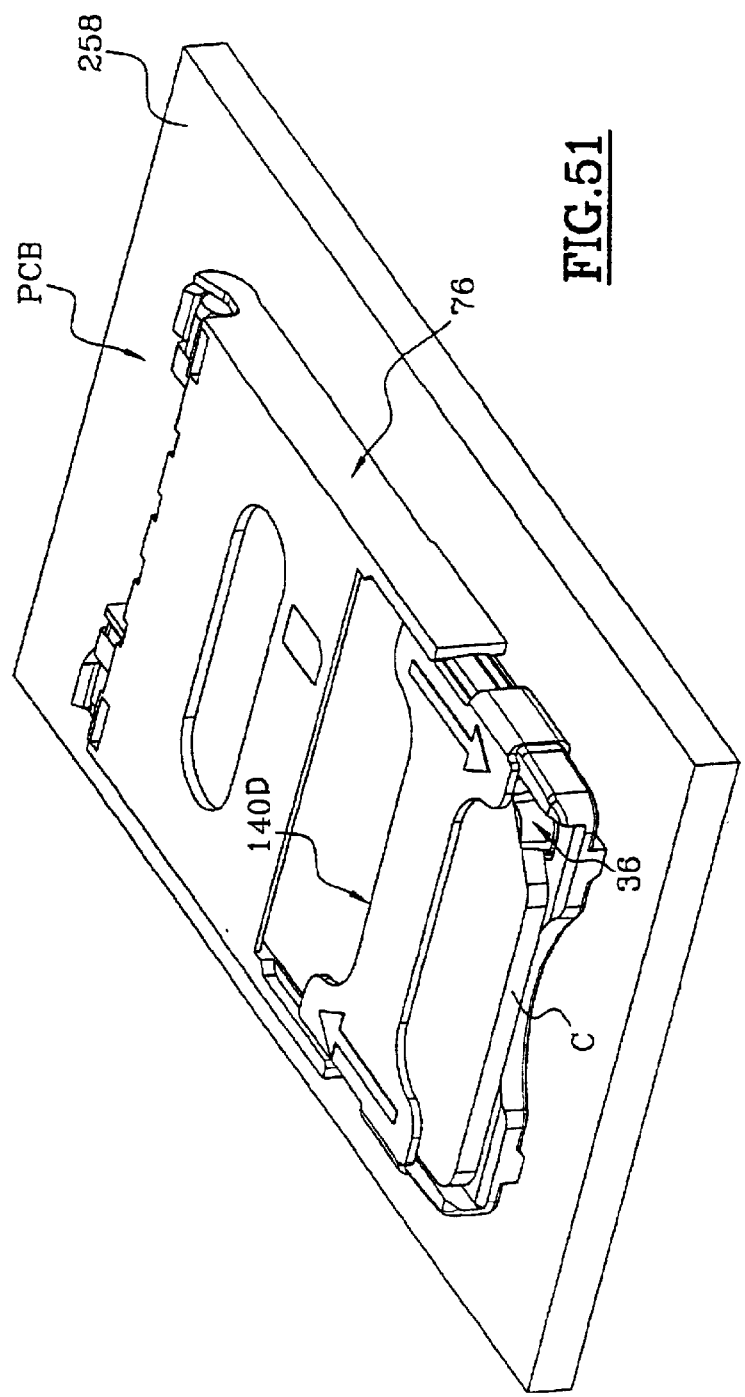
FIG. 51 is a view similar to FIG. 44.
Figure 52:
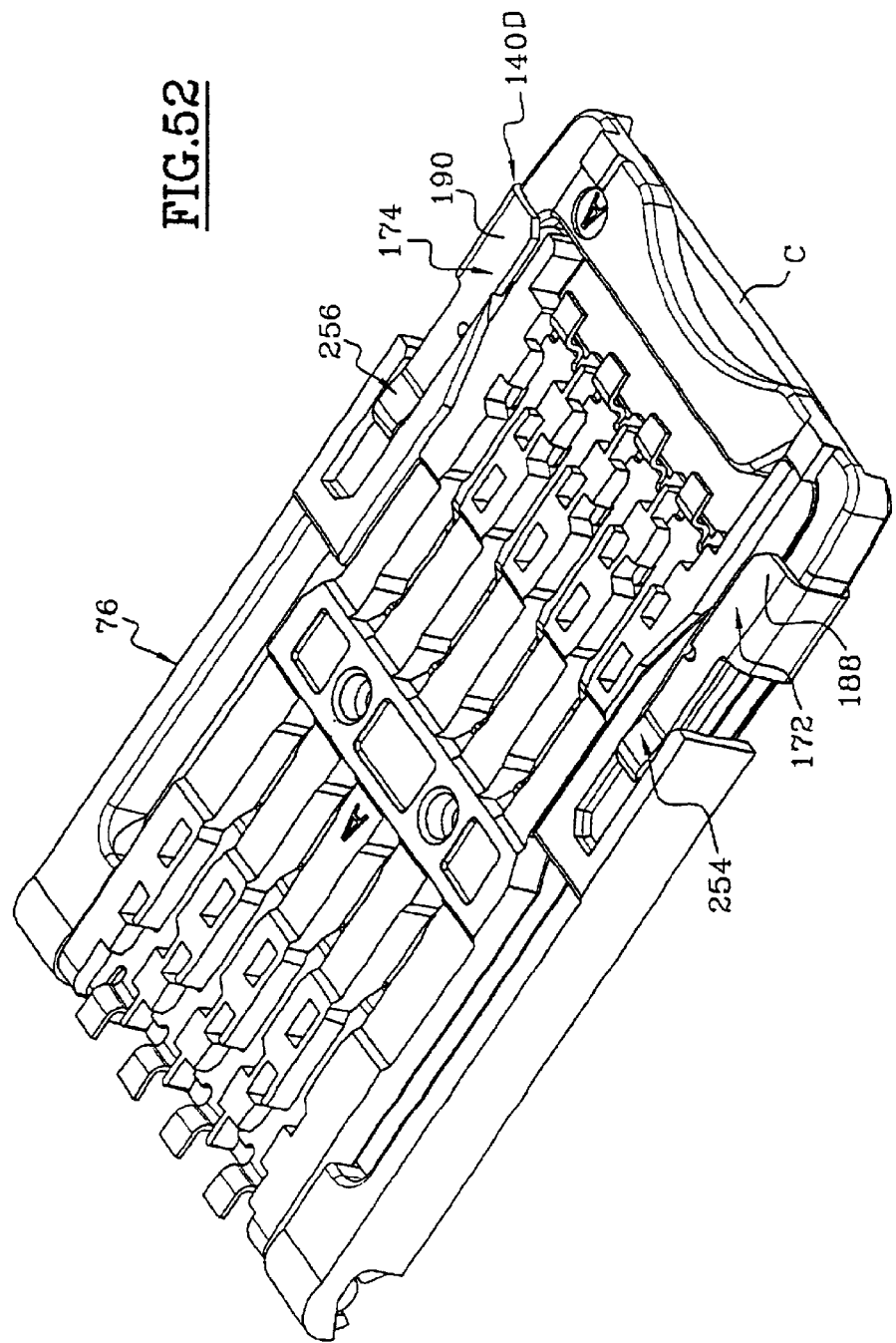
FIG. 52 is a view similar to FIG. 46.
Figure 53:
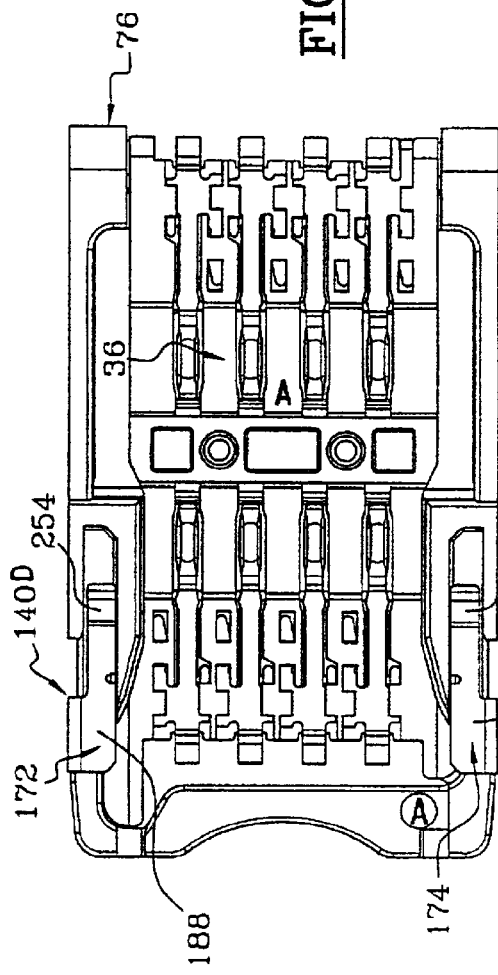
FIG. 53 is similar to FIG. 47.
Figure 54:
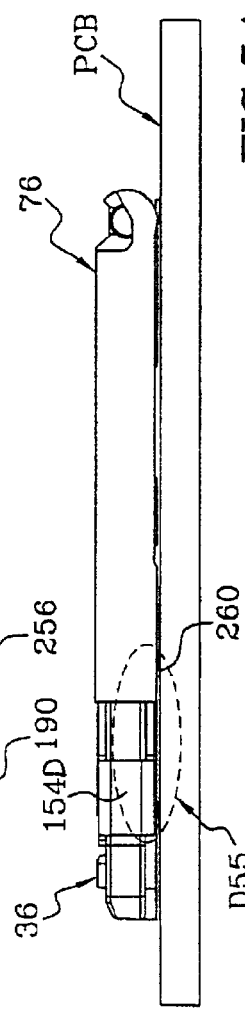
FIG. 54 is similar to FIG. 48.
Figure 55:
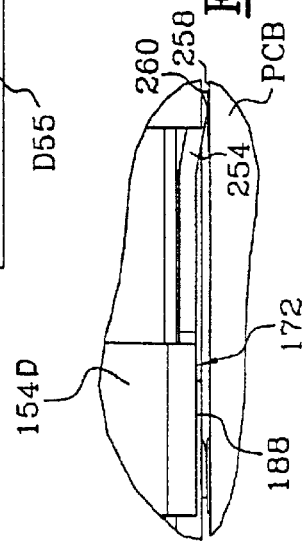
FIG. 55 is an enlarged view of region D55 of FIG. 54.
Figure 56:
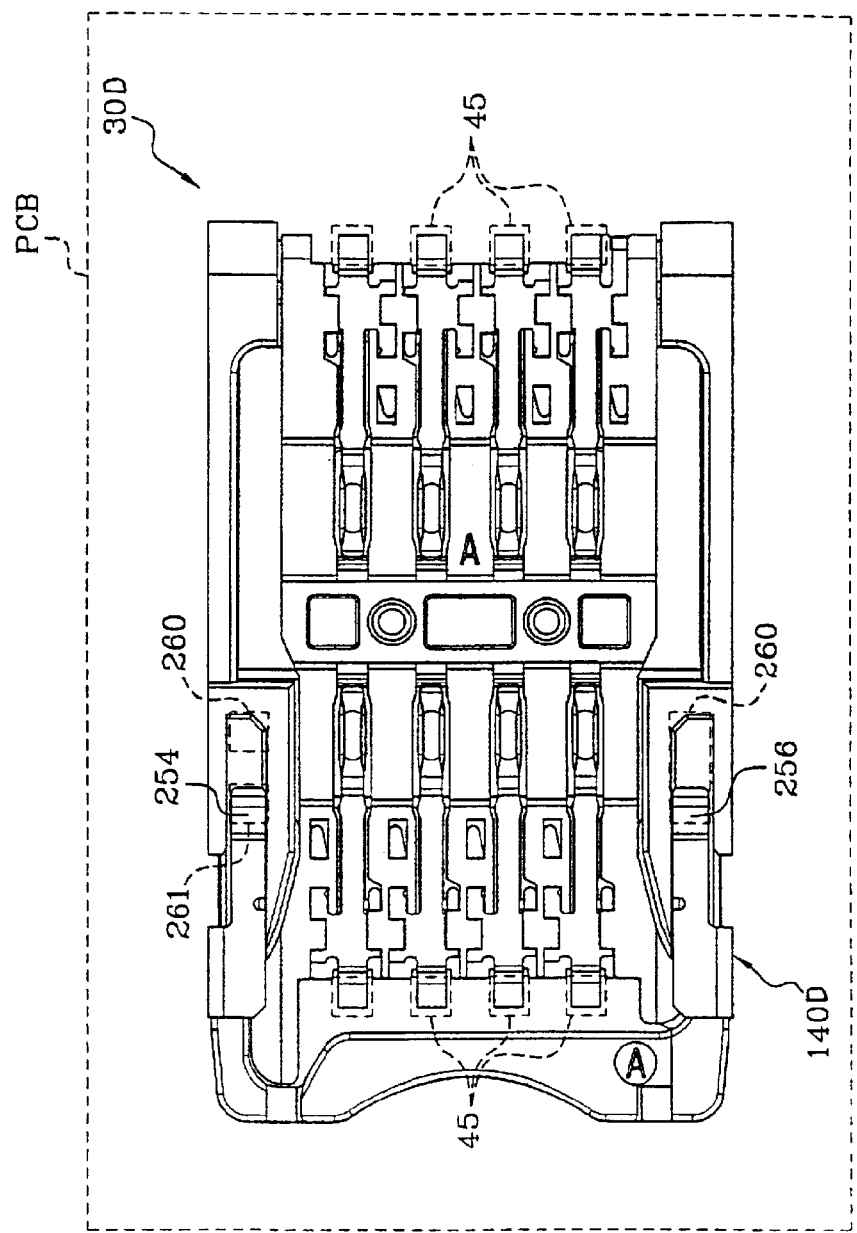
FIG. 56 is similar to FIG. 50.
Figure 57:
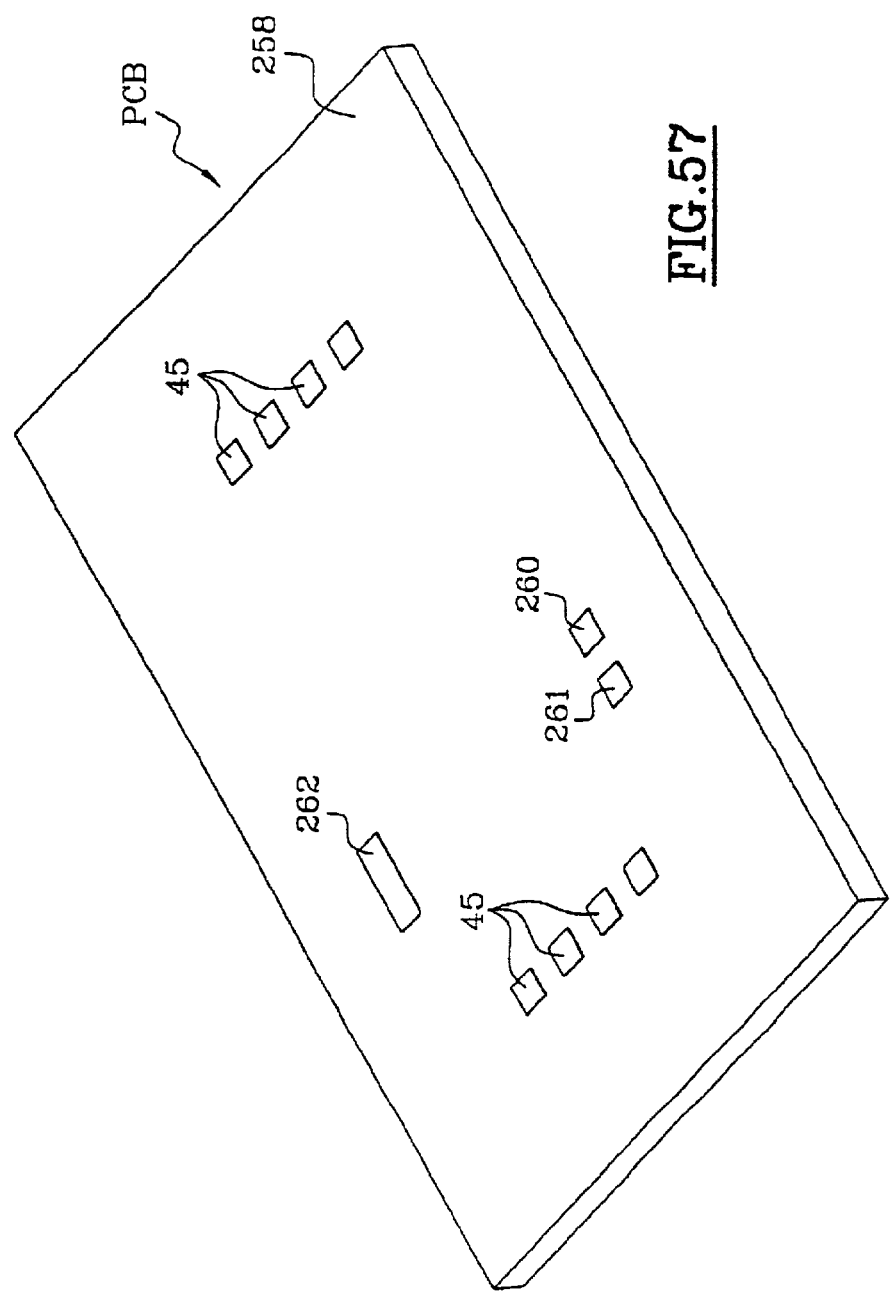
FIG. 57 is an isometric view of only the circuit board of FIG. 44.
Figure 58:
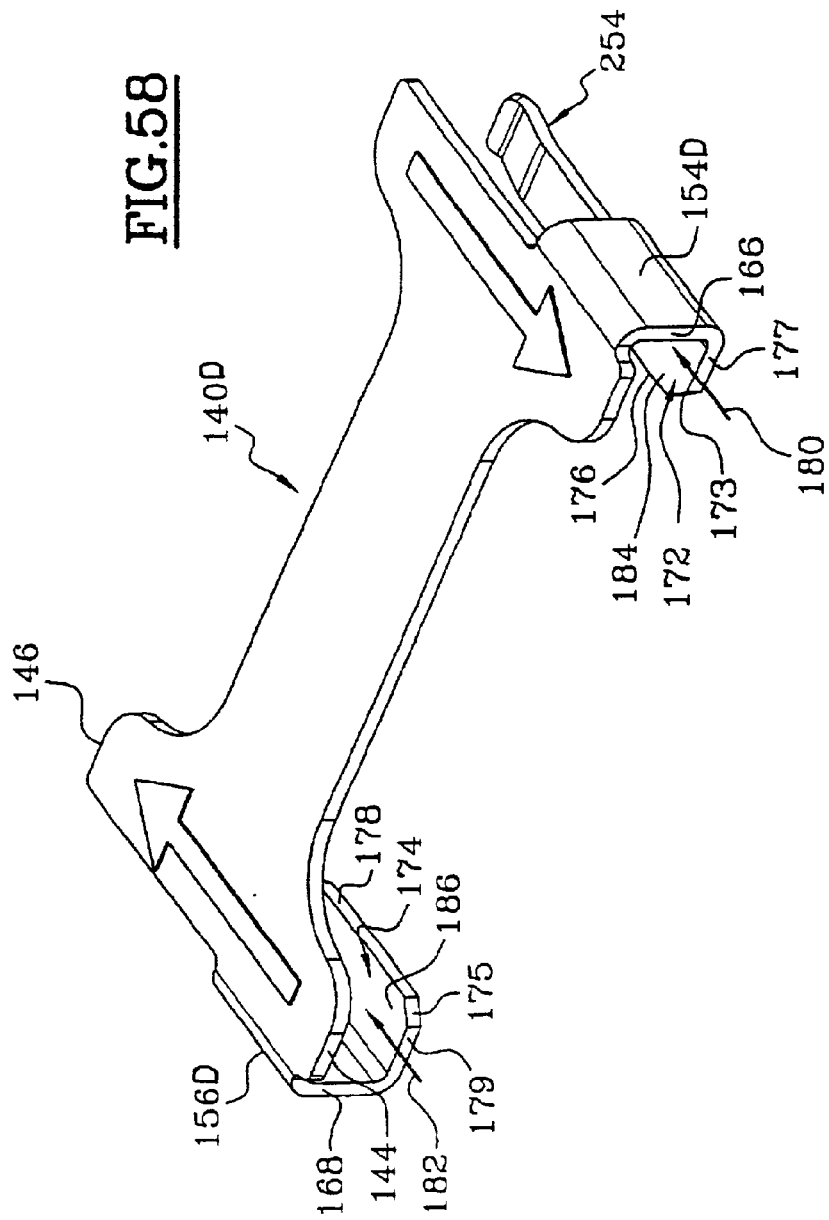
FIG. 58 is a front isometric view of only the locking member of the connector of FIG. 44.
Figure 59:
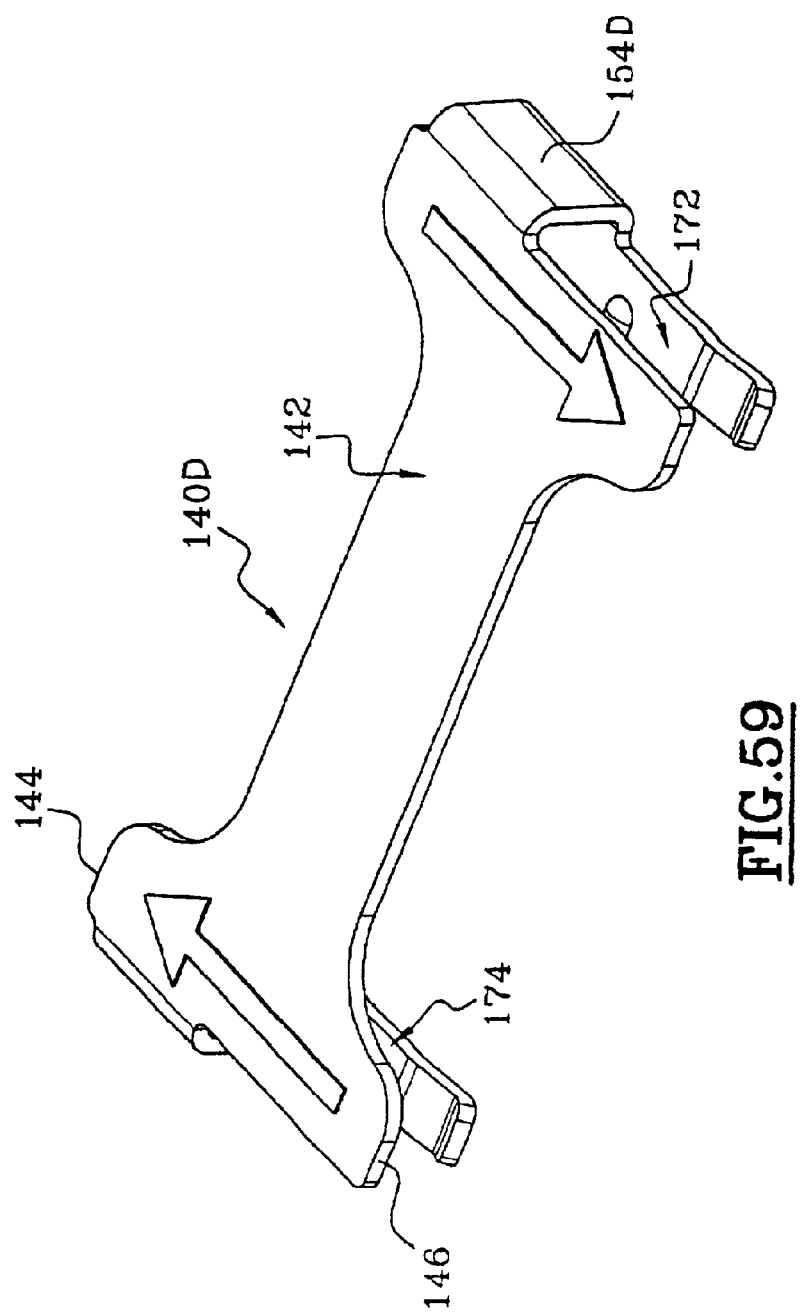
FIG. 59 is a rear isometric view of the locking member of FIG. 58.
Figure 60:
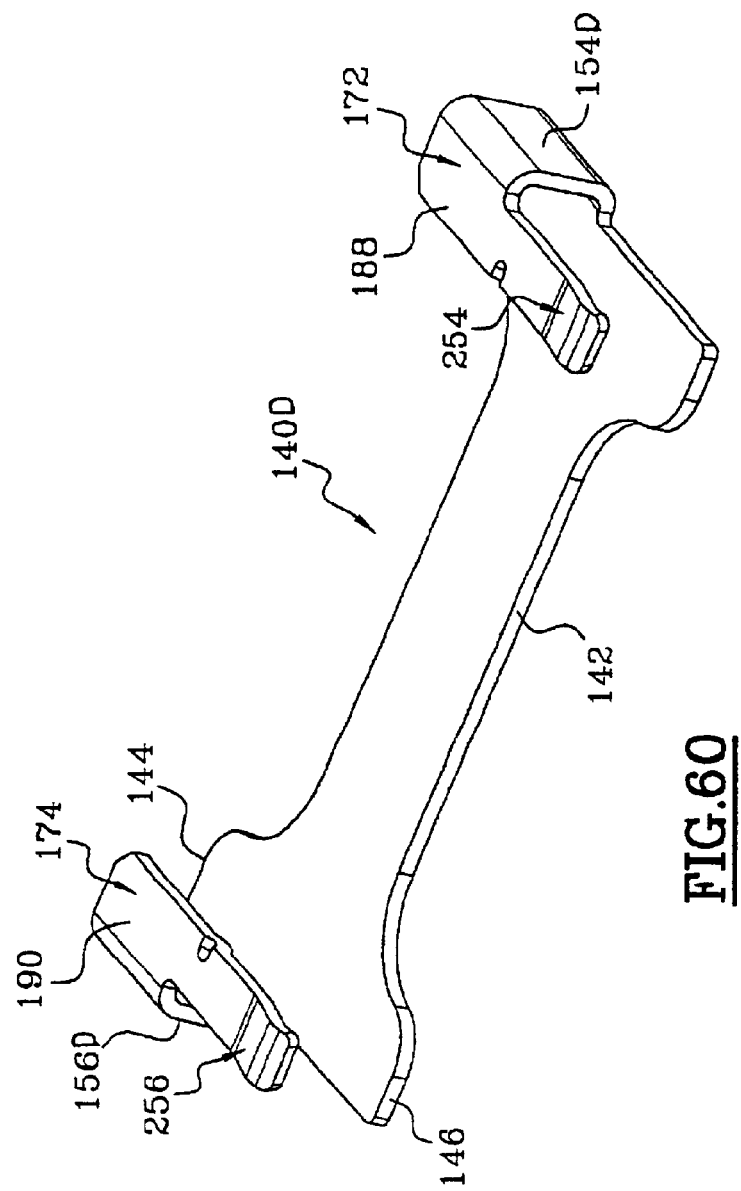
FIG. 60 is a bottom isometric view of the locking member of FIG. 59.
Figure 61:
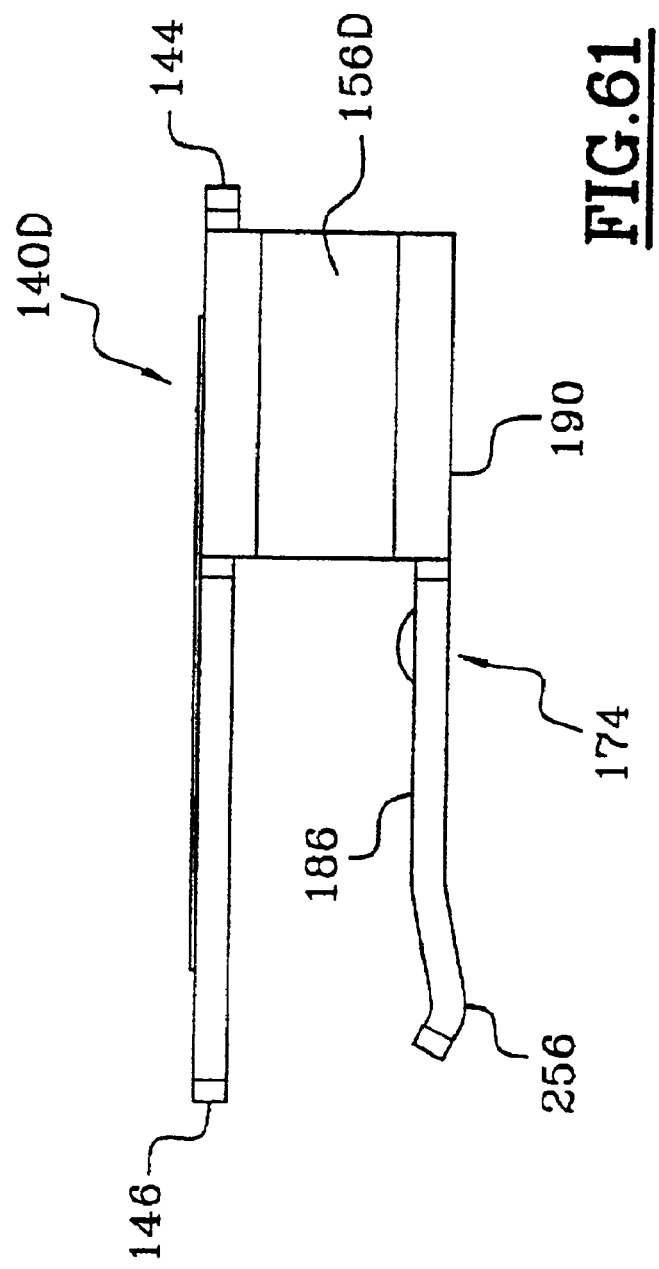
FIG. 61 is a side elevation view of the locking member of FIG. 59.

FIG. 44 illustrates another connector 30D and a printed circuit board PCB wherein opposite side portions 154D, 156D of the locking member 140D are designed to directly engage electrically conductive traces on the circuit board 99D. FIG. 46 shows that the lock parts 172, 174 are of the same construction as in the connector shown in FIG. 3, but the side portions are changed to form two branches 254, 256. As shown in FIG. 57, the circuit board forms a switch means that includes a long track 262 positioned to lie at one side of the connector base, and forms two short conductive pads or tracks 260, 261 positioned to lie adjacent to the opposite side of the base. The traces or tracks are conductive switching elements of a switch means. As shown in FIG. 58, the resilient contact branches 254, 256 extend rearwardly from the lock parts 172, 174. It is possible to form the circuit board tracks by plating, or even by attaching a blade to the circuit board.

FIG. 50 shows the position of the long track 262 and the positions of the short tracks 260, 261 on the opposite side of the connector. The contact branch 256 remains in continuous contact with the long track 262 as the locking member 140D moves between its locked and unlocked positions. However, the contact branch 254 on the opposite side of the connector engages only the front pad 261 in the locked position, and engages only the rear pad 260 in the unlocked position. Accordingly, current can flow from the long track 262 and through the locking member 140D to either the front pad 261 or rear pad 260, to enable a circuit connected to the circuit board to determine whether the locking member is in its unlocked or locked position. If the contact pad 262 is not connected to either of the other pads 260, 261, this indicates that the locking member is not fully downward or not fully locked or unlocked.

Figure 62:
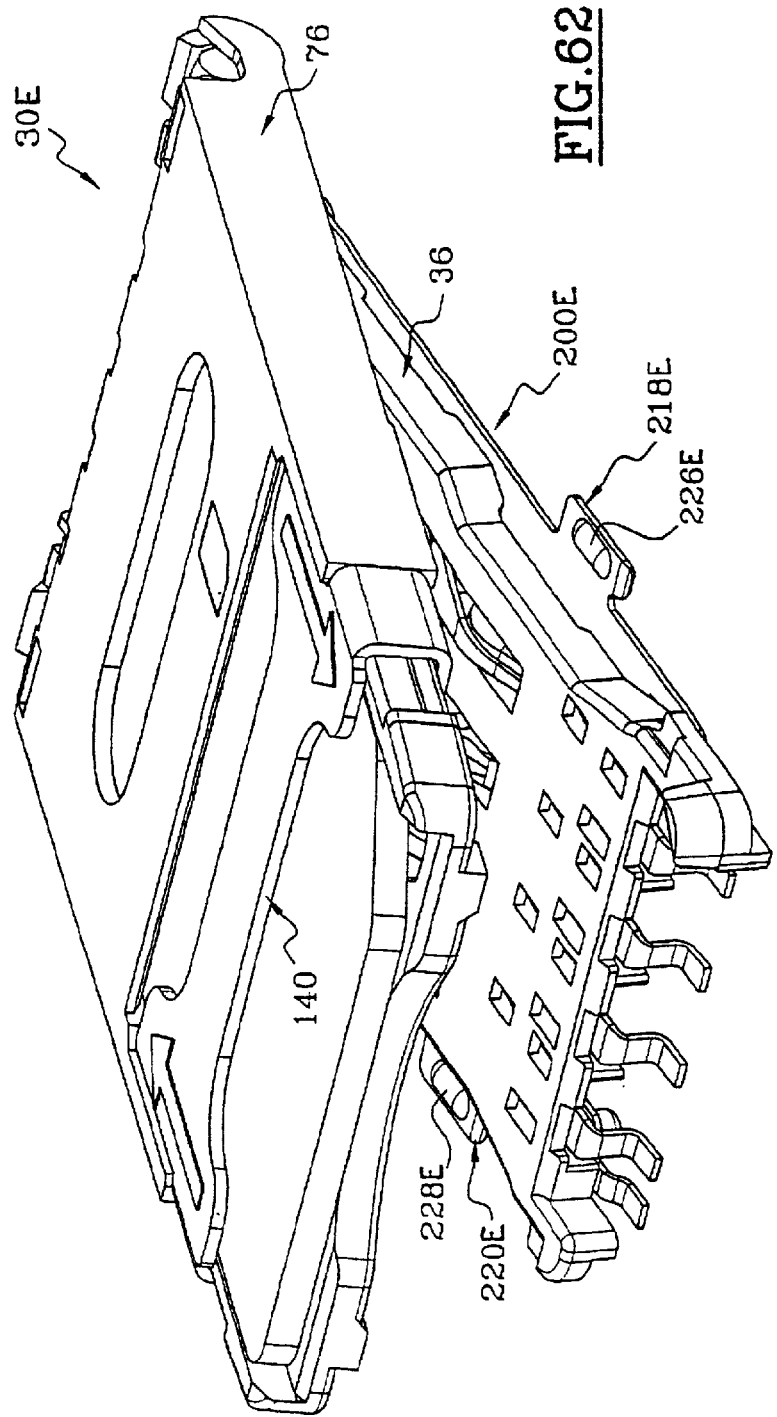
FIG. 62 illustrates a smart card connector of another embodiment of the invention which has deflectable switch blades, but with the switch blades positioned to open engagement with the locking member as the locking member moves to its locked position, the cover being shown partially open and the locking member being shown in its unlocked position.
Figure 63:
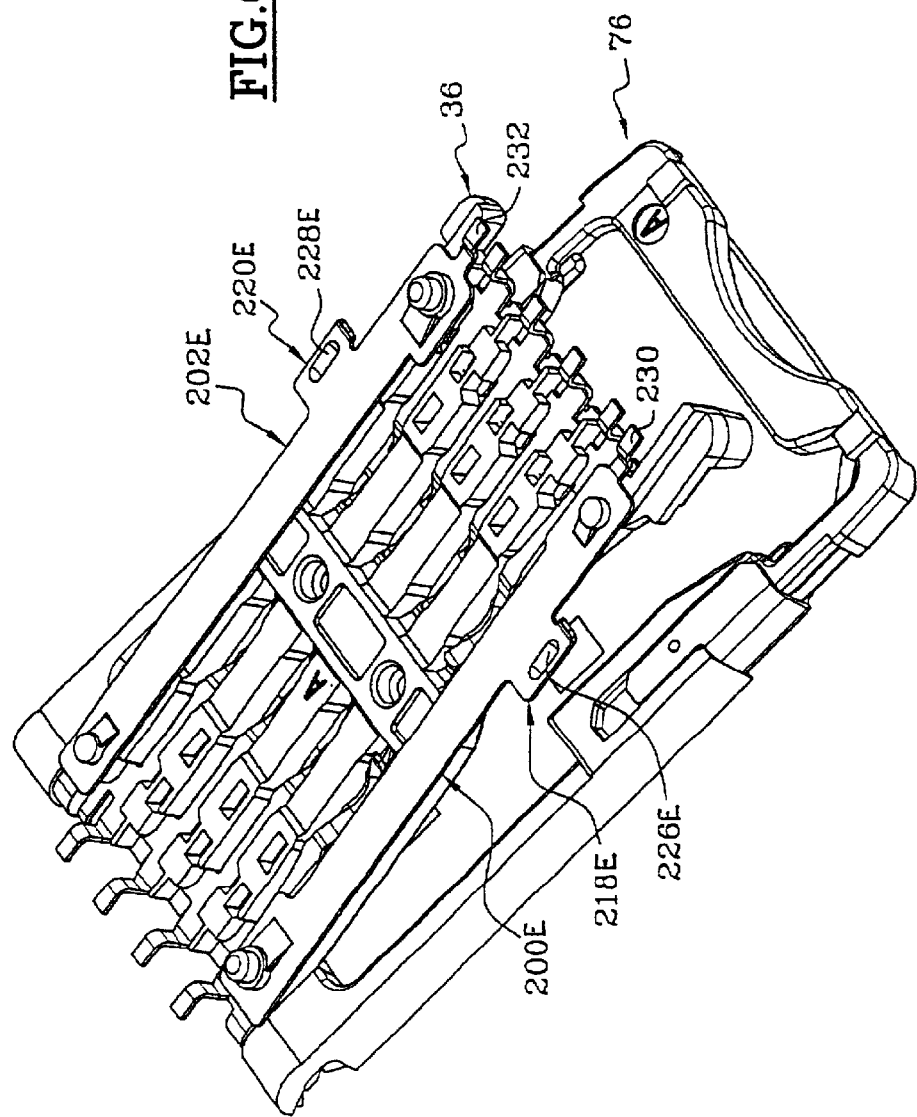
FIG. 63 is a bottom isometric view of the connector of FIG. 62.
Figure 64:
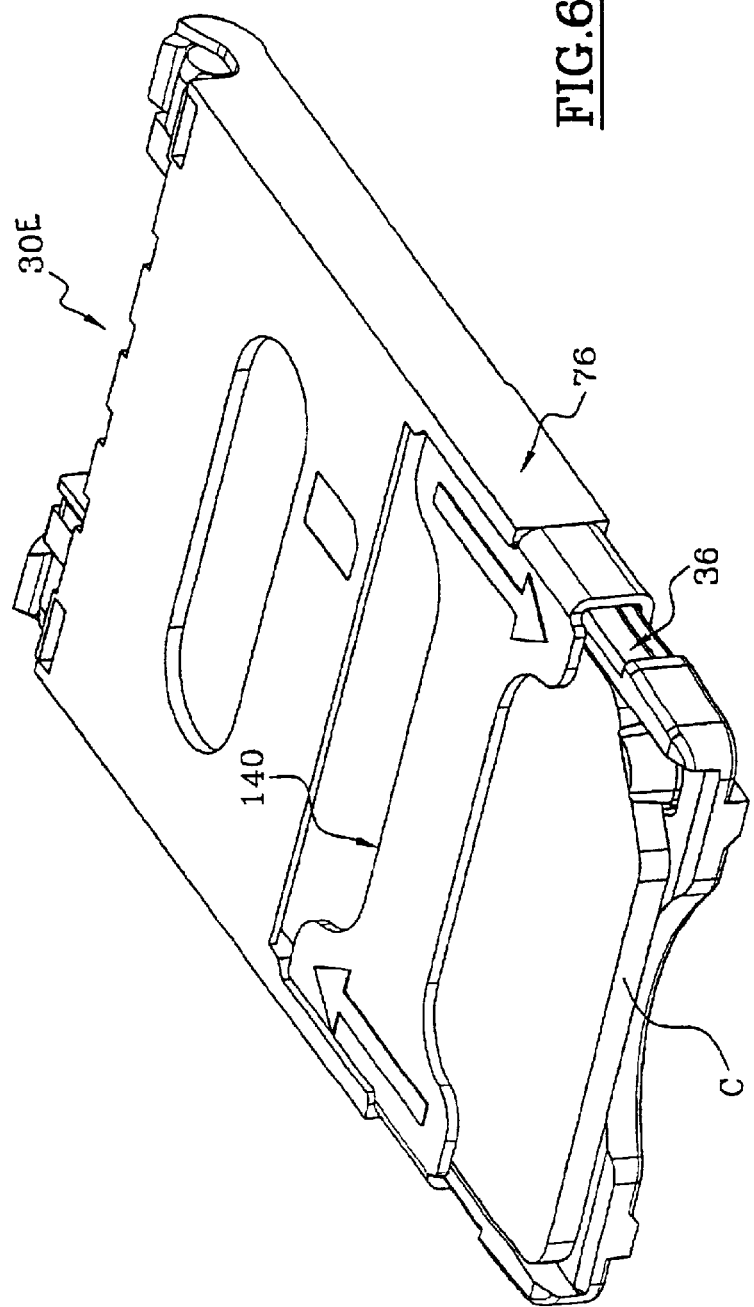
FIG. 64 is a view similar to FIG. 62, but with the cover fully closed and with the lock member in its unlocked position.
Figure 65:
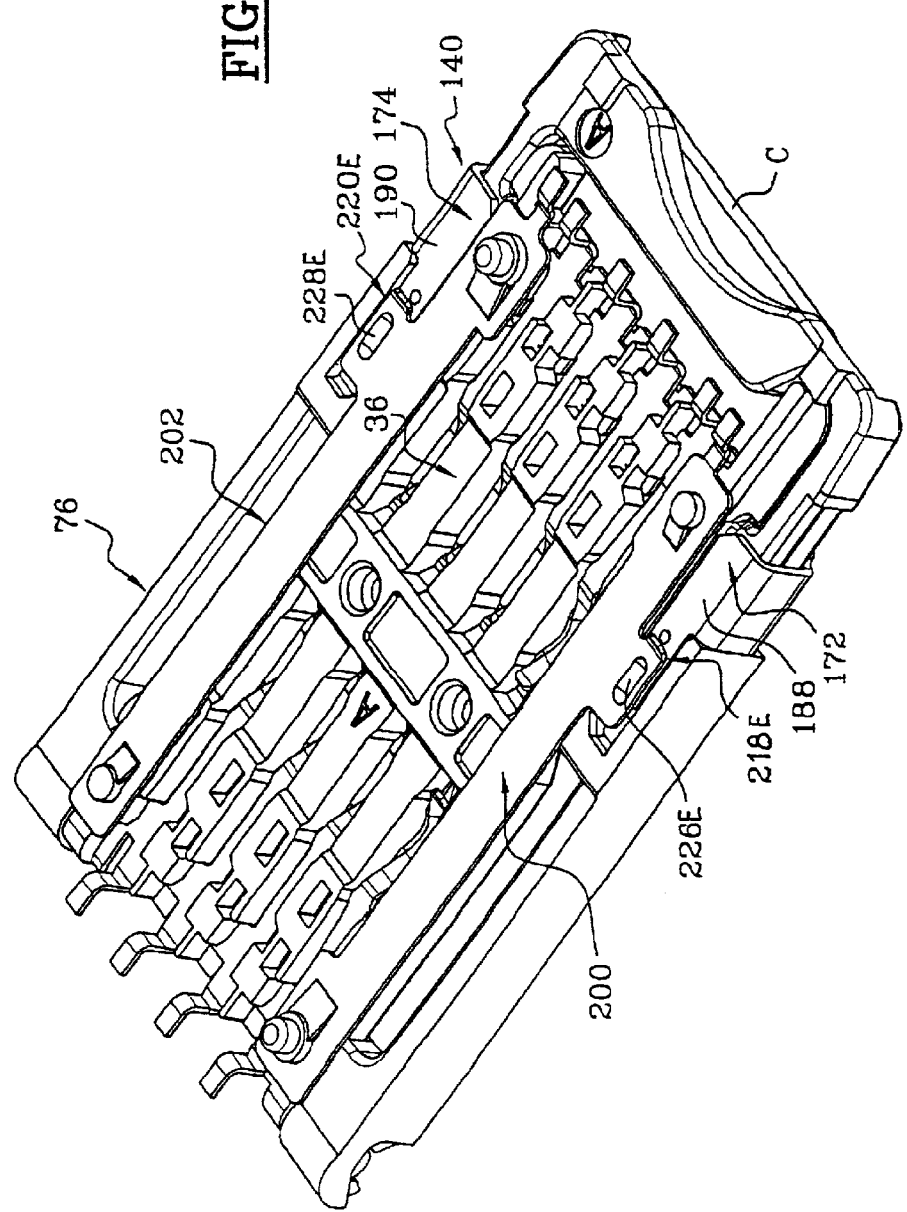
FIG. 65 is a bottom isometric view of the connector of FIG. 64.
Figure 66:
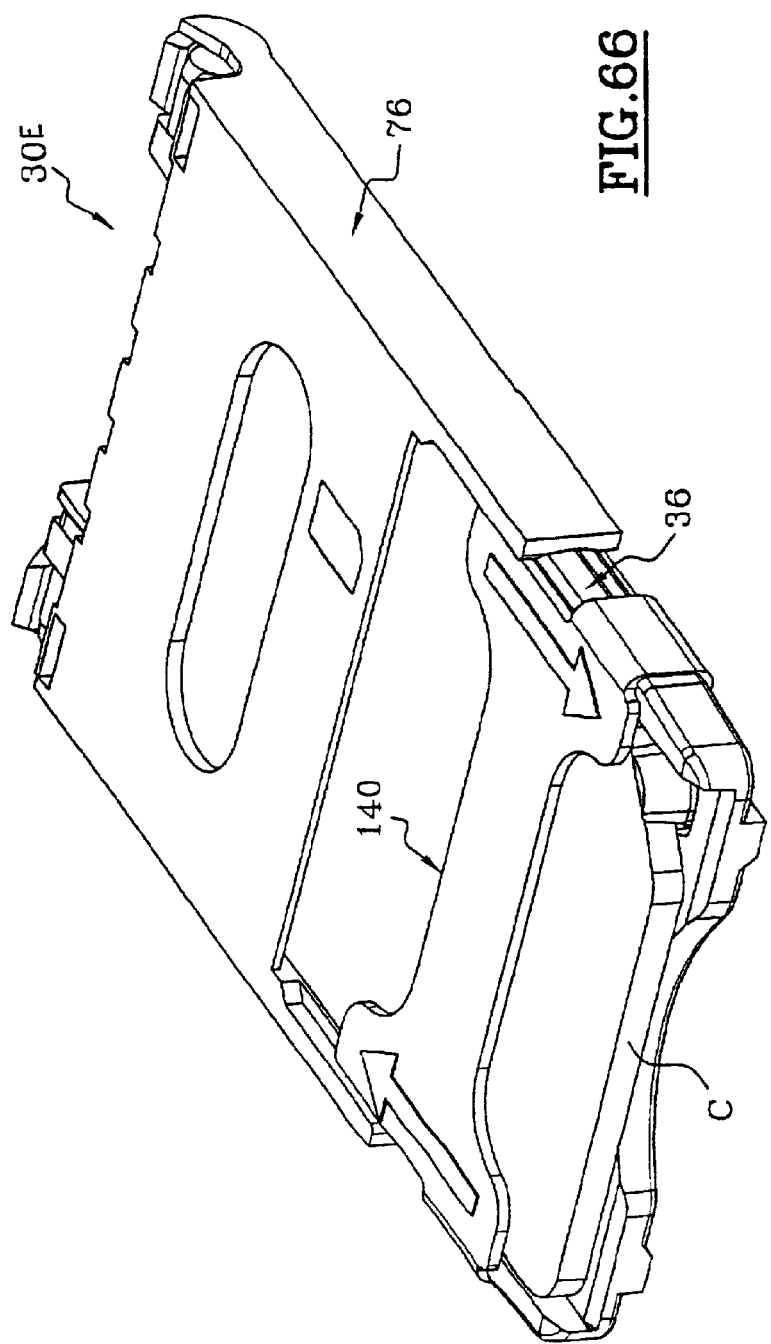
FIG. 66 is an isometric view of the fully closed connector of FIG. 64, and with the locking member in its fully locked position.
Figure 67:
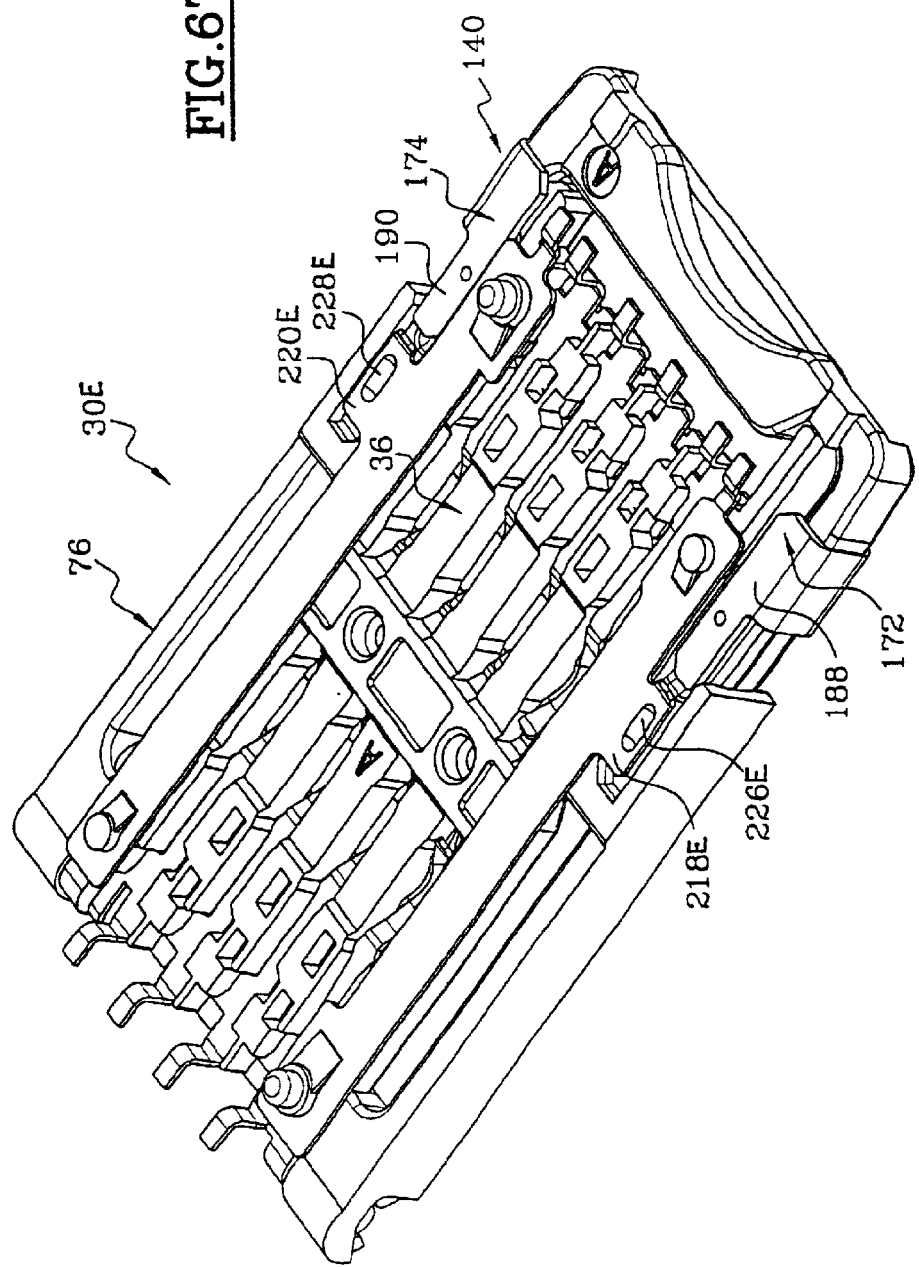
FIG. 67 is a bottom isometric view of the connector of FIG. 66.
Figure 68:
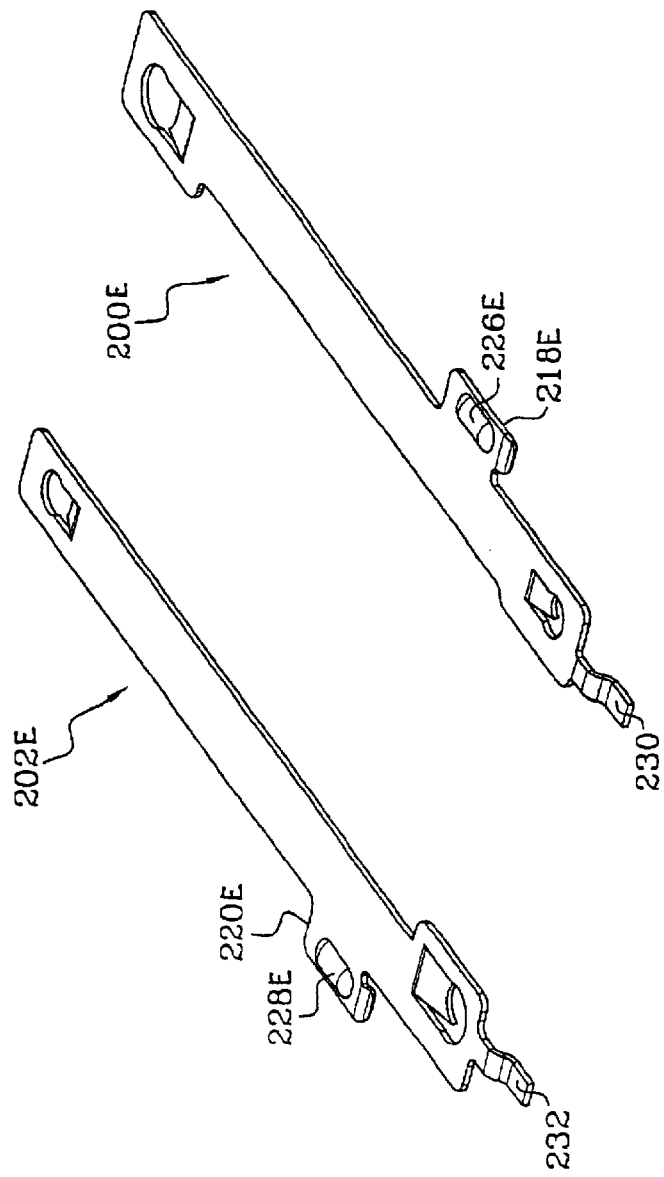
FIG. 68 is a top isometric view of the switch blades of the connector of FIG. 62.
Figure 69:
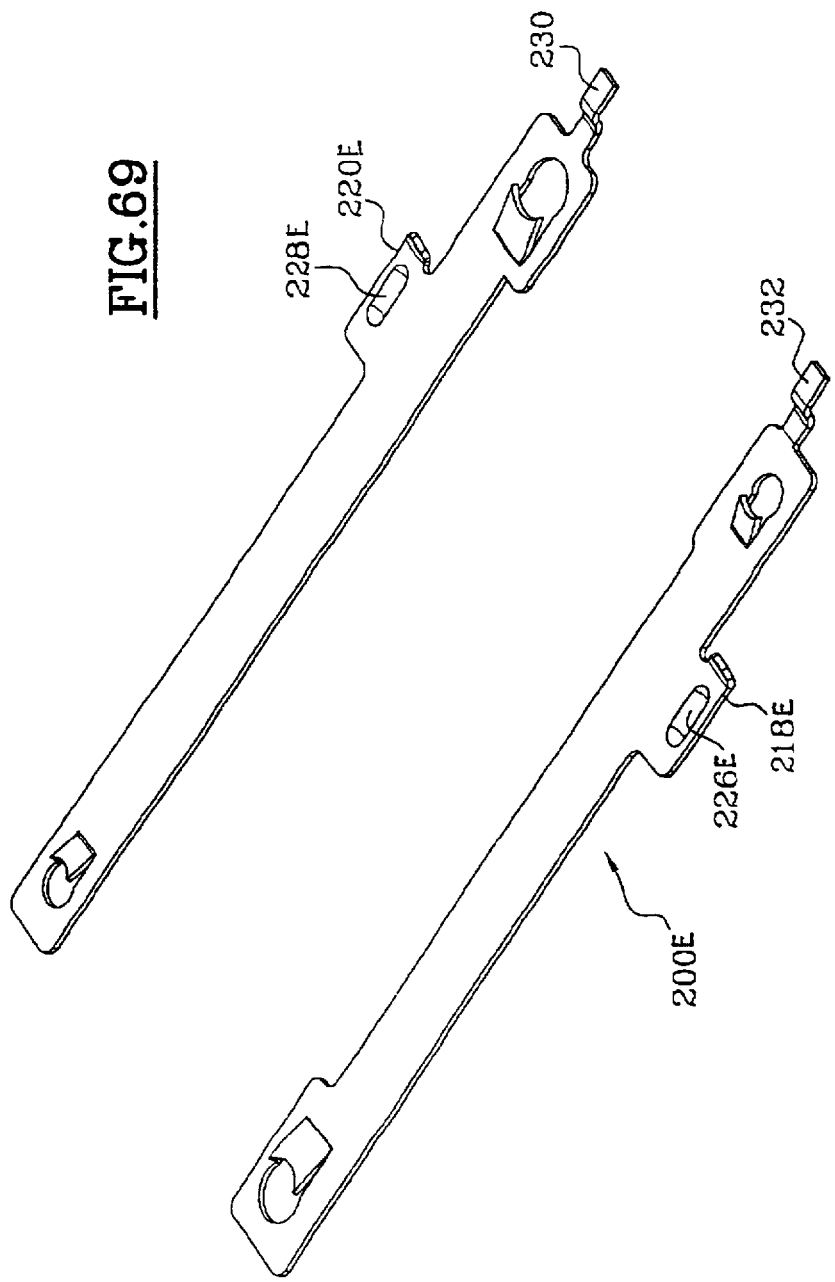
FIG. 69 is a bottom isometric view of the switch blades of FIG. 68.

FIG. 62 shows another connector 30E with switch blades such as 200E, with contact tabs 218E, 220E that are engaged by side portions of the locking member 140 only when the locking member is in its unlocked position. Each contact tab 218E, 220E has an upwardly-projecting contact boss 226E, 228E. As shown in FIG. 65, when the locking member 140 is in its unlocked position and its side portions with locking parts 172, 174 are rearward, the side portions lie engaged with the contact bosses 226E, 228E. When the locking member is moved forward to the locked position of FIG. 67, the side portions 172, 174 are out of engagement with the contact bosses 226E, 228E to open the lock sensing switch. It is noted that FIG. 68 shows the switch blades 200E, 202E have portions forward of the contact tabs 218E, 220E that extend inward toward each other to lie closer together than the contact tabs, to prevent the locking member from engaging the switch blades except at the contact tabs 218E, 220E.

Figure 70:
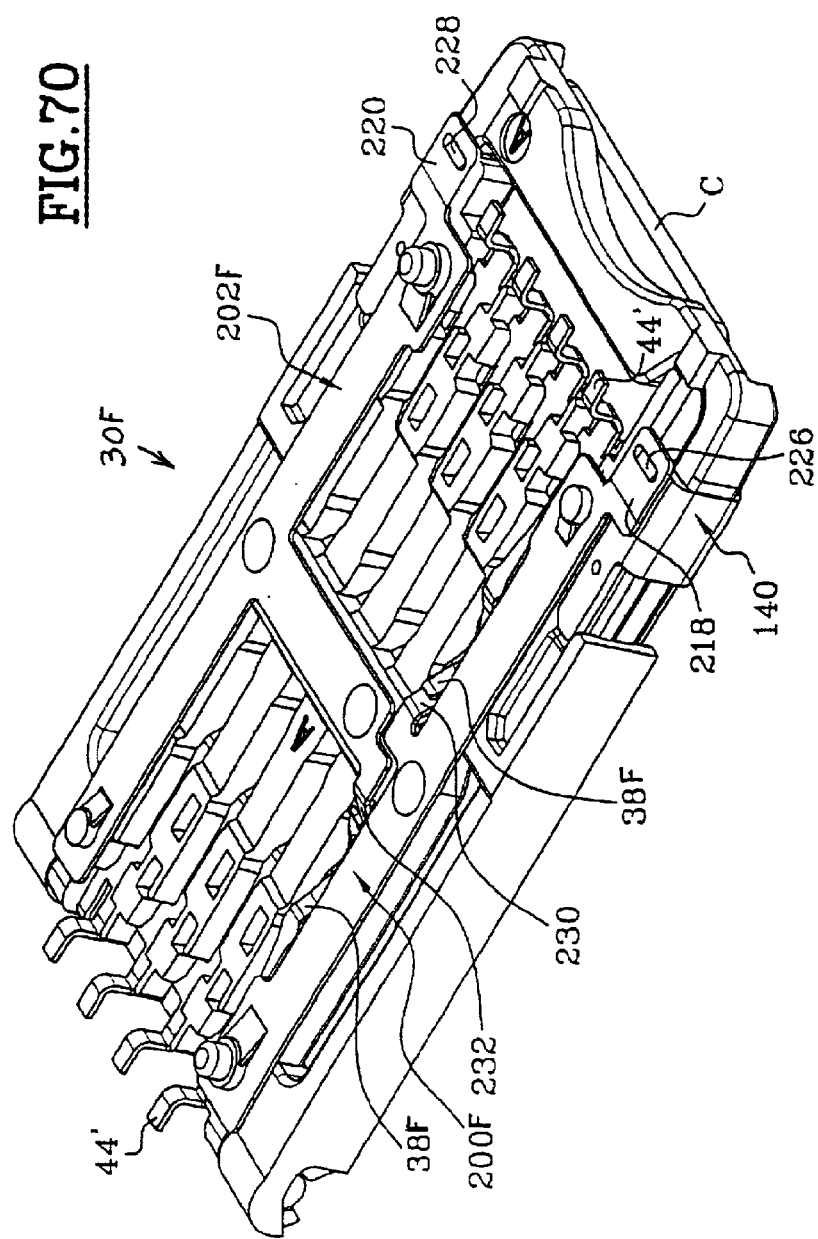
FIG. 70 is a bottom isometric view of a connector of another embodiment of the invention, wherein the switch blades that engage the locking member in its locked position, constantly engage contacts that detect closing of the cover.

FIG. 70 shows another connector 30F wherein each contact blade 200F, 202F has a tab 230, 232 that engage contacts 38F that detect only closing of the cover but not locking. As a result, only if the contact blades 30F detect that the cover is closed and the bosses 226, 228 engage side portions of the locking member 140, will a read/write circuit know that the cover is fully down and locked so that information can be read into and out of the smart card.

Figure 73:
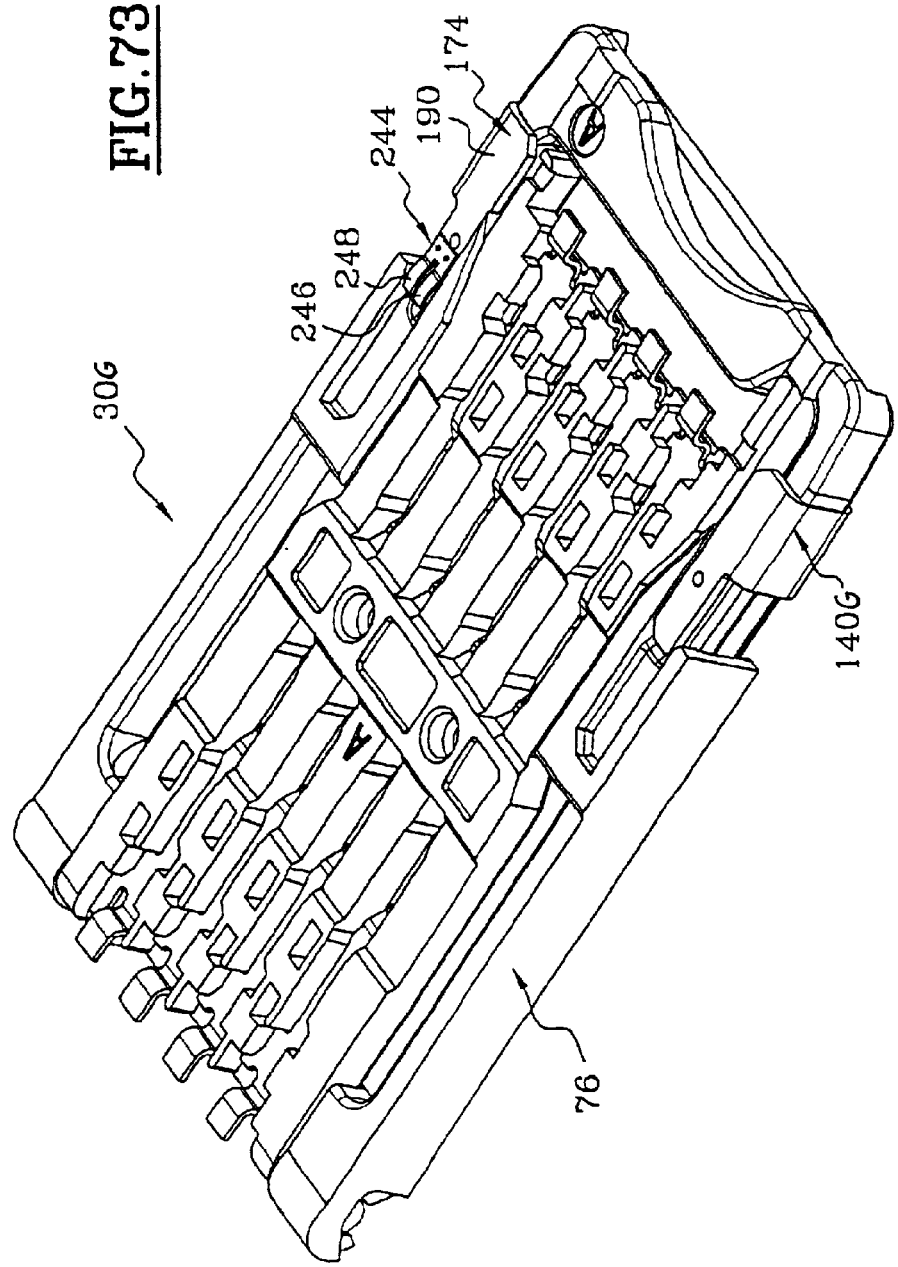
FIG. 73 is a bottom isometric view of a connector of another embodiment of the invention, wherein a locking member side portion at only one side of the connector is constructed to engage a plurality of traces on a circuit board.
Figure 74:
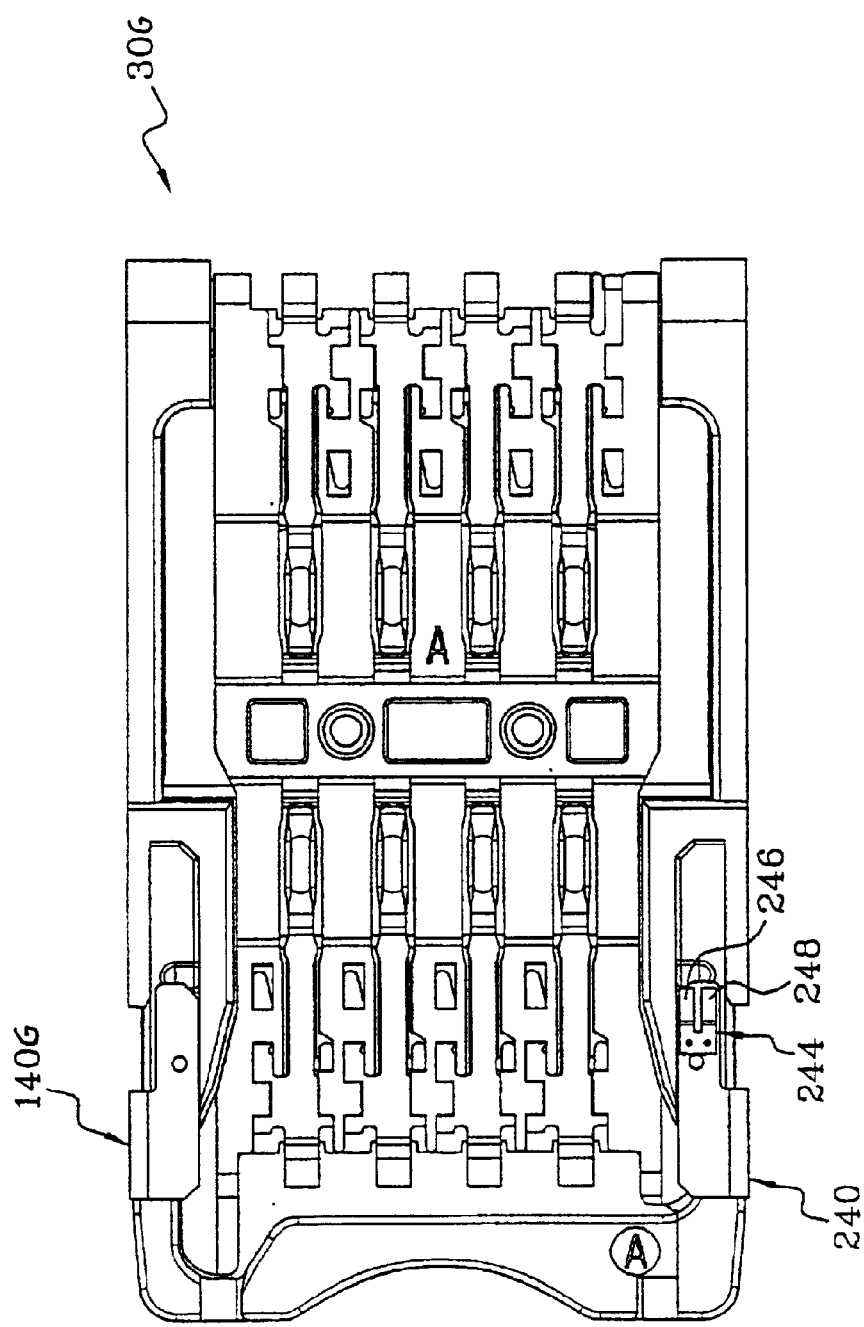
FIG. 74 is a bottom plan view of the connector of FIG. 73.
Figure 75:
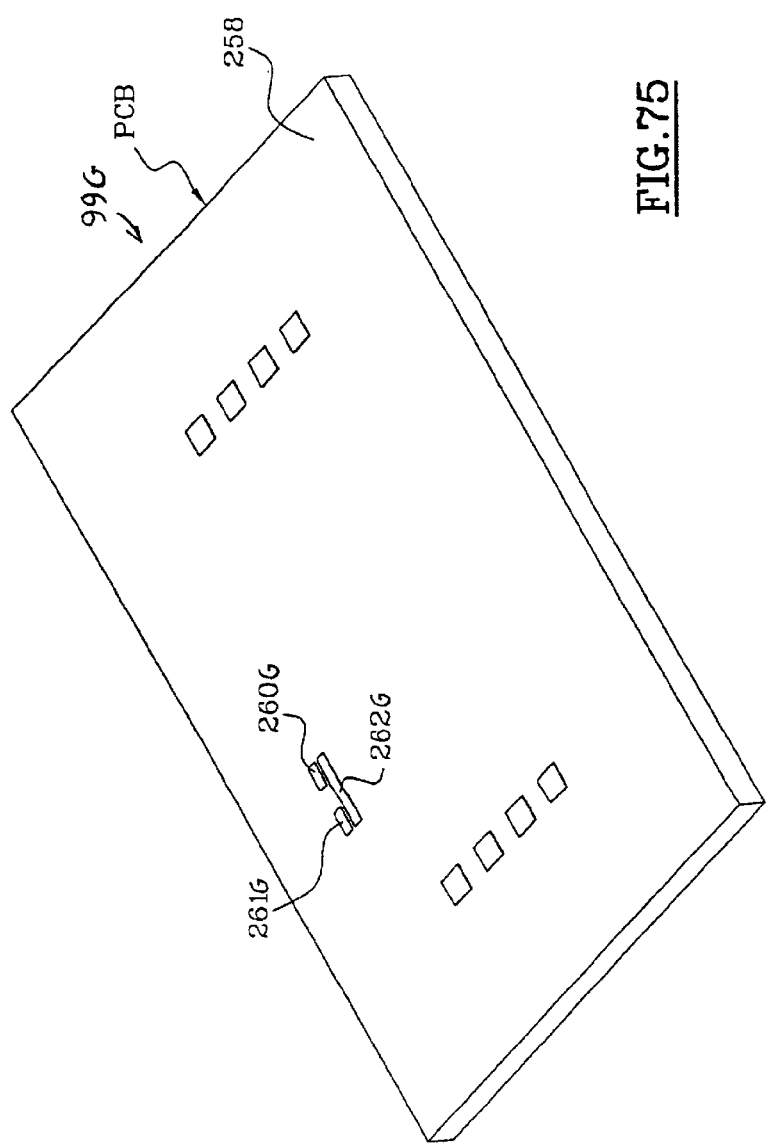
FIG. 75 is a top isometric view of a circuit board that is used in conjunction with the connector of FIG. 73.
Figure 76:
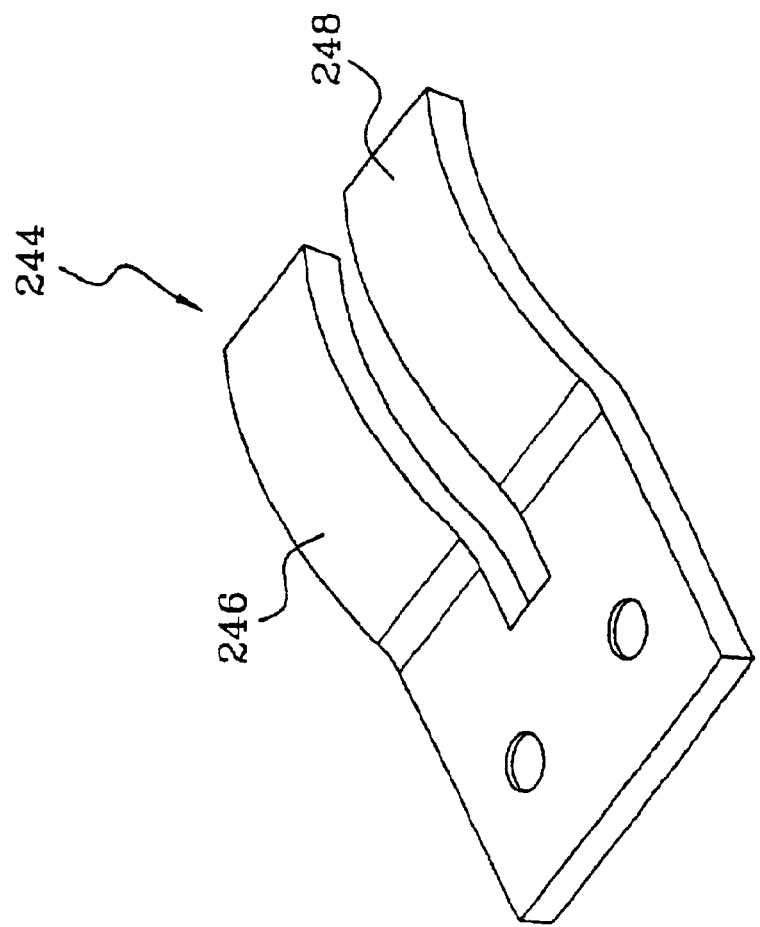
FIG. 76 is a bottom isometric view of a contact that is mounted on the locking member and that is shown in FIG. 73.

FIG. 73 illustrates a connector 30G wherein a contact pad 244 is provided that is attached to only one of the side portions of the locking member 140G. The contact pad 244 has two resiliently-deflectable branches 246, 248 that each can engage conductive tracks on a circuit board. FIG. 75 shows a circuit board 99G with one long track 262G that is constantly engaged by one of the contact branches 246 and two short tracks 260G, 261G that are engaged by the other branch 248 as the branch 248 moves between the unlocked and locked positions of the locking member. Current can flow from one of the short pads 260G, 261G and through the contact pad 244 of the locking member to the long track 262G. FIG. 76 shows details of the contact pad 244 which has a pair of holes that can receive rivets to attach to the locking member to alter one side portion of the locking member.

Figure 77:
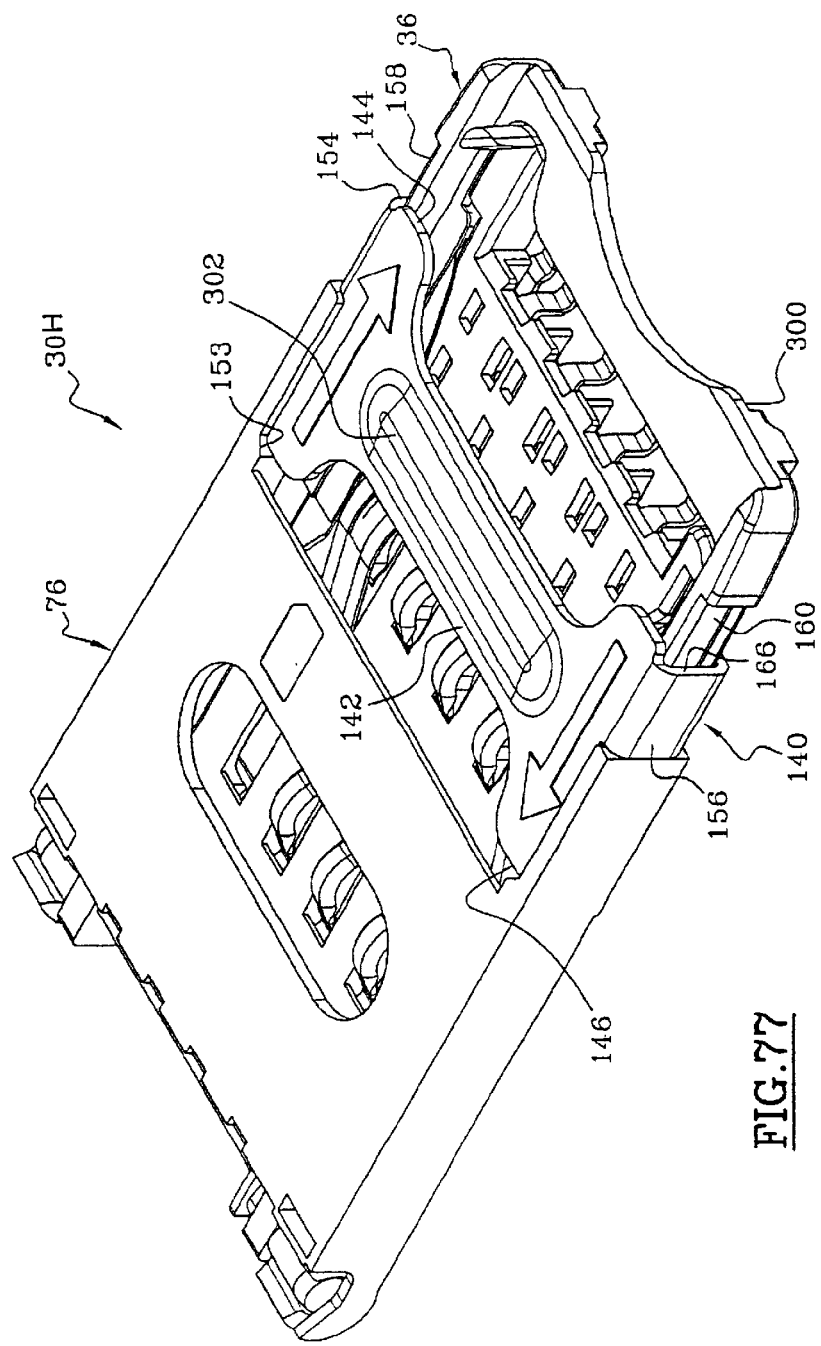
FIG. 77 is top isometric view of a connector of another embodiment of the invention, which includes contact blades on opposite sides that respectively open engagement and close engagement with the locking member when the locking member moves between its locked and unlocked positions.
Figure 79:
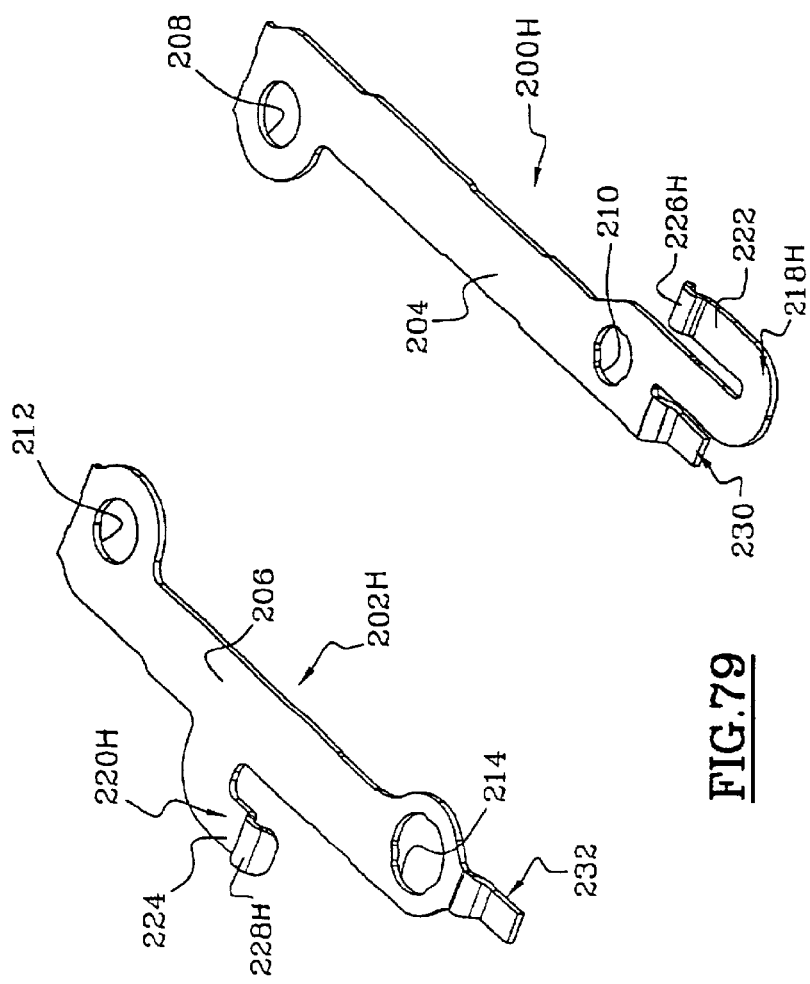
FIG. 79 is a top isometric view of the two switch blades of the connector of FIG. 78.
Figure 81:
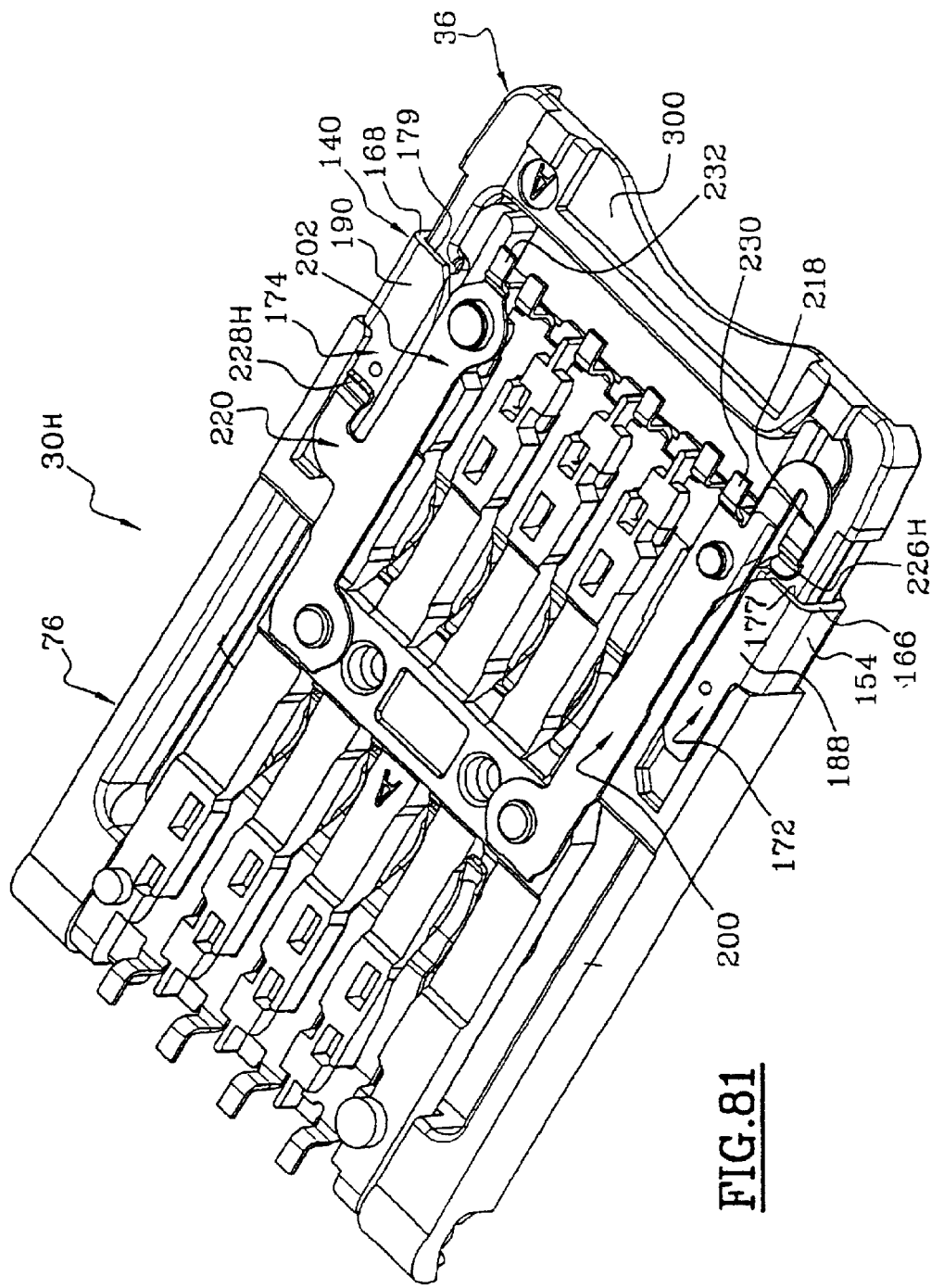
FIG. 81 is a bottom isometric view of the connector of FIG. 77.

FIG. 77 shows a connector 30H with switch blades shown in FIG. 81 at 200H, 202H. The contact boss 226H of one switch blade engages a lock part 172 of a side portion of the locking member only when the locking member has been moved almost halfway towards to the lock position. The contact boss 228H of the other switch blade engages a corresponding side portion when the locking member is in the open position. Both contact bosses engage a locking member side portion halfway between the locked and unlocked positions. This results in an open-closed-open switch sequence. As shown in FIG. 79, each of the switch blades has a contact tab 218H, 220H, one extending from the front and the other extending from the middle of the blade, and both extending in a U. It is noted that this switch enables a circuit connected to the switch blades to determine the direction of the locking member as well as its position.

Figure 91:
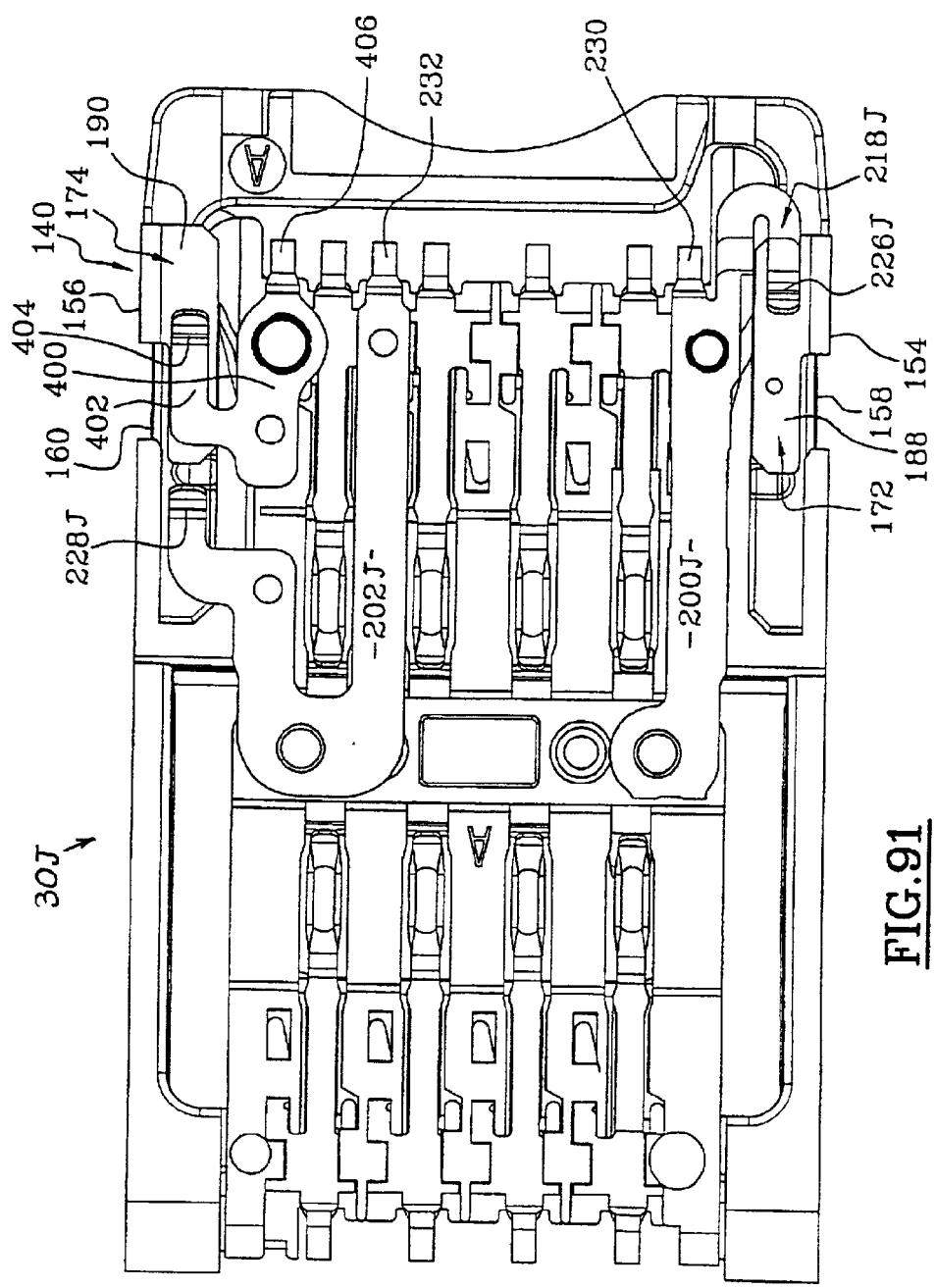
FIG. 91 is a bottom isometric view of a connector of another embodiment of the invention, wherein three switching blades are provided to directly sense unlocked and locked positions of the locking member.
Figure 92:
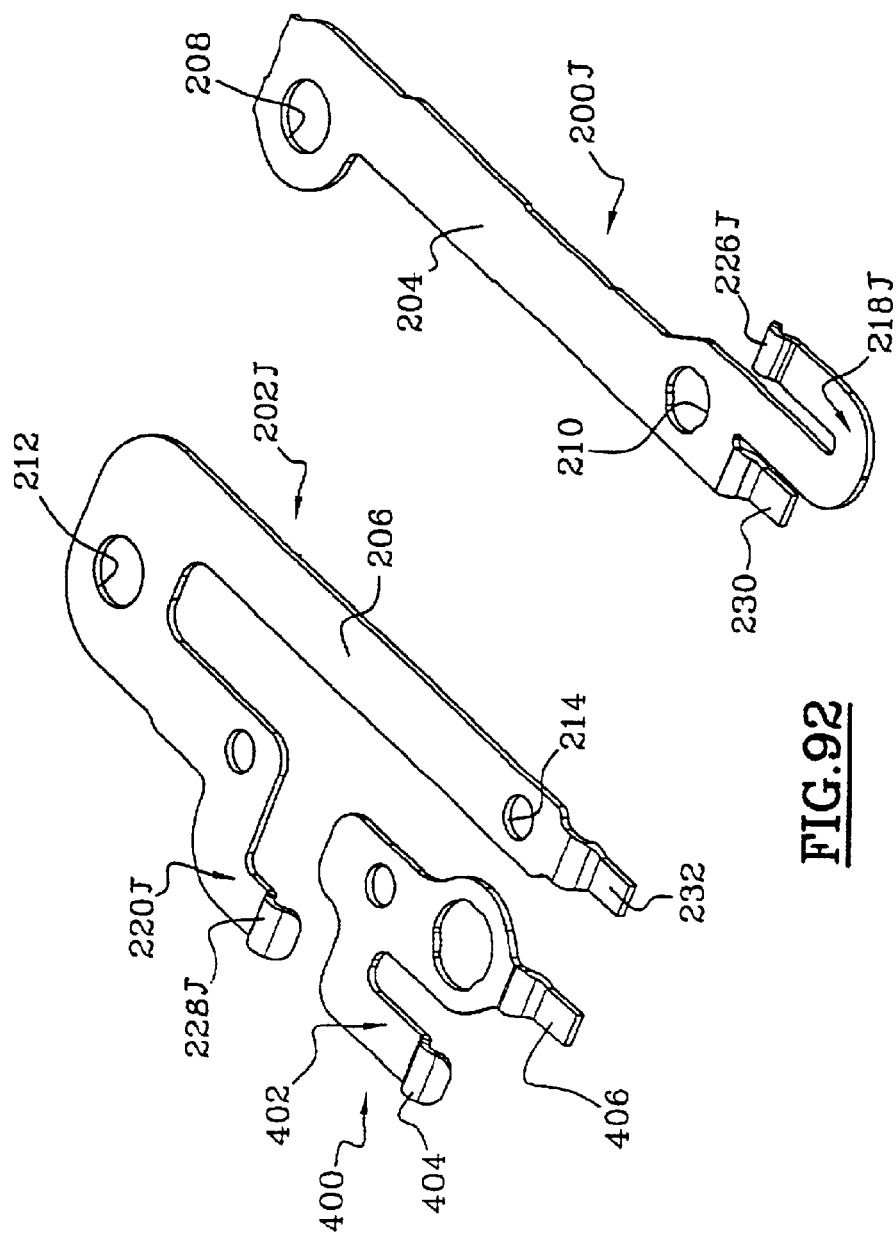
FIG. 92 is a top isometric view of the three switching blades of the connector of FIG. 91.
Figure 93:
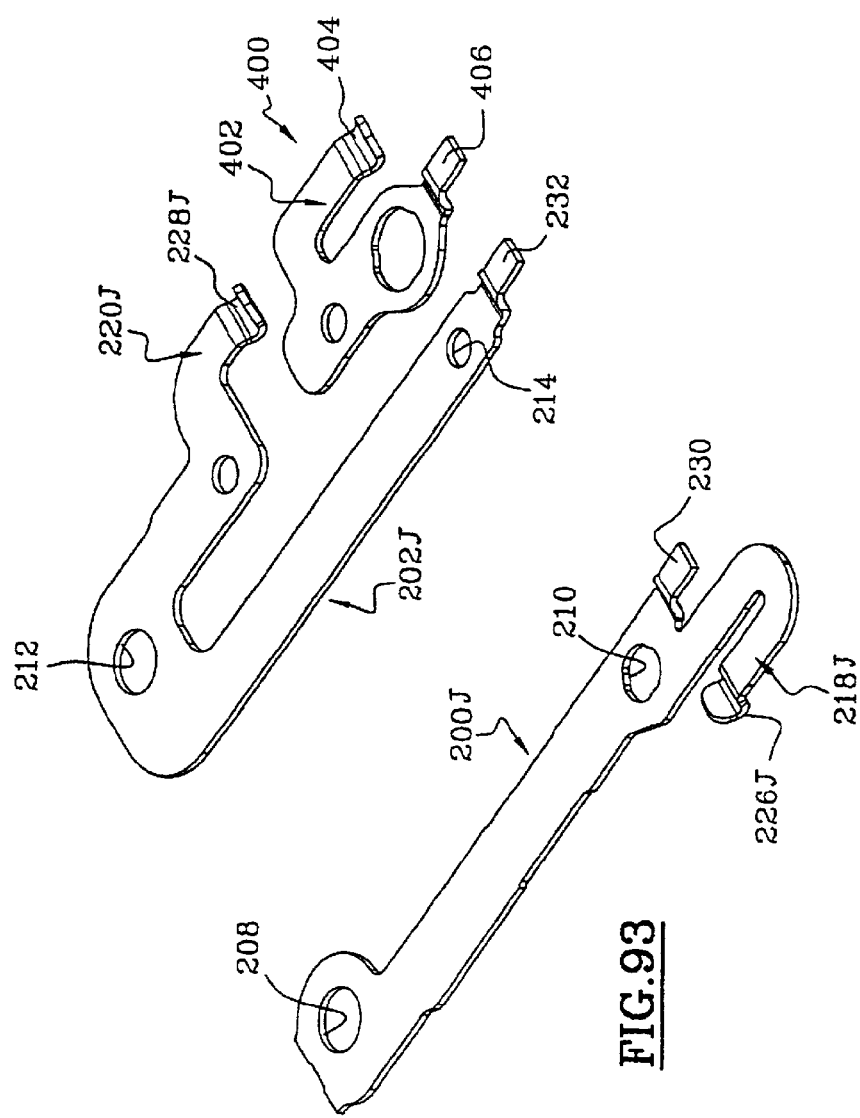
FIG. 93 is a bottom isometric view of the three switching blades of FIG. 92.

FIG. 91 illustrates a connector 30J that allows a circuit to determine, at any time, the position and direction of movement of the locking member. The connector includes three switch blades, including the switch blades 200J, 202J and a third one 400. Contact bosses 228J and 404 on the blades 202J, 400 pass a current through a side portion 156 of the locking member in its unlocked position. Contact bosses 404 and 226J pass a current through the locking member in its locked position.

While terms such as "top", "bottom", "horizontal", etc. have been used to describe the invention as it is illustrated, it should be understood that the invention can be used in any orientation.

Thus, the invention provides smart card connectors that are usually mounted on circuit boards, that enable circuits connected to traces on the circuit board to determine when a locking member of a fully closed cover, is in its locked position. The locking member has side portions at opposite sides of the cover and base, with lock parts that can slide under largely downwardly-facing base shoulders on the base frame to lock the cover to the base. The same side portions of the locking member engage contact conductive parts of switch means lying in the path of the locking member side portions. This provides contact between one or both side portions of the locking member and the conductors of the switch means to allow current to flow through the locking member. It is possible, in a connector with switch contacts that detect when the cover is closed and a card is present, to pass current from a conductor in contact with a locking member side portion, through a portion of the locking member and through at least one of the switch contacts. In one set of connectors, the switch means are formed by resilient sheet metal switch blades with active portions that are deflected by the side portions of the locking member. In another set of connectors, the side portions of the locking member have resilient tabs that engage conductive traces on the circuit board. It is even possible to not rely on conductivity of the locking member, but instead use each side portion of the locking member to move a resilient switch blade against another conductive element to complete a circuit.

Although particular embodiments of the invention have been described and illustrated herein, it is recognized that modifications and variations may readily occur to those skilled in the art, and consequently, it is intended that the claims be interpreted to cover such modifications and equivalents.

MORE DETAILED DESCRIPTION OF THE PREFERRED EMBODIMENT

FIGS. 1 to 13 show an electrical connector 30 for electrical connection of a card C which here is a contact smart card having, on its lower face 32, parallel electrical connection areas 34 oriented longitudinally, that is to say parallel to the direction of insertion I of the card C into the connector.

The connector 30 essentially consists of a lower base 36 made of insulating plastic which, according to a known design, serves as a support for a series of electrical contact blades 38, called signal blades, made of conducting material, which in this case number six, i.e. three pairs of signal blades aligned longitudinally in pairs.

Each signal blade is oriented longitudinally and is inserted into the base 36. As a variant, the base may be overmoulded around the contact blades. Each blade 38 has a convex free contact end 40 which projects vertically above the plane horizontal upper face 42 of the base 36 in order to allow it to come into contact with a corresponding area 34 on the card C when the latter is in the connection position. Each blade has another free end 44 called the connection free end which extends longitudinally at the front transverse edge 46 or rear transverse edge 48 of the base 36 in order to allow this end to be connected, by soldering or brazing, to a conducting track 45 on a printed-circuit board PCB (shown in FIGS. 45 to 57) on which the base 36 rests via its horizontal lower face 50.

The lower face 50 may include studs 33 for positioning the base 36 on the printed-circuit board and/or feet 37 which raise the connector.

As may be seen especially in FIG. 13, the base 36 is bounded transversely by two vertically oriented parallel longitudinal edges 52 and 54.

Near the front transverse edge 46, each longitudinal edge 52, 54 has a locking tab 56, 58 which extends transversely outwards and the thickness of which is less than that of the base 36 so as to leave a vertical gap between the lower faces 60, 62 of the tabs and the lower face 50 of the base 36.

The tab 56, the length towards the front of which is greater than that of the other tab 58, has, on its upper face 64, a vertical finger 66 for polarizing the card and for longitudinal retention of the card in its housing, this being in the case in which the card C is a card of the "MICROSIM" type, the rear transverse edge 68 of which has a corner or angle 70 cut at 45°.

It is thus possible to retain the card without making use of a partition or of an additional thickness extending transversely from the upper face of the base, and therefore to shorten the base.

In its rear part, the base 36 has two portions 72 and 74 of a cylindrical hinge pin, which extend transversely towards the outside from the longitudinal edges 52 and 54.

The portions 72 and 74 serve for mounting a cover 76 on the base 36, the cover forming a receptacle for the card C and being hinged on the rear part of the base 36 about a geometrical axis X—X coaxial with the portions 72 and 74.

The cover 76 has the general shape of a frame, moulded from plastic. It consists essentially of two lateral and parallel uprights 78 and 80 which are connected together, near their front longitudinal free ends 82 and 84, by a transverse platform in the form of a flat bar 86.

The plane horizontal upper face 88 of the bar 86 constitutes a plane of repose P of the card C in a housing of complementary shape formed in the upper face 92 of the cover 76.

The rear transverse edge 87 has an internal notch 89 for passage of the finger 66, the cover thus having a hole or orifice allowing the polarizing finger to pass through the cover. The front edge has a recess 85 for making it easy to handle the card C during its insertion, in order to ensure that it is fully inserted, and for making it easy to remove it.

The plane of repose P, on which the lower face 32 of the card C rests, is coplanar with the coplanar upper faces of two opposed slideways which extend transversely towards the inside of the frame from the internal opposed transverse faces facing the uprights 78 and 80.

The lower faces 112 and 114 of the front parts of the uprights are offset upwards with respect to the plane of the lower face 110 of the cover 76 so as to leave a vertical gap between these faces 112 and 114 and the plane of the lower face 110 of the cover 76.

The structure of the cover, in the form of a frame with a central recess, is strengthened by a rear upper plate 116, of very small thickness, which is extended by its lower face approximately coplanar with the upper face 92 of the cover 76 and substantially along the rear half of the uprights 78 and 80.

There is a vertical gap between the lower face of the upper plate 116 and the plane of repose P, which is very slightly greater than the thickness of the card C so as to allow the latter to be able to be inserted, in a direction of insertion I of the card C, under the plate 116 and until the front transverse edge 117 of the card C butts against the facing transverse edge 121 of a piece 122 of additional thickness constituting a strip for reinforcing the rear end of the plate 116.

The plate 116, which extends above the front part of the card C when the latter is fully inserted, thus helps to retain the card C in the housing in order to prevent it from escaping vertically upwards and it helps to guide the card C at the end of its insertion.

Near their rear ends, the uprights 78 and 80 are enlarged transversely inwards in order to form two bearing surfaces 126 and 128 which receive the hinge pin portions 72 and 74.

The cover 76 is locked onto the base 36 in the closed position, which corresponds to the connection position when the card C is present, by means of a lock consisting of a locking bar 140.

The locking bar 140 is a thin metal plate which extends transversely above the upper face 92 of the front half part of the uprights 78 and 80 of the cover 76.

The upper part of the locking bar 140, in the form of a plate 142, has a thickness approximately equal to that of the plate 116 and extends above the housing and therefore above the rear part of the card C when the latter is present, thus helping to maintain the card C in its housing.

The upper part 142 is bounded by two transverse edges, the front transverse edge 144 and the rear transverse edge 146.

The locking bar 140 is mounted so as to slide longitudinally on the cover 76 and its rear extreme position is bounded by the bearing surface of the rear transverse edge 146 bearing against the stops 153 provided near the front transverse edge 152 of the rear plate 116.

In order to ensure that the locking bar 140 is guided slidingly over the cover 76, the upper plate 142 is extended vertically downwards at its two opposed ends by two vertical lateral cheeks 154 and 156 which extend along the vertically oriented external transverse faces 158 and 160 of the two thinned front halves of the uprights 78 and 80. These two thinned portions are bounded longitudinally forwards by two shoulders 162 and 164 with which the vertical front edges 166 and 168 of the cheeks 154 and 156 interact, respectively, in order to define the front extreme position of the locking bar 140 on the cover 76.

Beyond the cheeks 154 and 156, the plate 142 is extended horizontally inwards by two horizontal opposed guiding and locking tabs 172, 174 which extend so as to face each other, each tab being bounded transversely by an internal longitudinal edge 176, 178.

Thus, each cheek 154, 156 together with a tab 172, 174 constitutes a corridor 180, 182 (see FIG. 58) for longitudinally guiding the locking bar 140 over the uprights 78 and 80 of the cover 76.

Each tab 172, 174 is bounded by an upper face 184, 186 and by a lower face 188, 190, these faces being plane and horizontal (see especially FIGS. 58 to 61).

The tabs 172 and 174 are received so as to slide along the lower faces 112 and 114 of the slideways 98 and 100.

In the locked front extreme position, the front longitudinal ends of the tabs 172 and 174 extend opposite the facing lower faces 60 and 62 of the locking tabs 56 and 58 of the base 36 whereas, in the rear extreme unlocked position, the tabs are disengaged in order to allow the cover 76 to be opened by pivoting about the axis X—X.

After the operation of mounting the connector 30 on the board PCB belonging to the apparatus equipped with the connector in the closed and locked position and of fastening it thereto by soldering, the use of the apparatus equipped with the connector 30 requires the insertion of a card C into the connection position.

To do this, the user moves the locking bar 140 from the front (FIG. 6) to the rear (FIG. 4) and he can then pivot the cover 76 with respect to the base 36 by raising it in order to expose the free end open to the front of the housing 90.

Should an obstacle, such as a component or a wall or a partition, extend in front of the front transverse edge of the connector, the disengagement 85 allows the cover to be lifted up with a nail or with the tip of a tool.

The start of the pivoting opening travel of the cover is preferably assisted elastically, even in the absence of a card C in the connector.

Figure 6:
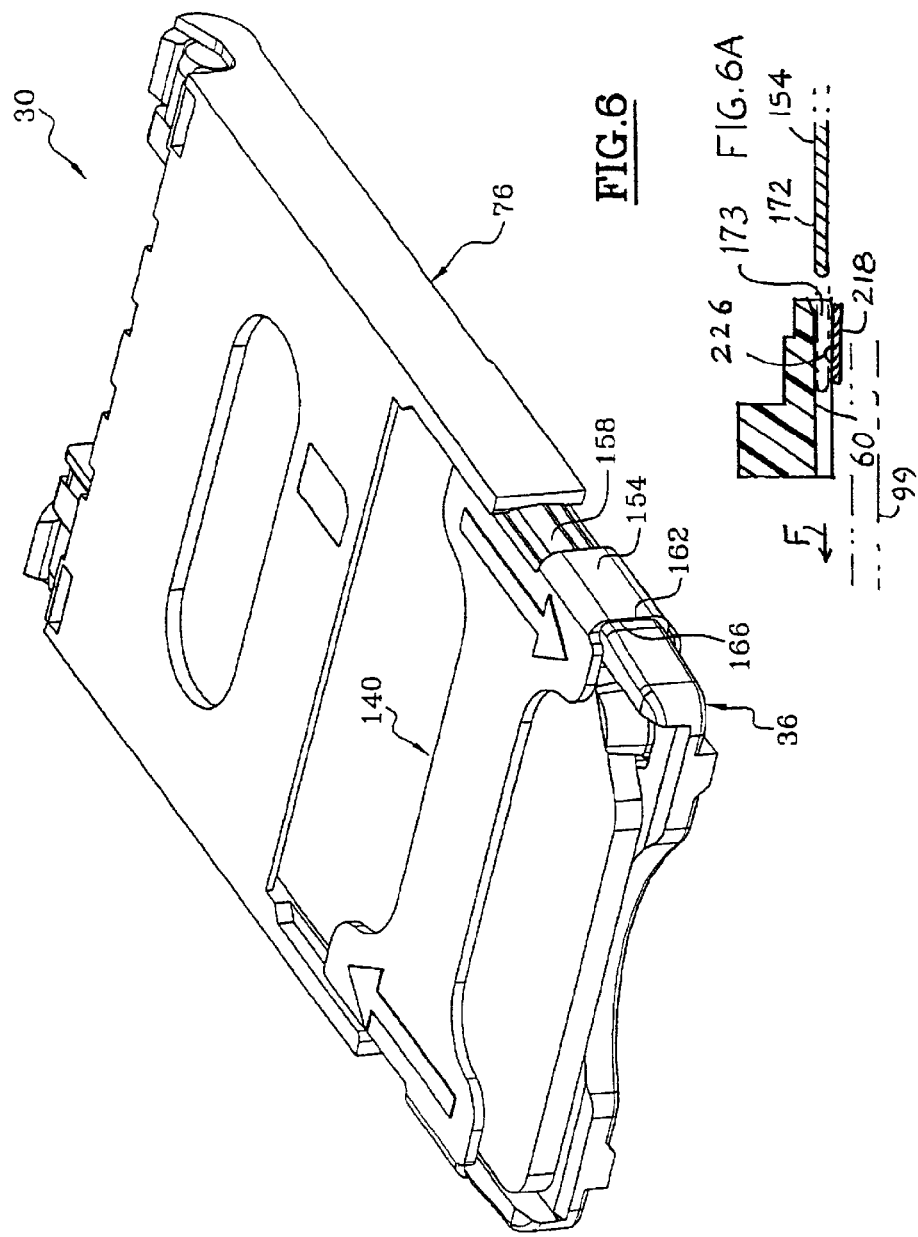
FIG. 6 is a view similar to that of FIG. 4, but with the locking member in its locked position.
Figure 7:
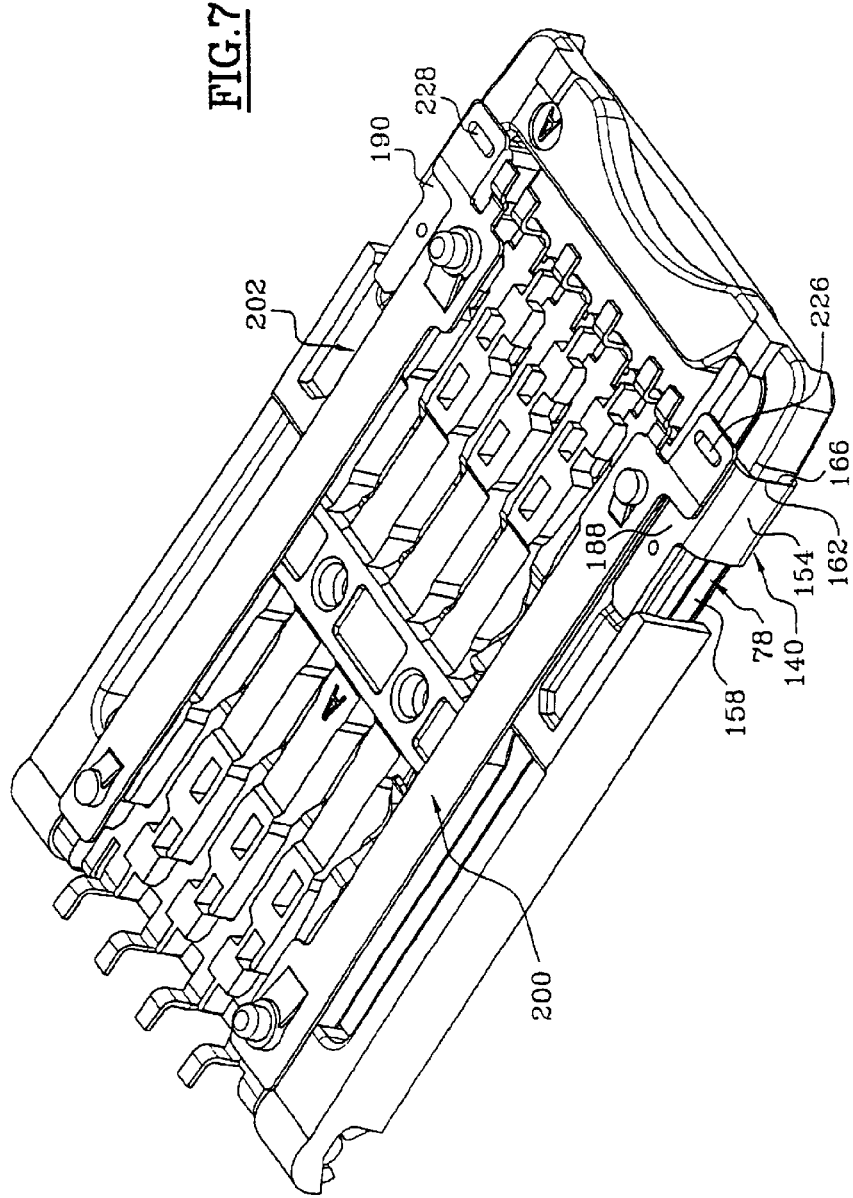
FIG. 7 is a bottom isometric view of the connector of FIG. 6 wherein the locking member is in the locked position.
Figure 8:
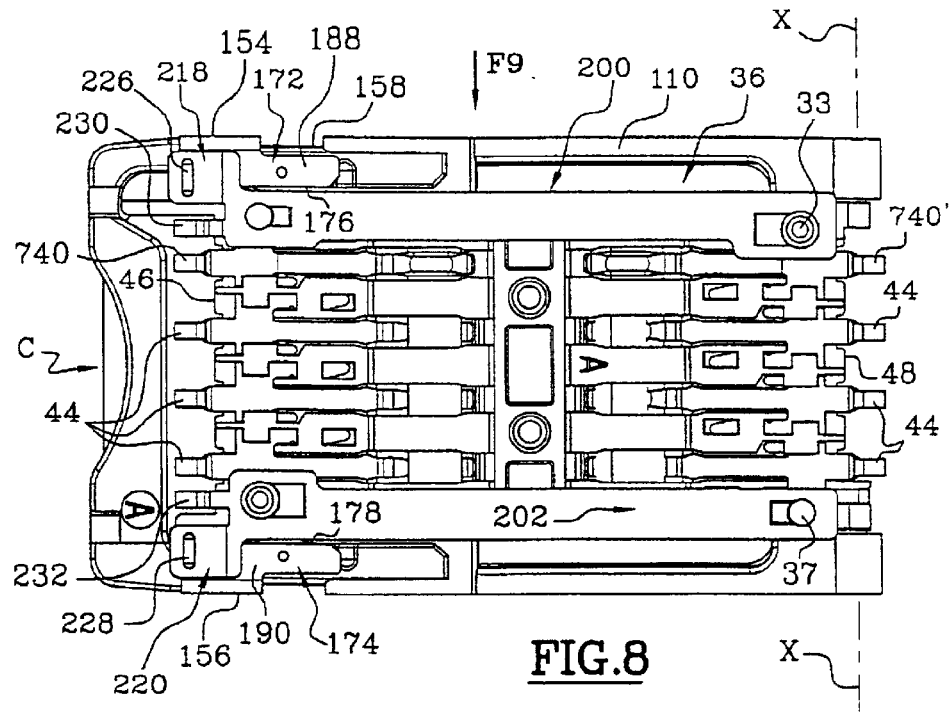
FIG. 8 is a bottom view of the connector of FIGS. 6 and 7 wherein the locking member is in the locked position.
Figure 9:
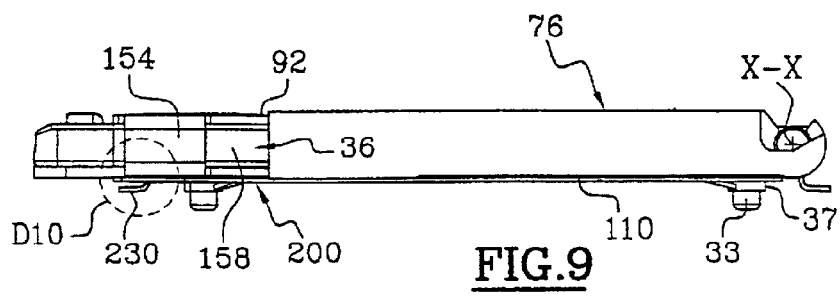
FIG. 9 is a side elevation view taken along the direction of arrow F9 of FIG. 8.

In the inserted position of the card, it is again possible to close and lock the cover 76 onto the base 36 if the card has been inserted properly, since the finger 66 extends so as to face the cut corner 70 (FIG. 4), the locking operation being accomplished by bringing the locking bar 140 back to its front extreme position (FIG. 6). In the event of a direction error in positioning the card C, correct locking is impossible and the cover is returned elastically to the open position. It is possible, by pressing very strongly on the cover provided with its card, on the edge opposite the polarizing finger, to lock only this edge but it is not possible to lock the other edge, and the locking operation is therefore incomplete and incorrect.

In the closed position (FIGS. 4 to 9), the cover 76, which carries the card C and the lock 140, is entirely around and above the base 36 which it protects, the metal locking bar 140 additionally "screening" the card C.

Hereafter, the locking bar 140 will be called lock and, in accordance with the teachings of the invention, the first embodiment of an electrical switch function for detecting the locked position of the lock will now be described, this locked position being illustrated especially in FIGS. 6 to 10.

In this first embodiment, the lock switch is of the normally-open NO type, that is to say the electrical switch is regarded as being open while the lock is not in its locked position and is regarded as being closed when the lock is in its locked position.

Figure 12:
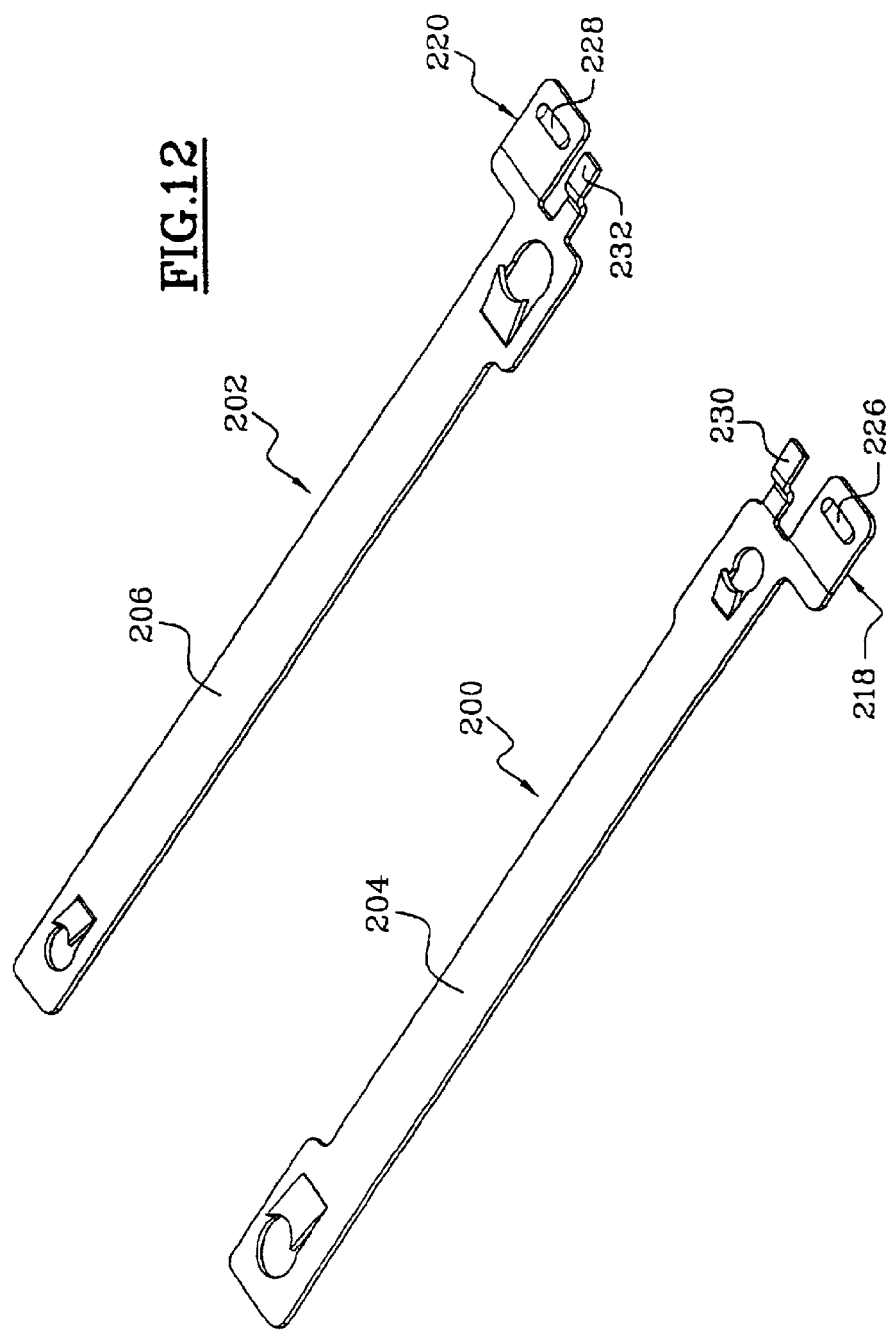
FIG. 12 is a bottom isometric view of the contact blades of FIG. 11.

In accordance with one aspect of the invention, the lock switch consists of the metal lock 140 itself and of two lock switch contact blades 200 and 202 which are especially shown in detail in FIGS. 11 and 12, with which blades the metal lock 140 engages via its lower tabs 172 and 174 and more particularly via the lower faces 188 and 190 of its lower tabs 172 and 174.

Each switch contact blade 200 and 202 comprises an elongate body in the form of a horizontal strip 204, 206 which extends horizontally beneath the lower face 50 of the base 36, to which they are fastened, permanently, by catching means consisting, for each blade 220, 202, of a front and rear pair of holes, 208, 210 and 212, 214, each having a catching tab 216, the diameter of the holes and the size of the catching tabs 216 being such that they allow the blades 200 and 202 to be fitted onto the cylindrical body of the feet 37 with the upper faces of the strips 204 and 206 bearing vertically upwards against the facing parts of the lower face 50 of the base 36.

Near its front free end, each switch contact blade has a contact tab 218, 220 which extends transversely outwards and which extends approximately horizontally in a plane offset vertically upwards with respect to the plane of the strips 204, 206. The upper face 222, 224 of each transverse contact tab forms the conducting face of each switch contact blade 200, 202 in the sense of the invention and it comprises, for this purpose, a contact boss 226, 228 which extends so as to project vertically upwards and which is intended to engage with the corresponding lower face 188, 190 of a tab 172, 174 of the metal lock 140.

At the side of each transverse contact tab 218, 220, each switch contact blade has a connection tab 230, 232 which extends longitudinally forwards and vertically downwards so as to be located longitudinally in line with the connection tabs 44 of the signal contacts and at the same height as the latter in order to be able to be soldered to the facing tracks, not shown, of the PCB board.

The longitudinal positioning of the transverse contact tabs 218 and 220, and especially of the bosses 226 and 228, is such that, when the lock 140 is in the unlocked rear position, they are offset longitudinally forwards and there is then no electrical contact between the lock 140, with its tabs 172 and 174, and the switch contact blades 200 and 202.

The operation of the NO lock switch will now be described with reference to FIGS. 2 to 13.

Figure 4:
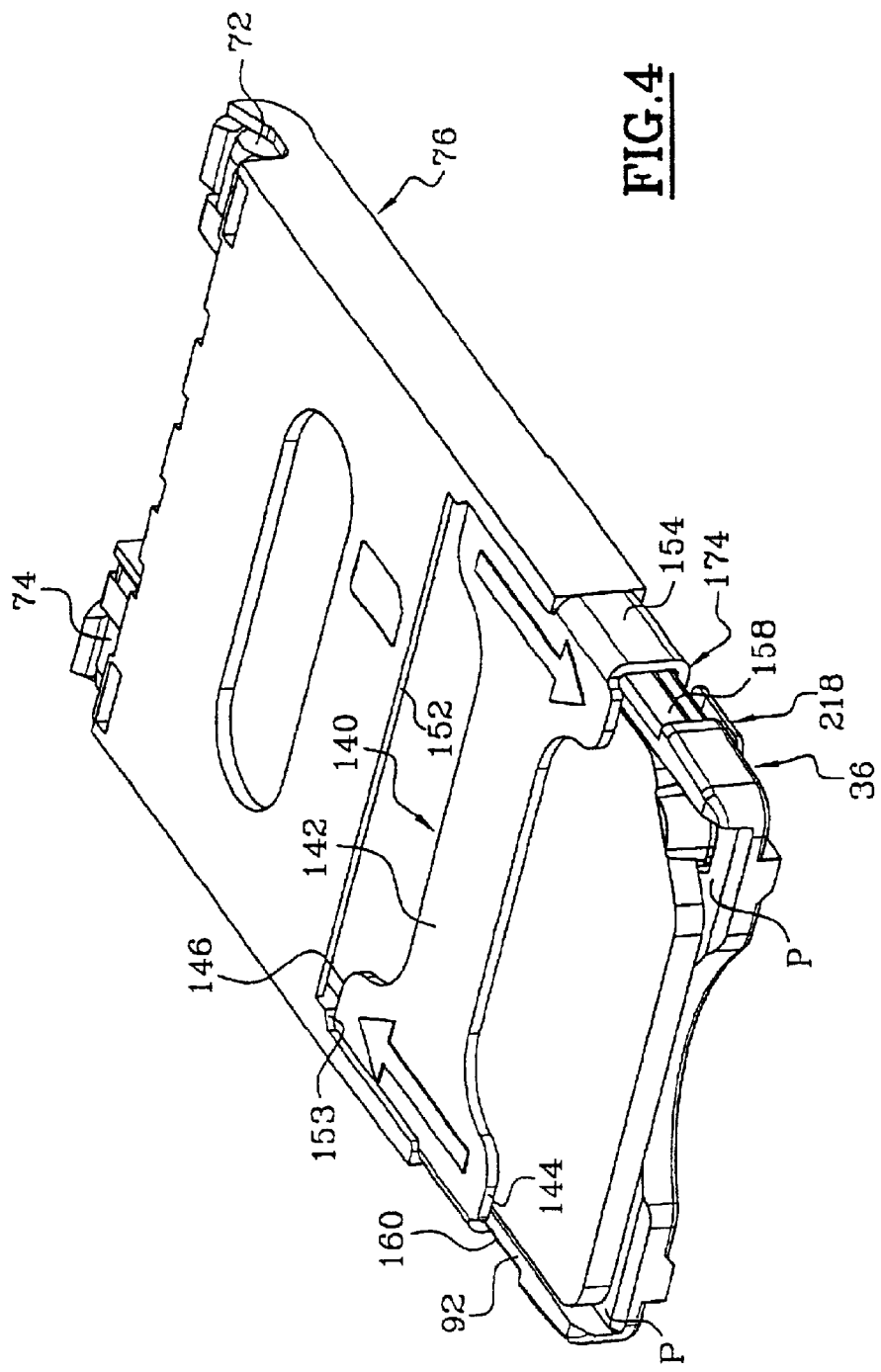
FIG. 4 is an isometric view of the connector of FIG. 1, showing the cover fully closed and the locking member in the unlocked position.

Starting from the position illustrated in FIGS. 2 and 3, in which the lock 140 is in its unlocked rear position, and the partially open cover 36 with a card C in position in its housing in the cover 36, the user starts by completely closing the cover 36 in order to bring it into the position illustrated in FIGS. 4 and 5.

As was explained above, and because of the longitudinal positioning of the transverse contact tabs 218 and 220, no electrical contact occurs between these components and the lock switch is always open.

Figure 10:
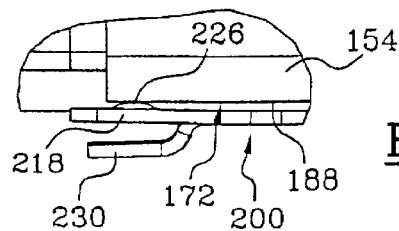
FIG. 10 is an enlarged view of area D10 of FIG. 9.

In order to lock the cover 36 in the closed position, the user moves the lock 140 longitudinally forwards in order to reach the locked position illustrated in FIGS. 6 and 10, in which the lower tabs 172 and 174 of the lock 140 are in contact, via their lower faces 188 and 190, with the bosses 226 and 228 of the lock switch contact blades 200 and 202.

Because of this electrical contact, the switching circuit is electrically closed, that is to say the two conducting tracks on the printed-circuit board to which the connection tabs 230 and 232 are connected are electrically connected to each other through the metal lock 140, 172, 174.

In this way, the locking of the lock 140 of the cover 76 in the closed and locked position on the contact-holding base 36 is detected in a reliable manner.

If the card is improperly inserted into the connector, the contact cannot be established on one side and the lock switch cannot therefore be closed, even if the other side is locked.

If the user moves the lock 140 towards its locked front position, without beforehand having closed the cover 36, he cannot, of course, lock the cover and his action on the lock does not produce any electrical signal at the lock switch in so far as the interaction of the lower faces 188 and 190 of the lower tabs 172 and 174 of the locking bar 140 with the switch contact blades 200 and 202 is possible only when the cover is in the closed position.

In addition, because of the known design of the cover 36 with its locking bar 140, if the user closes the lock 140, that is to say by bringing it longitudinally forwards into its locked position, before having closed the cover, the cover cannot be completely closed and the partial closure of the latter causes no signal at the lock switch, which remains open in so far as the lower tabs 172 and 174 cannot reach, vertically, the bosses 226 and 228.

The switch for detecting the end of closure travel of the cover 76 will now be described.

This switch is of the known general design which is described and shown in French Patent Application No. 98/11788 filed on 22 Sep. 1998, to the contents of which reference may be made in order to understand in detail the construction and the operation of such a type of switch.

In the first example of a switch for detecting the end of closure travel of the cover 36 illustrated in detail in FIGS. 14 to 22A and 22B, this is a switch of the normally-open NO type.

In the embodiment illustrated in FIGS. 1, 14 and 15, three pairs of contact blades constitute conventional signal contact blades, that is to say blades capable of engaging with the contact areas on the card C, while the fourth pair of contact blades, that is to say the pair on the right when considering FIG. 1, is used to form a switch for detecting the presence of the card C in the contact or connection position and for detecting the end of closure travel of the cover 36.

In a known manner, the two associated contact blades which form the end-of-travel switch are in every way identical to the other signal contact blades, both in their shape and structure and in the method of mounting them on the insulating support.

Apart from the two conventional contact blades 38, 38', respectively the front and rear contact blades, the end-of-travel switch, which here is of the normally-open type, essentially consists of a switch blade 820 which is made from a cut and folded sheet of conducting material.

As may be seen in FIGS. 16A and 16B, the rest position of each signal contact blade and of the front blade 38 associated with the end-of-travel switch is such that its convex-shaped free contact end 40—in the form of an upside-down spoon—has its convexity oriented upwards and projects vertically above the plane of the upper face 42, these ends lying at the same height.

For this purpose, each free end portion is pressed elastically in bearing contact, in the example shown, with the end nose of each blade, bearing against a facing surface portion formed in the corresponding edge of the cavity or hole in the insulating support which houses the corresponding free contact end portion and which allows the end to project above the support 36, 42.

The switch blade 820 has a general shape which is elongate in the longitudinal direction and it has a plate-shaped central fastening portion 840 which is fastened in the upper face 42 of the base 36 by a hot-crimped stud 880.

In its rest state illustrated in FIG. 14, so as to form a switch of the normally-open type, the front longitudinal branch B1 of the switch blade 820 extends opposite and above the free contact end 40 of the associated blade 38 without being in electrical contact with them, whereas the rear longitudinal branch B2 is in permanent electrical contact with the curved end 40' of the bent blade 38' which lies vertically below the upper face 42.

The front branch B1 has a curved profile complementary to that of the contact end 78, with its convexity oriented upwards.

The branch B1 projects vertically above the plane of the upper face 42 and it can be elastically deformed downwards, in the manner of a bending beam, in order to come into contact with and to bear on the free contact end 40 of the associated contact blade 38.

Under the action of the lower face of the card C, the deformation of the branch B1 firstly terminates when it comes into contact with the contact end 40 and then causes the latter also to bend vertically downwards, the interaction between the contacting surfaces of these components also ensuring a self-cleaning effect during the switching phase.

When the point of contact P1 between the branch B1 and the end 40 has been established, the end-of-travel switch circuit is closed, that is to say there is electrical continuity between the connection ends 740 and 740' of the two contact blades 38 and 38' which are used for producing the end-of-travel switch together with the switch blade 820.

As may be seen especially in FIG. 15, the unsymmetrical fixed blade 820 of the switch extends longitudinally as far as approximately two thirds of the end portion of the spoon 40 of the contact 38 so as to be able to use contacts (identical for the signal contacts and the switch contacts) which have the greatest possible projection height above the upper face 42, i.e. in the normal prestressed position, namely 0.75 mm.

The flexible profile on the moving contact side is similar, but its thickness has been reduced by approximately 0.1 mm so as to have a prestressing position for the moving contact allowing a gap of approximately 0.2 mm below the flexible branch B1 of the switch blade 820 when the latter, in the rest state, has a height of approximately 0.55 mm above the plane 42.

This 0.55 mm projection is defined so that the diagram of the relative travels between the conventional signal contacts and the moving contact 38 of the end-of-travel switch, during pivoting of the cap provided with the card C, is identical to the diagram, see later, for the switch of the normally-closed NC type. This is because the physical contacting of the flexible branch B1 on the moving contact 38, 40 takes place after a 0.2 mm deflection of the flexible branch B1 (a difference between the moving contact and the lower face of the flexible branch), that is to say when the top of the upper face of the blade lies at approximately 0.55−0.2=0.35 mm from the plane 42.

In FIGS. 16A and 16B, the cover 76 is open, that is to say the signal contacts 38 are not in contact with the chip on the card and the NO end-of-travel switch is open.

In FIGS. 17A and 17B, the rear row of signal contacts 38 is just in contact with the chip on the card, the deflection of these signal contacts 38 not having started yet; the front row of signal contacts has not yet been contacted by the card, nor the flexible branch B1 of the end-of-travel switch, which is still open.

In FIGS. 18A and 18B, the cap or cover 76 is still in the process of closing and the front left row of signal contacts 38 has just been contacted by the card C, whereas the rear signal contacts, to the right with regard to FIG. 18A, are at two thirds of their final deflection. The flexible branch B1 of the end-of-travel switch, as may be seen in FIG. 18B, has not yet been contacted. As may be seen in this FIG. 18B, there is a 0.2 mm gap between the lower face 32 of the card and the top of the flexible branch B1 which, added to a 0.2 mm gap existing between the lower face of the flexible branch and the top of the associated spoon 40, makes it possible to create a shift or delay in the sequence between establishing all the signal contacts 38 and the closure of the end-of-travel switch, which will be greater than or equal to 400 microseconds assuming the most rapid, manual, closure of the cover 76 by the user.

In FIGS. 19A and 19B, the cover 76 is still in the course of closing, the rear row of signal contacts is still in the course of establishing contact with the chip on the card, that is to say they are at approximately three quarters of their total deflection, and the flexible branch B1 of the end-of-travel switch is just in contact with the lower face of the card C, that is to say the vertically downwards deflection of the branch B1 has not yet started and the switch is thus still open.

In FIGS. 20A and 20B, the cover 76 is still in the course of closing, the rear row of signal contacts is close to their final deflection, the front row of signal contacts is in the course of establishing contact with the chip on the card, the moving contact of the end-of-travel switch is just in contact with the flexible branch B1, which is at one third of its total deflection, the deflection of the moving contact 38 not having started, the latter still occupying its prestressed rest position determined by its nose.

In FIGS. 21A and 21B, the connector is illustrated with its cover 76 in the closed position with a smart card in its housing, which is a card C of minimum thickness according to the standard defining the cards, that is to say a minimum thickness of 0.68 mm. The two rows of signal contacts have obtained their final deflection, as may be seen in FIG. 21A, and the moving contact 38 of the end-of-travel switch has also attained its final deflection, that is to say the switch is closed and electrical contact is established between the connection tabs 740 and 740'.

FIGS. 22A and 22B are identical to the two previous figures, but the connector is shown with a card C with a maximum thickness, according to the standard, equal to 0.84 mm. The increase in thickness of the card in no way changes the operation of the signal contacts nor the operation of the end-of-travel switch.

In this normally-open NO configuration of the end-of-travel switch, it is essential for the top of the fixed contact 38', 40' of the switch to lie below the level of the upper face 42 of the base 36 in order to prevent it being contacted by the smart card and thus to avoid opening the switch again.

For safety, the end of the fixed branch B2 of the switch blade 820 may be slightly elongated so that it always lies slightly above the top of the fixed contact 38', 40'. Thus, in the event of contacting by the card, the end of the fixed branch B2 would undergo a slight downwards deflection driving the "fixed" contact 38', 40' without loss of bearing force and therefore of electrical contact between these two components 40' and B2.

Of course, if there is not a card C in the housing in the cover 76, closing, or conversely opening, the cover 76 produces no action on the switch and the electronic processing circuit analyses the absence of a card in the same way as the non-closure or non-reopening of the cover 76.

The 400 microseconds delay mentioned above between establishing the signal contacts and activating the end-of-travel switch, whatever its type, normally open or normally closed, corresponds to the most rapid closure conditions permitted by the man's hand.

The delay between deactivating the switch and opening the signal contacts, when opening the cover 76, must also be equal to or greater than 400 microseconds, and this being so under the most rapid opening conditions which correspond to the situation in which, with the lock 140 having been unlocked beforehand and the pivoting cover 76 being held pressed with the finger against the base 36, the cover provided with the card then pivots in the opening direction by the elastic action of a combination of the signal contacts and of the switch which bear elastically against the lower face of the card, that is to say by release of their spring effect.

Such a guaranteed minimum delay of 400 microseconds allows the operator to install or withdraw the smart card with complete safety for the card and for the electronic circuits of the system which receives the connector/smart card subassembly when the appliance remains energized during these operations.

In fact, because of the progress made in extending the autonomy of the batteries, on the one hand, and the reduced consumption of the latest appliances (particularly portable GSM cellular telephones), on the other hand, it is now conceivable to have an autonomy of more than twenty days. This improvement in the autonomy allows appliances to be produced with rechargeable batteries incorporated, and therefore not removable or disconnectable, in order to simplify the manufacture and to reduce the costs, the size and the weight of the appliances. In this case, the user has access to the smart-card connector whether the appliance is energized or not, unlike the current portable telephones in which it is generally necessary to remove the bank of batteries in order to gain access to the connector.

Another case, in which the appliance remains energized, is that in which the cells or batteries are connected by wires and access to them is gained by lifting a trap door. However, in this case there is also the risk that the user will remove the battery, in order to gain access to the smart-card connector in order to remove or reintroduce the smart card, without having disconnected the cell from its wires.

In the embodiment illustrated in FIGS. 23 to 31B, the switch for detecting the end of closure travel of the cover 76 is of the normally-closed type.

An example of the general design of such a type of switch is also described and shown in the French Patent Application No. 98/11788 mentioned above.

The design of the end-of-travel switch illustrated in these figures is overall of the same type as that of the first embodiment of a normally-open switch which has just been described.

Thus, the switch blade 820 is of symmetrical design and has two longitudinally opposed branches B1 and B2, each of which engages via its free end with the contact end 40, 40' of an associated contact blade 38, 38'.

The two branches B1 and B2 of the switch blade 820 extend approximately in a horizontal plane and here they are both rigid or fixed, that is to say the operation of the switch does not entail the elastic deformation of one or both of the branches B1 and B2 of the switch blade 820.

This is because, as may be seen in FIG. 24, once the insulating support 36 has been mounted, the conformation and the position of the switch blade 820 are such that the convex contact ends 40, 40' of the contact blades 38, 38' associated with the switch blade 820 in order to form the end-of-travel switch bear elastically so as to be in contact with the opposed free ends of the branches B1 and B2 in order to form two semi-permanent contact points P1 and P2 in the absence of the card C.

The conformation of the fixed branch B1 and of the associated contact blade 38, 40 are such that the curved upper face of the spoon 40 projects vertically upwards from the upper face 42 of the insulation of the support 36 by a height equal to 0.35 mm, whereas the curved upper face of the spoon 40' lies below the upper face 42.

Thus, when closing the cover 76 the lower face 32 of the card C engages with the convex upper face with the convex end 40 in order to make the free end portion bend elastically downwards and therefore to open the switch circuit established beforehand between the connection outputs 740 and 740' of the two associated contact blades in order to produce the switch, that is to say to eliminate the point of contact P1.

The 0.35 mm clearance height of the contact 40, 38 in its prestressed state, in which it bears elastically at the point P1 against the branch B1, was determined so that the moving contact 38, 40 exerts a sufficient bearing pressure on the fixed blade B1 of the end-of-travel switch in order to guarantee a stable electrical contact resistance in the closed position of the switch, that is to say when the pivoting cover is open, or when there is no card, and so that it is activated by the smart card whatever the thickness of the latter defined by the corresponding standards, when the cap carries a card and is closed. The permanent contact at the point P2 is located on the side of the hinge axis X—X, as in the case of the normally-open NO end-of-travel switch examined previously.

FIGS. 26A–26B, 27A–27B, 28A–28B, 29A–29B, 30A–30B and 31A–31B showing the operating sequence of the normally-closed NC switch correspond to FIGS. 16A–16B, 17A–17B, 18A–18B, 20A–20B, 21A–21B and 22A–22B of the switch of the normally-open NO type, respectively.

A variant of the invention, not shown, consists in electrically connecting the fixed blade of the end-of-travel switch, directly to the connector, or via the printed circuit to which the connector is soldered, to one of the branches of the lock switch which then becomes the common electrical point for the two switches, the end-of-travel switch and the lock switch, in order to save one or two contacts.

In the first version described above of the lock switch of the normally-open NO type, it should be noted, because of the presence of the switch contact blades 200 and 202 below the insulating support of the base 36, that it is necessary to provide feet in order to raise the base 36 with respect to the upper face of the printed-circuit board and that this design therefore increases the total height of the connector in the mounted position, together with the closed cover, above the printed-circuit board of the appliance.

The embodiment illustrated in FIGS. 32 to 37 allows this drawback to be remedied.

In fact, by virtue of another design of the switch contact blades 200 and 202, it is possible to dispense with the feet and therefore to make the base 36 rest directly on the upper face of the printed-circuit board.

This design also makes it possible to solve the difficulty of coplanarity of the various connection tabs to be soldered to the printed-circuit board.

As may be seen especially in FIG. 36, each lock switch contact blade is in the form of a hairpin having a vertical hinge axis, that is to say the active contact branch 218, 220 defining an external transverse conducting surface 222, 224 extends in a vertical plane with its curved front free end having the surface 222, 224 which lies in the free space existing between the facing internal transverse faces of the lateral uprights 78, 80 of the cover 76 and the facing external transverse faces of the lateral edges 56, 58 of the base 36.

Each active branch or tab 218, 220 is hinged at its rear end to a vertical connection and fastening strip 204, 206 which is extended vertically downwards by a positioning and fastening harpoon 240, 242 housed in a corresponding housing in the base 36. Finally, each connection and mounting strip 204, 206 is extended at its front end by an electrical connection tab 230, 232 which extends transversely inwards in a horizontal plane above a corresponding part of the lower face of the insulating base 36 so as to extend in the same horizontal plane as the other connection tabs 44, 740 and 740'.

According to this design, the locking bar 140 engages, during the locking operation, with the active branches 218–222 and 220–224 of the switch contact blades 200, 202 via the bevelled front transverse edge 173, 175 of the lower tabs 172 and 174 and then, in the locked position, with the lateral edges 176 and 178 of the lower tabs 172 and 174 against which the active branches rest in elastic bearing contact while the lock 140 is in its locked forward position.

FIGS. 38 to 43 show another version of a lock switch of the normally-open NO type using switch contact blades 200 and 202, which switch also has a reduced thickness, as in the previous version illustrated in FIGS. 32 to 37.

This version differs from the previous one by the design of the lock switch contact blades which are placed in the same region of the connector and are fastened in the same way by harpoons 240 and 242 with horizontal connection tabs 230 and 232 which are bent over transversely inwards.

On the other hand, the active branches 218, 220 are connected to the connecting branches or strips 204, 206 so as to extend horizontally and longitudinally forwards with their front free end portion able to bend elastically vertically downwards, with a bevel-forming connection part 250, 252 with which the front transverse edge 177, 179 of the tabs 172 and 174 can engage during the locking operation.

Figure 40:
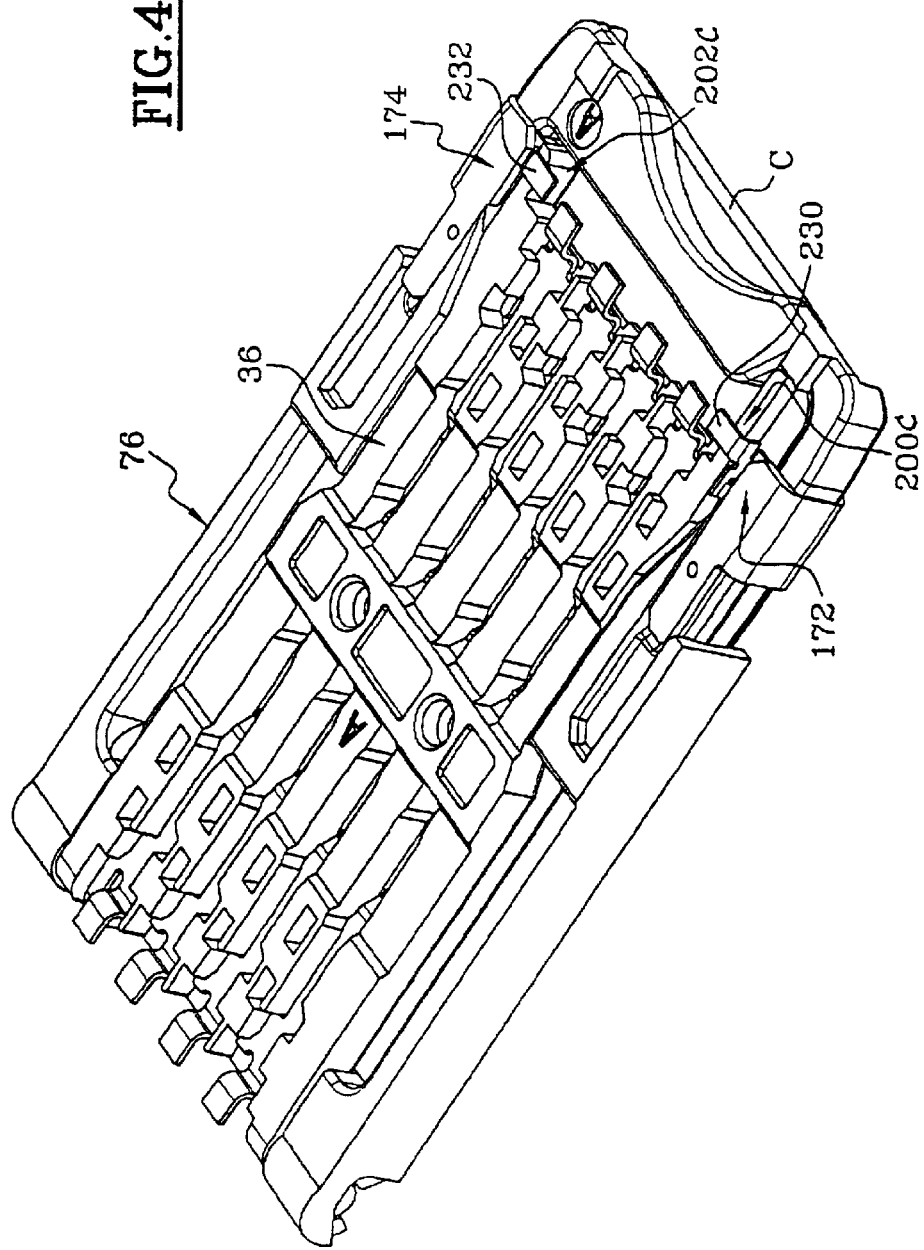
FIG. 40 is a bottom isometric view similar to FIG. 38, but with the locking member in its fully locked position.
Figure 41:
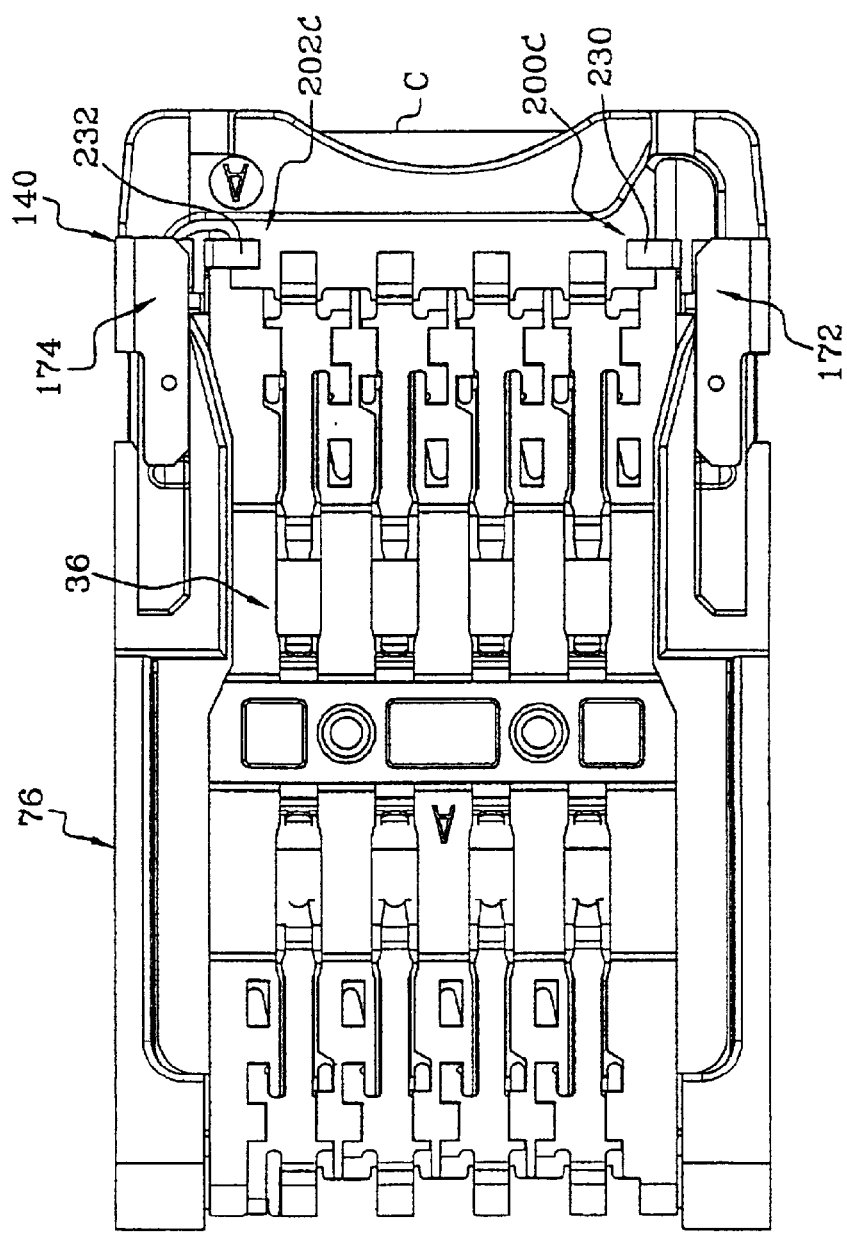
FIG. 41 is a bottom plan view of the connector of FIG. 40.

The active conducting surface of each active branch 218, 220 of a switch contact blade 200, 202 is thus in this case the horizontal lower face of the active branch 218, 220 which, in the locked position, and as may be seen especially in FIGS. 40 and 41, lies above the lower tab 172, 174 of the lock 140, that is to say it bears elastically vertically downwards in contact with the corresponding upper face 184, 186 of the tab 172, 174 of the lock 140.

A description will now be given, with reference to FIGS. 44 to 61, of an embodiment of a connector provided with a two-position lock switch which is also of reduced height, that is to say it does not require feet in order to raise it, and in which switch contact blades are not used either, the lock switch function being provided, as previously, by the metal lock 140, the lower tabs of which, bent over transversely inwards, engage directly, in the locked position, with a long conducting track and two short pads on the upper face of the printed-circuit board PCB.

For this purpose, and as may be seen more particularly in FIGS. 58 to 61, each lower tab 172, 174 is extended longitudinally rearwards by an elastic contact branch 254, 256 which extends horizontally but in a plane slightly offset vertically, downwards with respect to the horizontal plane common to the lower faces 188 and 190 of the tabs 172 and 174, so as to apply a downwards elastic vertical thrust force on the upper face 258 of the board PCB in order to guarantee good frictional contact between the lower faces of these active branches 254 and 256 and the upper face 258.

More specifically, the upper face 258 of the PCB has a "long" longitudinal track 262 with which the elastic contact branch 256 is permanently in contact, that is to say whatever the longitudinal position of the lock 140. On the other side, the upper face 258 has two consecutive conducting pads, namely a rear conducting pad 260 and a front conducting pad 261, with which the elastic contact branch 254 is capable of engaging.

In the closed position of the cover 76 and in the unlocked rear position of the lock 140 (FIG. 50), a first switching circuit of the lock switch is closed in this first position since the contact branches 254 and 256 are in contact with the rear pad 260 and the long track 262, respectively. By moving the lock 140 forwards for locking, the branch 254 leaves the rear pad 260 and then reaches, in the locked forward position of the lock 140 (FIG. 56), the front pad 261 in order to close another switch circuit of the lock switch.

Thus, if neither of the two positions is occupied by the lock, that is to say if the processing circuit detects neither of the two positions 262-260 or 262-261, either the cover is not closed and can be verified by the signal contacts or the lock is in an intermediate longitudinal position and it is possible to discriminate this case from the previous one, again by analysing the signal contacts.

According to other variants (not shown), it is possible to produce, just as simply, a lock switch of the type which is simply normally open NO, or normally closed NC, by providing only two conducting pads aligned longitudinally and positioned longitudinally so that the branches 254 and 256 engage simultaneously with these two pads at the end of locking (NO type) or during closure before locking (NC type).

FIGS. 73 to 76 show an embodiment variant of the connector illustrated in FIGS. 44 to 61.

In this variant, the long track 262 and the two pads 260 and 261 are adjacent and lie transversely in line with the lower tab 174 of the lock 140.

In order to engage with these conducting elements, whilst still discriminating the two longitudinal positions of the lock, the lower face 190 of the tab 174 is provided with a contact pad 244 which has two adjacent parallel branches, one 246 of which is always in contact with the long track 262 and the other 248 of which is designed to engage with one or other of the two pads 260 or 261 depending on the longitudinal position of the lock 140 which drives, in its movements, the pad 244 which is soldered or crimped to it.

Another embodiment of a connector having a lock switch of the normally-closed type is shown in FIGS. 62 to 69.

The design of this connector is generally similar to that of the first embodiment illustrated in FIGS. 2 to 13, that is to say it involves a pair of switch contact blades 200 and 202 of the same design which are placed horizontally beneath the lower face of the raised base 36, which pair has, as previously, two external transverse and horizontal contact tabs 218 and 220, each having a contact boss 226 and 228.

It is only the longitudinal position of the contact tabs 218 and 220 which differs from the case of the lock switch of normally-open NO type, that is to say they are offset longitudinally rearwards so as to be in line with the lower faces 176 and 178 of the lower tabs of the lock 140 when the latter is in the unlocked rear position and the cover is in the closed position, the metal lock 140 then establishing electrical contact between the tabs 218 and 220 and therefore between the two switch contact blades 200 and 202.

Starting from this normally-closed state of the lock switch, the longitudinal forward movement of the metal lock, for the purpose of locking the cover 76, causes the lock switch to open so as to indicate the locking of the cover.

Of course, if such a lock switch of the normally-closed NC type is compared with a lock switch of the normally-open NO type, it may be seen that it is not possible to distinguish directly two identical electrical states, that is to say open states, which however correspond to two different situations, that is to say one with the cover open and the other with the cover closed and locked.

Figure 71:
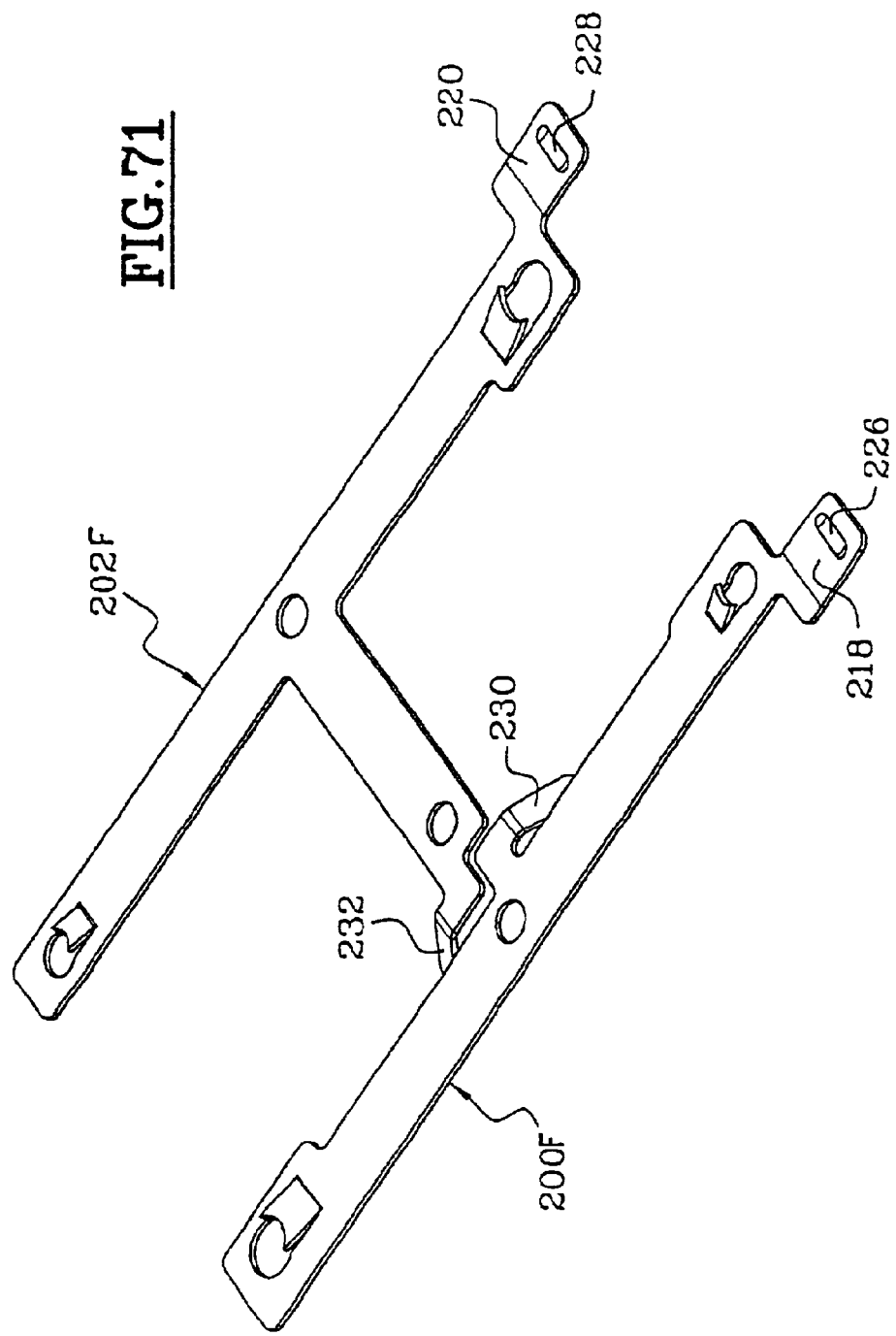
FIG. 71 is a bottom isometric view showing the switch blades of the connector of FIG. 70.
Figure 72:
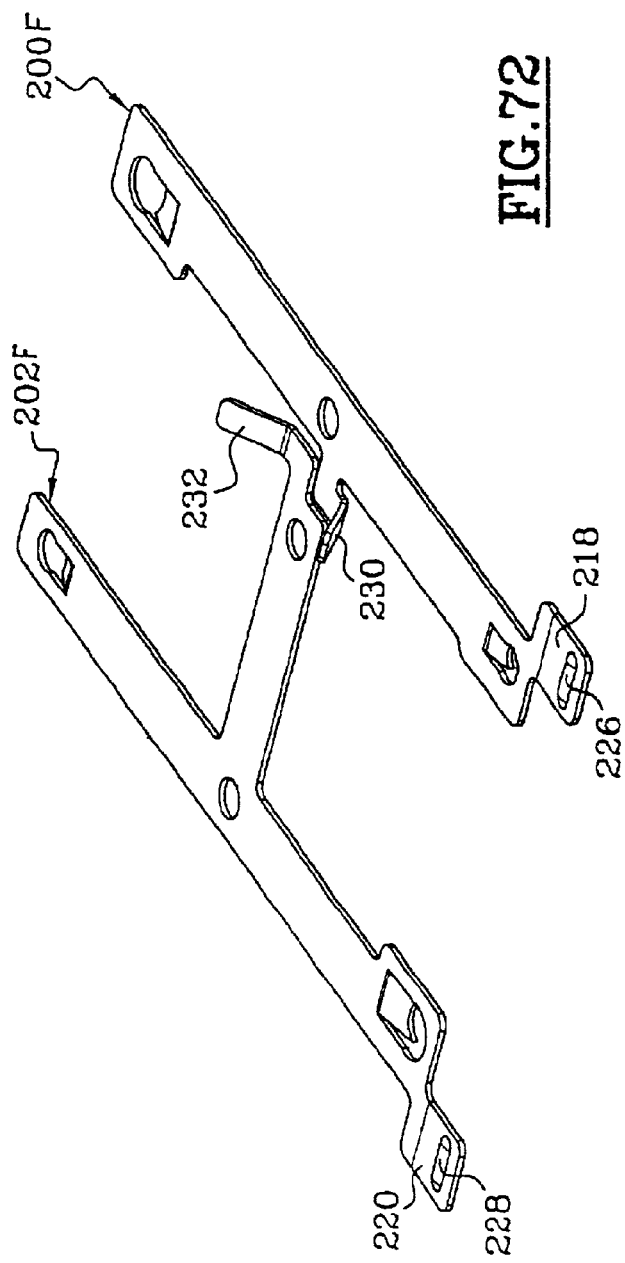
FIG. 72 is a top isometric view of the switch blades of FIG. 71.

Finally, FIGS. 70 to 72 show an embodiment variant of an electrical connector having a lock switch of the normally-open NO type similar to that described and shown with reference to FIGS. 1 to 13.

This embodiment variant is different owing to the design of the means for electrically connecting the contact blades 200 and 202. This is because, as may be seen by comparing in particular FIGS. 70 to 72 with FIGS. 5, 11 and 12, it will be noted that the tabs 230 and 232 for electrically connecting the lock switch contact blades 200 and 202 do not engage directly with the conducting tracks on a printed-circuit board but are designed, by being adjacent and being bent vertically upwards, to engage with two standard blades 38', that is to say blades identical to signal blades 38, as may be seen in FIG. 70 with which they are always in contact, and that they maintain permanently in a bent state, that is to say as in the case of the fixed blade B2 of the end-of-travel switch of the normally-closed type illustrated in FIGS. 24 and 25.

Thus, it is the connection tabs 44' of the contact blades 38' which ensure electrical connection to the printed-circuit board of the two lock switch contact blades 200 and 202. Thus, all the outputs or connection tabs are identical and lie at the same height. In this design, there is, of course, no switch for detecting the end of closure travel of the cover of the type of those described above.

The operating diagram for the safety device with the NC lock switch, associated with a pivoting end-of-travel switch, is as follows:

1—Closure and locking of the connector provided with a card.

1.1—

Closure of the cover:

1.1.1 If the card is not positioned correctly, the pivoting end-of-travel switch is not actuated during angular closing of the cover since the polarizing finger of the contact-carrying insulation prevents the card from bearing sufficiently on the lateral contacts on the side containing the locking finger.

For double safety, the lock switch cannot be closed on the side containing the locking finger, for the same mechanical reason.

⇒The electronics of the appliance are therefore not activated.

1.1.2 If the card is correctly positioned, at the end of angular closure of the cover, the pivoting end-of-travel switch is actuated and the lock switch is closed, generating a "rising edge":

⇒The electronics of the appliance are not always activated.

1.2—

Locking of the cover:

Two situations then arise:

1.2 1 The operator releases the pivoting cover without having locked the lock:

During angular opening of the cover, the end-of-travel switch is deactivated and the lock switch opens, generating a "falling edge":

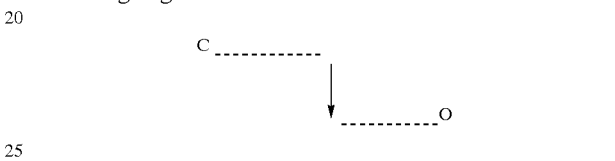

⇒The electronics of the appliance are not always activated because of the deactivation of the "end-of-travel" switch which indicates the angular opening of the cover (and which acts before the signal contacts have left the pads on the card).

It should be noted that if the lock switch opens before the end-of-travel switch, the electronics of the appliance will be activated for a short time and then immediately deactivated by the signal from the end-of-travel switch before the contacts leave the pads on the smart card.

1.2.2

The operator correctly and completely locks the pivoting cover with the lock before having released the cover:

The pivoting end-of-travel switch is always actuated ($1^{st}$ condition) and the lock switch opens, generating a "falling edge" ($2^{nd}$ condition):

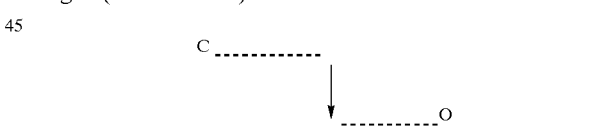

⇒The electronics of the appliance are activated (the two conditions being combined).

It should be noted that, since the NC switch is open in operation, there is no risk of a stoppage, even if its performance deteriorates over time (in the case of applications in which the card is removed very rarely, priority is given to the operation, over safety).

2—Unlocking and opening of the connector provided with a card.

2.1—Unlocking of the cover:

The pivoting end-of-travel switch is in the actuated position.

The lock is unlocked and the NC lock switch closes, generating a "rising edge":

⇒The electronics of the appliance are deactivated before complete unlocking of the cover.

2.2—Opening of the cover:

Two situations then arise:

2.2.1

The operator again locks the lock before having released the pressure on the cover, and therefore without having allowed the cover to pivot towards its angular opening position: the configuration is then again as in 1.2.2.

⇒The electronics of the appliance are activated.

2.2.2

The operator releases the pressure on the unlocked cover and the cover opens angularly: the configuration is again as in 1.2.1.

⇒The electronics remain deactivated.

The NC lock switch version is advantageous if the smart card is rarely removed from the electronic appliance (for example in the case of a cellular telephone, GSM telephone, etc.).

Should the performance of the switch (which is rarely activated) deteriorate over time, the operation of the apparatus is not stopped. The pivoting end-of-travel switch is in safety mode in order to ensure that the electronics of the equipment are protected when opening the connector, even if the lock switch no longer operates.

When putting the card back into the connector and when again locking the lock, there will have been a complete "opening/closing" cycle of the blade-type lock switch: the self-cleaning effect of this cycle has every chance of "making good" the lock switch, and the electronics of the appliance will be activated without the operator being aware of a deterioration in the lock switch due to the effect of ageing of the rarely used blade switch.

If a failure of the lock switch occurs, we have seen that there is no danger to the electronics because of the end-of-travel switch. On the other hand, a failure of the end-of-travel switch would throw the safety of the electronics of the appliance into doubt. It is then conceivable to ensure safety in this unfavourable situation, since the electronics of the appliance are capable of detecting the presence of the smart card via the signal contacts (but, without the switch, it is incapable of preventing these from opening in advance).

If the pivoting end-of-travel switch is of the NO type, any failure of the latter will immediately be detected "in the position in which the card bears on the contacts" by the electronics of the appliance, since the NO-type switch must be closed when the signal contacts have been established. If a failure of the end-of-travel switch is detected during operation, that is to say during the period during which the card is correctly installed and the lock correctly locked, the electronics can simply record this information and leave the electronics "activated" until the next "rising edge" pulse of the NC-type lock switch, that is to say at the first unlocking, and the reactivation of the electronics will then be prohibited because of the fact that the "end-of-travel" switch will give the "no card present" information (configuration will then again be equivalent to that indicated in section 1.1.1).

If the pivoting end-of-travel switch is of the NC type, any failure of the latter will be immediately detected in the "no card" position or in the "card not bearing on the contacts" position, since the NC-type switch must be closed when the signal contacts have not been established. If a failure of the end-of-travel switch occurs during operation, that is to say during the period during which the card is correctly installed and the lock correctly locked, the electronics would not detect the failure and would remain actuated until the next "rising edge" pulse of the NC lock switch, that is to say at the first unlocking: it is at this point that danger occurs.

Two situations may then arise:

The operator releases the pressure from the already unlocked cover. The cover pivots towards its angular opening position; the lock switch opens and, since the end-of-travel switch is not working, reads "card present" by mistake and is again in the configuration indicated in section 1.2.2 which, without an additional precaution, would give the order to reactivate the electronics with the risk of damaging them.

The recommended additional precaution to avoid this risk consists in preventing the activation of the electronics from occurring when the "falling edge" for closing the lock is immediately preceded, within a fixed time of a few seconds for example, by a "falling edge" for opening the NC-type end-of-travel switch.

The operator again locks the lock without having released the pressure on the cover. Although in this configuration there is no risk, the electronics of the appliance will not be reactivated because of the additional precaution (since the "falling edge" for the lock switch will not have been immediately preceded by a "falling edge" for the end-of-travel switch).

The NO-type lock switch version is preferred in the case of applications for which safety is a priority (for example for appliances handling financial transactions, etc.), and for which no risk, albeit a minute one, is acceptable to the appliance manufacturer.

The "closed" lock switch position is possible only when the lock is correctly locked. The pivoting end-of-travel switch serves essentially to detect the presence of a card (although this function can be provided by the electronics through the signal contacts), but it can also be used as double safety, in the extreme case, for example, of conducting impurities causing short circuits between each of the spoons of the two contact blades of the lock switch and the lock at the moment it opens.

The various combinations of switches are as follows.

The "NO-type lock switch/NO-type pivoting end-of-travel switch" combination is the configuration providing the greatest safety. The "NC lock switch/NC pivoting end-of-travel switch" combination is the best "operating comfort/safety" compromise.

The NO- or NC-type "pivoting end-of-travel" switches can be used by themselves, giving a single level of safety:

the NO-type version if priority is given to safety (but violent shocks to the appliance in operation may cause a brief separation of the semi-permanent contact and trigger stoppage of the electronics, this being completely safe but annoying for the user);

the NC version if priority is given to operating comfort.

On the other hand, these "pivoting end-of-travel" switches do not allow verification that the connector is properly locked, something which is a necessary condition in certain operations such as, for example, a financial transaction (in this case, not only must the electronics be made safe but the operation must be secure).

NO-type "lock switches" (which are more expensive and, in some cases, bulkier than pivoting end-of-travel switches) may also be used by themselves, as long as it is possible to detect "card presence" via the signal contacts. This allows the eight contacts of the contact holder to be used as signal contacts. The NO-type version is very safe (this is the safest configuration after the NO/NO combination).

On the other hand, the NC-type "lock switch" version by itself is dangerous for the electronics and is not recommended.

The fourth embodiment illustrated in FIGS. 77 to 90 will now be described.

As may be seen in these figures, the overall design of the connector is identical to that of the previous embodiments.

This is especially the case for the base 36 and the cover 76.

Figure 78:
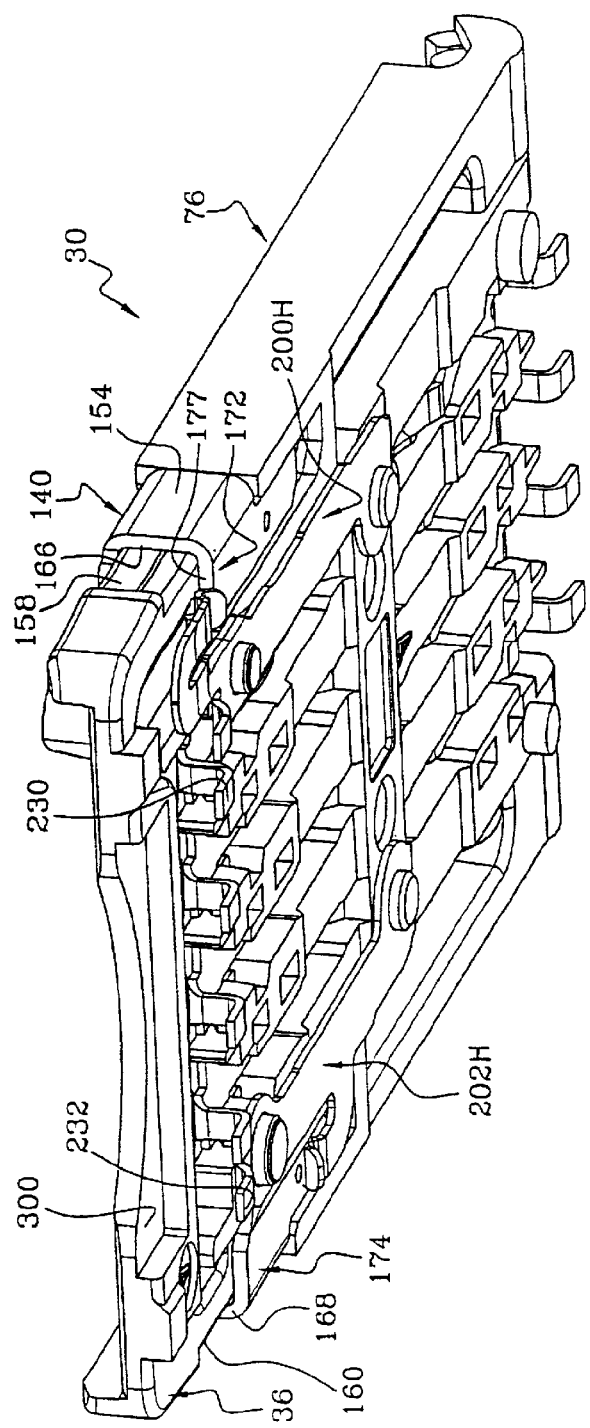
FIG. 78 is a bottom isometric view of the connector of FIG. 77.

However, it will be noted in FIG. 78 that the lower face of the front end part of the base has a recess 300 which is clear of the place under the connector for providing components on the printed-circuit board, under this recessed region of the connector.

As regards the lock 140, this is in every way identical to that illustrated in detail in FIGS. 1 to 43, apart from its transverse upper plate 142 which has a boss 302 which forms a rib for reinforcing the cross-piece and which facilitates manipulation of the lock by forming a gripping region in relief.

The design of the lock switch here is novel in so far as it is no longer a switch which changes state once, depending on whether the lock is locked or unlocked, but here is rather a switch having three separate successive states when the lock is locked or when it is unlocked.

More particularly, the design of the two blades 200 and 202 here makes it possible to produce an open-closed-open electrical sequence of the switch 140-200-202.

Figure 80:
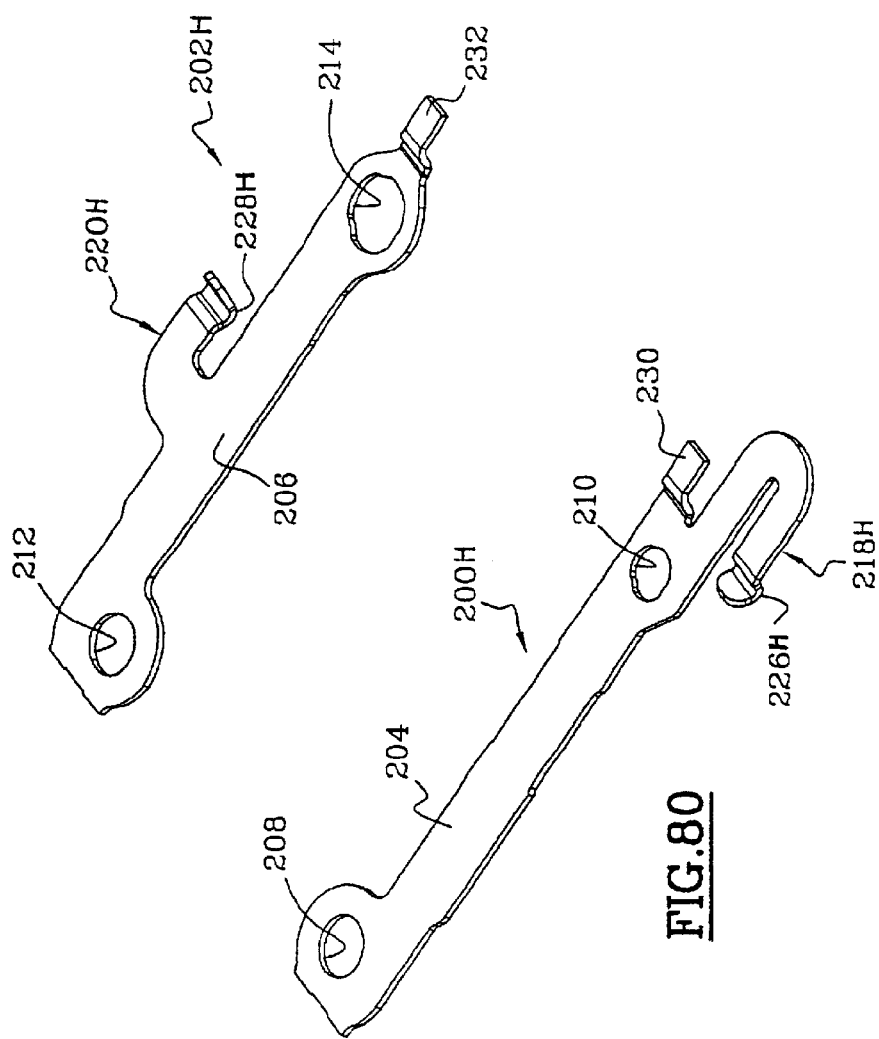
FIG. 80 is a bottom isometric view of the switch blades of FIG. 79.

For this purpose, and as may be seen by comparing in particular FIGS. 79 and 80 with FIGS. 11 and 12, the lock switch contact blades 200 and 202 are modified.

Near its front free end, the switch contact blade 200 has a contact tab 218 in the form of a hairpin bent through 180° in the form of a U which extends transversely outwards and longitudinally rearwards, with its contact boss 226 which extends so as to project vertically upwards and which is intended to engage with the corresponding lower face 188 of the tab 172 of the metal lock 140. More specifically, the contact boss 226 is aligned transversely with the contact tab 172 and it lies to the front of the front transverse edge 177 of the tab 172 when the lock is in its unlocked rear position shown in FIG. 82.

Near its central part, the switch contact blade 202 has a contact tab 220 bent through 90°, which extends transversely outwards and longitudinally forwards, with its contact boss 228 which extends so as to project vertically upwards and which is intended to engage with the corresponding lower face 190 of the tab 174 of the metal lock 140. More specifically, the contact boss 228 is aligned transversely with the contact tab 174 and lies to the rear of the rear transverse edge 183 of the tab 174 when the lock is in its locked forward position shown in FIG. 90.

The relative longitudinal positioning of the two blades 200 and 202 with their contact bosses 226 and 228 and the dimension of the lock 140 (especially the distance separating the front transverse edge 177 of the contact tab 172 from the rear transverse edge 183 of the tab 174) are such that they make it possible to ensure the open-closed-open sequence which will now be explained with reference to FIGS. 82, 84, 86, 88 and 90.

Figure 82:
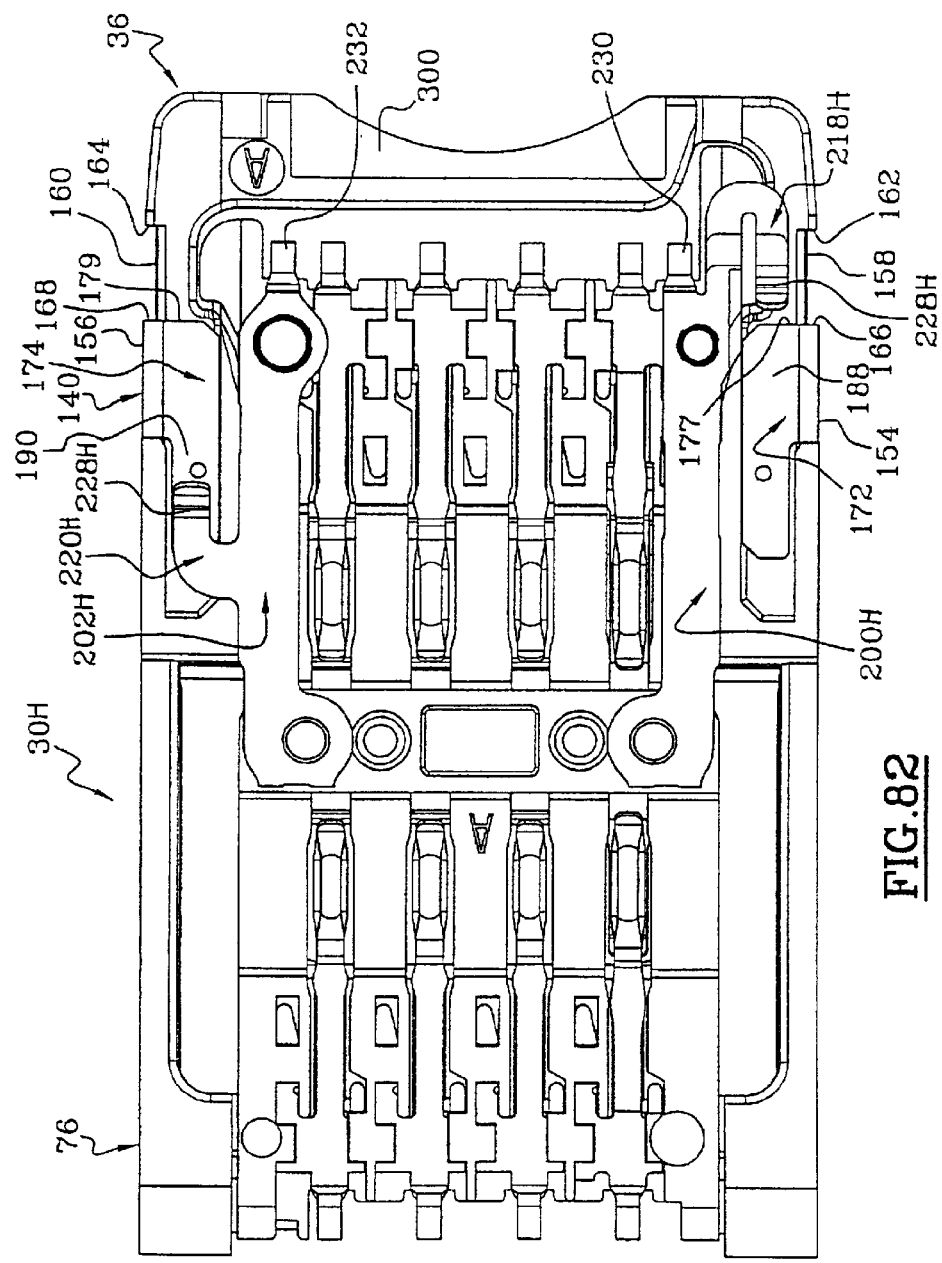
FIG. 82 is a bottom plan view of the connector of FIG. 81, with the locking member still in an unlocked position.
Figure 83:
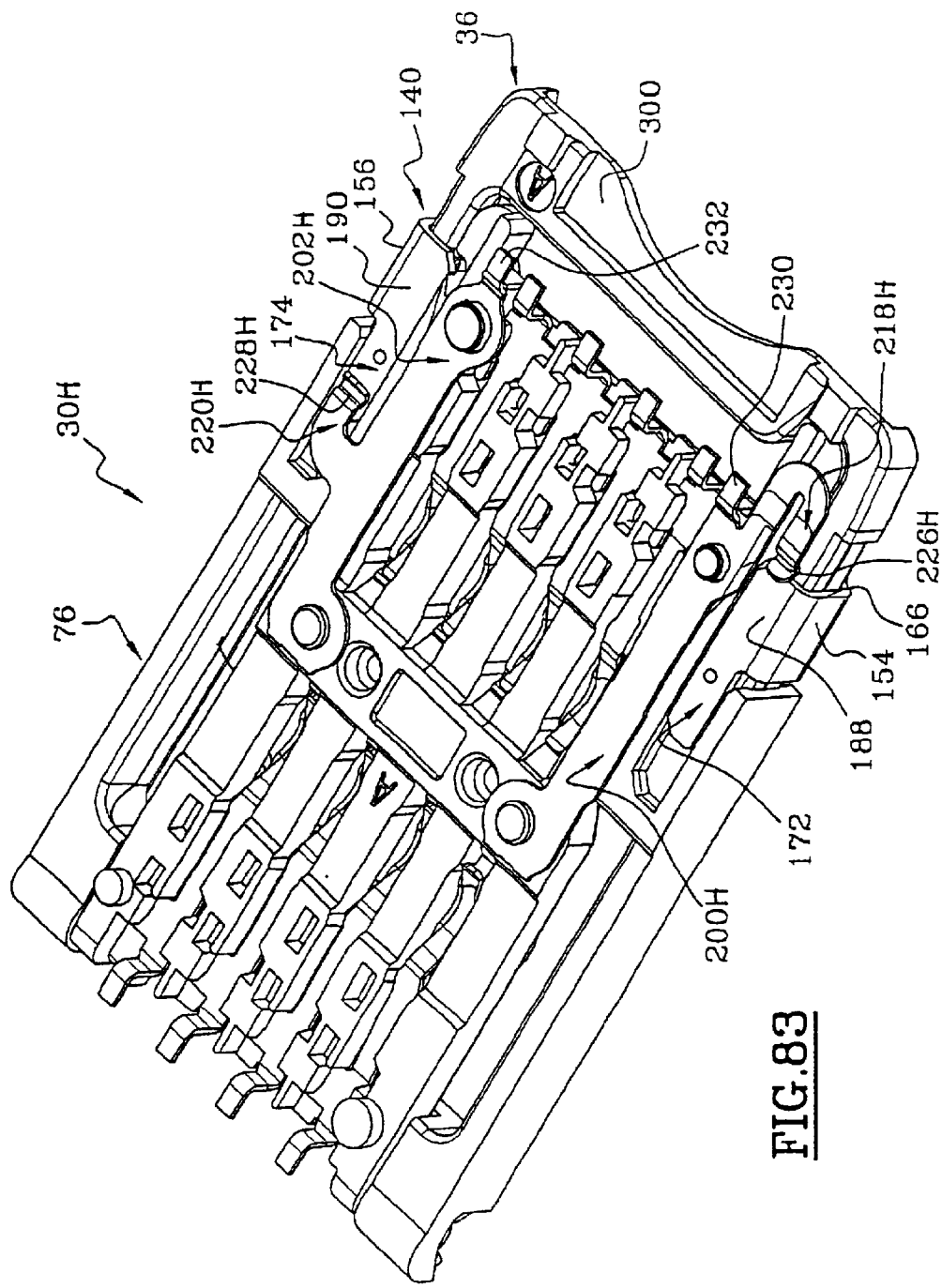
FIG. 83 is a view similar to FIG. 81, but with the locking member located slightly away from its unlocked position toward its locked position.

In FIG. 82, the cover 76 has just been closed. The blade 202, 220, 228 is in electrical contact with the lower face 190 of the tab 174, but the blade 200 is not in contact with the lock since the contact boss 226 is offset forwards with respect to the front transverse edge 177 of the tab 172.

It should therefore be noted that the electrical circuit is open and that, advantageously, there is no electrical consumption because of the lock switch.

Closing the lock 140, for the purpose of locking the cover 76, corresponds to moving it from the left to the right in FIG. 82.

Figure 84:
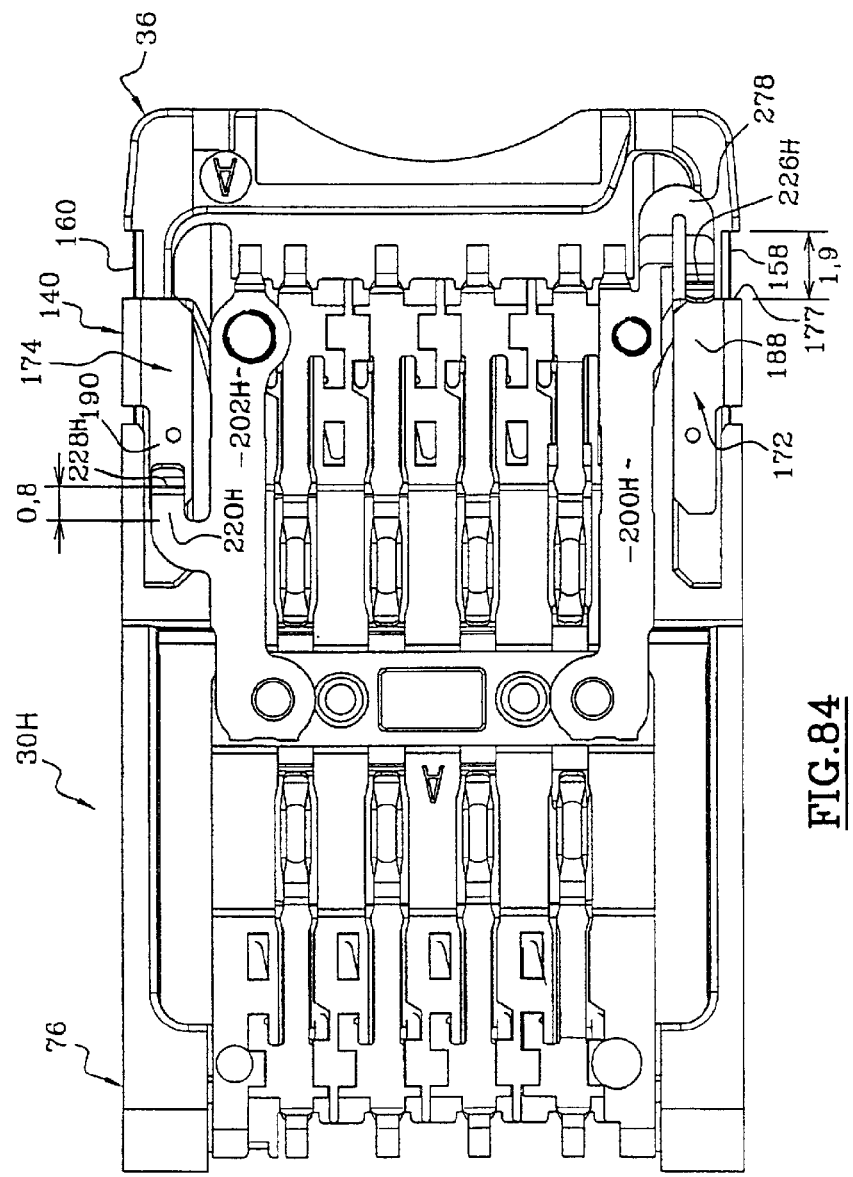
FIG. 84 is a plan view of the connector of FIG. 83.
Figure 85:
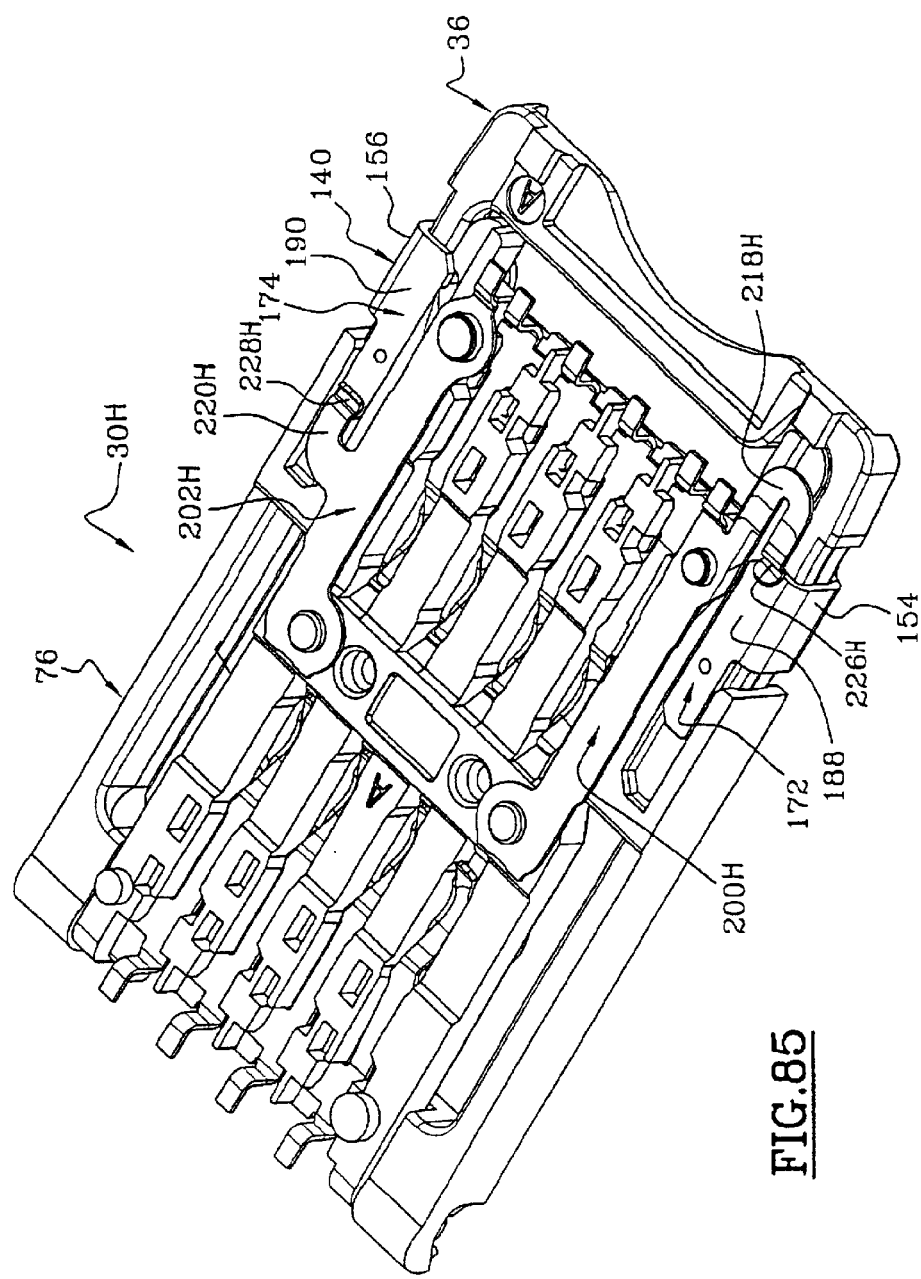
FIG. 85 is an isometric view similar to FIG. 83, but with the locking member moved closer to its locked position.

During this locking travel, the lock reaches the position illustrated in FIG. 84 in which the blade 202, 226 is still in contact with the tab 174, 190 of the lock, but in which the front transverse edge 177 of the tab 172 of the lock 140 is not yet in contact with the contact boss 226 of the blade 200. The lock is then at the limit of the start of locking and there remains here, for example, a locking travel of 1.9 mm, while there remains a travel of 0.8 mm before the electrical contact is broken between the boss 228 and the contact tab 174, 190. The electrical circuit is therefore still open.

Figure 86:
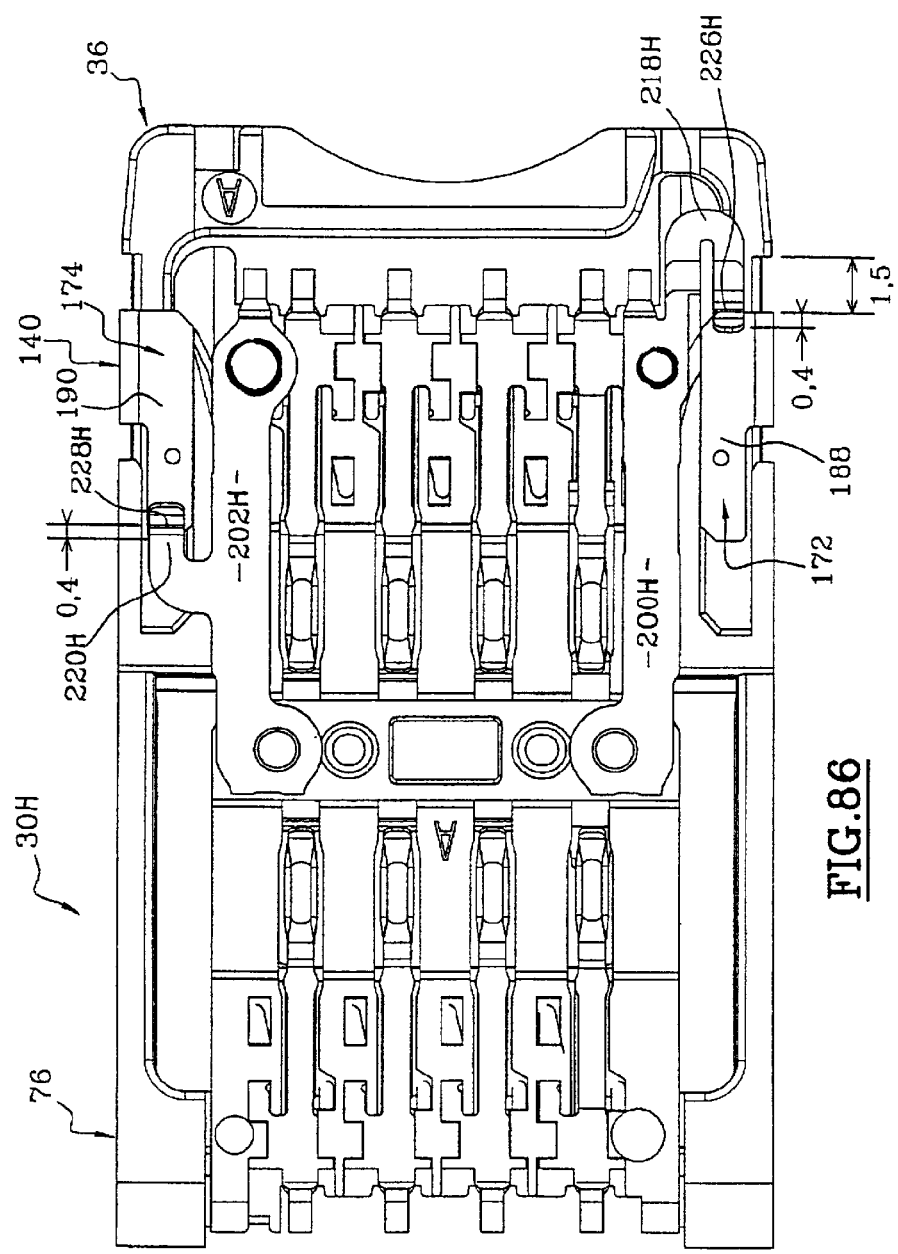
FIG. 86 is a plan view of the connector of FIG. 85.
Figure 87:
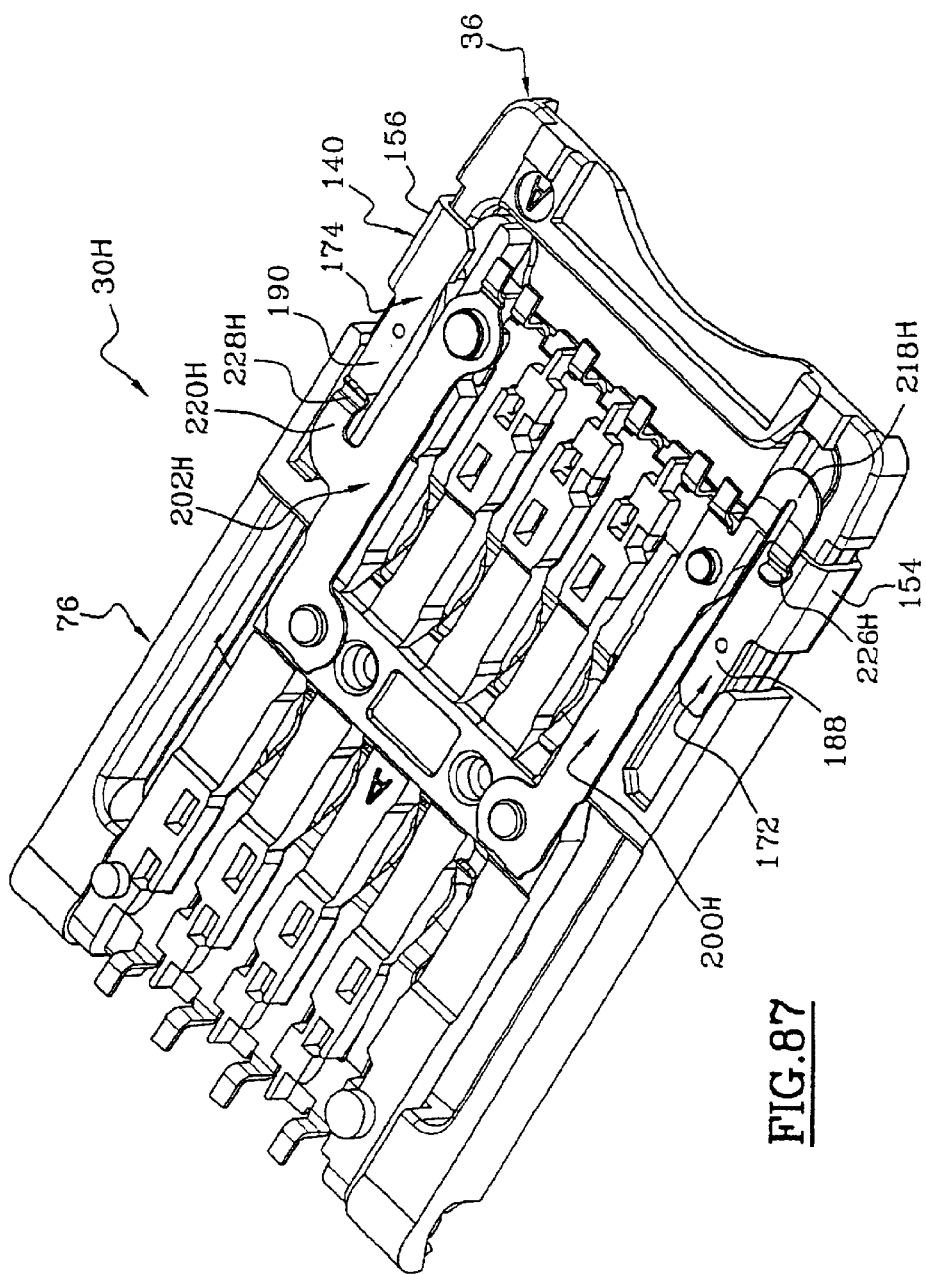
FIG. 87 is a bottom isometric view similar to that of FIG. 85, but with the locking member moved closer to its locked position.

Next, the position illustrated in FIG. 86 is reached, in which the contact blade 202, 228 is still in contact with the contact tab 174 of the lock 140, and in which the tab 172 is in contact with the blade 202 via the contact boss 226 which is in electrical contact with the lower face 188 of the tab 172.

The locking of the cover is effective from a travel of 0.4 mm, there remains a locking travel of 1.5 mm and there remains a travel of 0.4 mm before the electrical contact is broken between the boss 228 of the blade 202 and the contact tab 174, 190. Thereafter, the electrical circuit is therefore closed.

Figure 88:
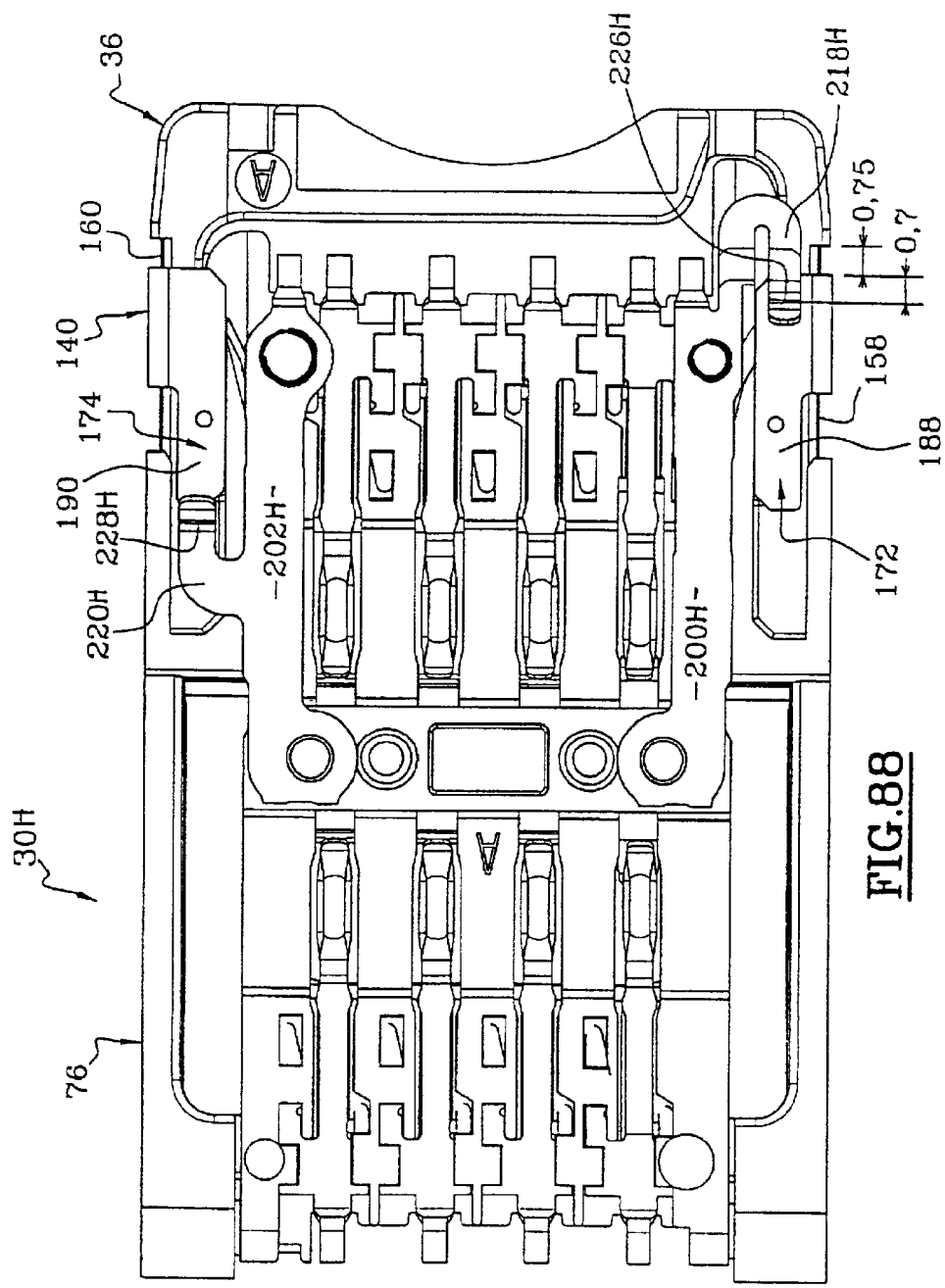
FIG. 88 is a plan view of the connector of FIG. 87.
Figure 89:
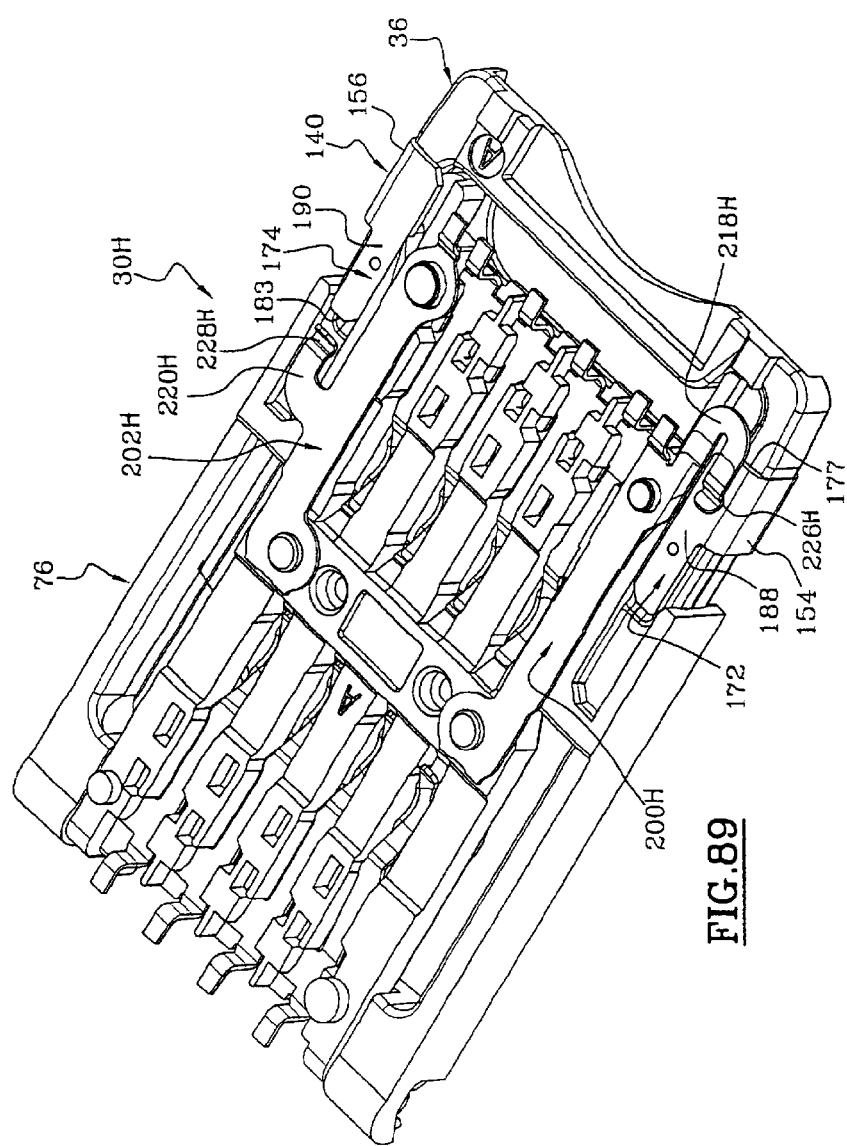
FIG. 89 is a bottom isometric view of the connector of FIG. 87, but with the locking member in its fully locked position.

Next, the position illustrated in FIG. 88 is reached, in which the electrical contact between the blade 202, 228 and the tab 174, 190, 183 of the lock 140 has just been broken, whereas the tab 172 is still in electrical contact with the blade 200, 226. There then remains 0.75 mm of forward travel of the lock before it reaches its fully locked position illustrated in FIG. 90.

As soon as the position in FIG. 88 is reached, the electrical circuit is again open and the electrical consumption of the lock switch circuit is again zero.

Figure 90:
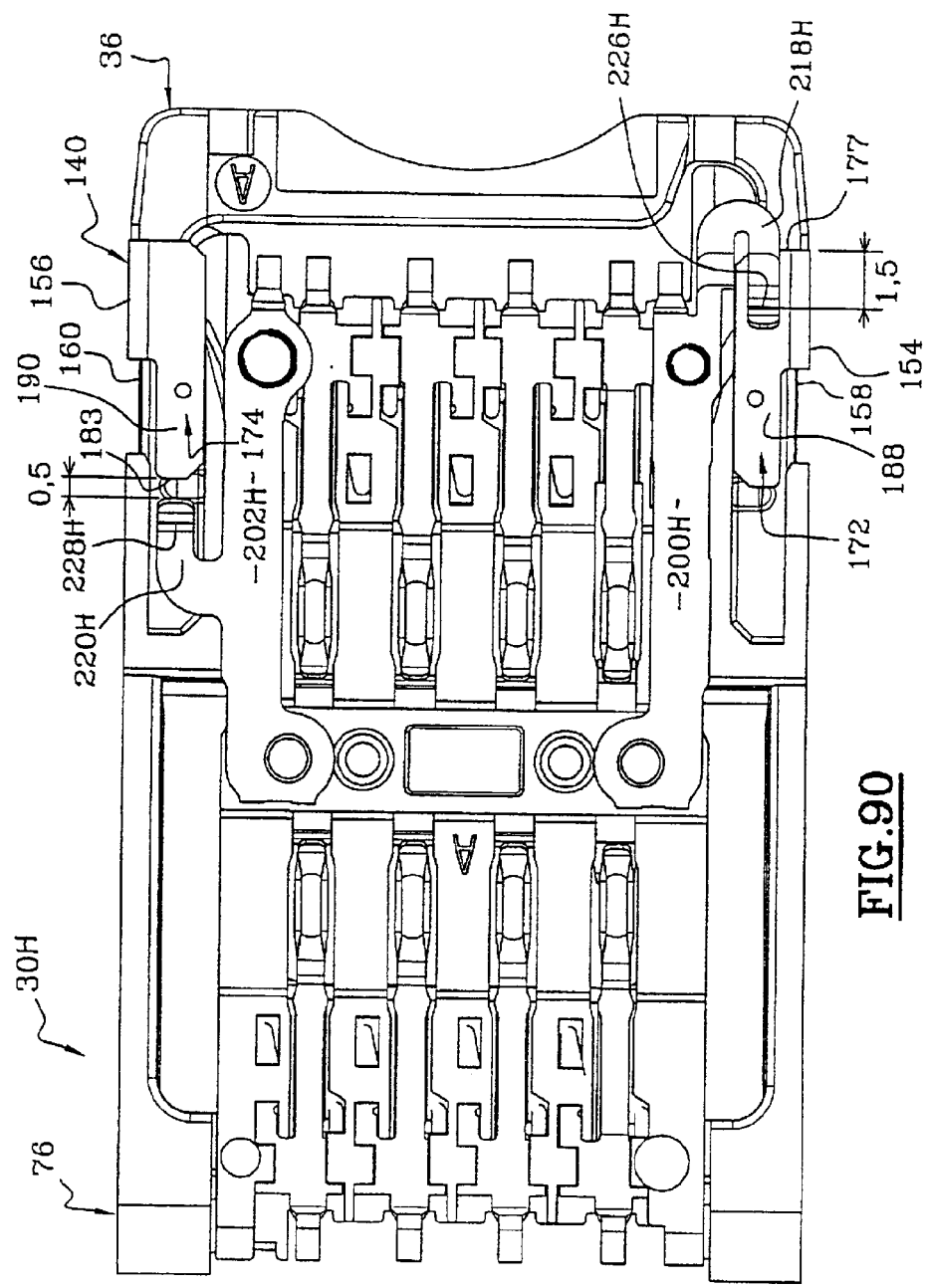
FIG. 90 is a bottom plan view of the connector of FIG. 89.

Of course, the electrical circuit remains open in the locked position in FIG. 90, in which there is also a contact safety margin of 0.5 mm in the unlocking direction.

The open-closed-open sequence has thus been carried out during the locking of the lock 140, that is to say, from the standpoint of the processing circuit which receives information coming from the lock switch 200-202-140, this switch behaves as one producing an electrical pulse during the locking operation, or during the unlocking operation in so far as the reverse, unlocking sequence is analogous.

The software for the electronic apparatus equipped with the connector makes it possible to detect the direction of movement of the lock (locking or unlocking) for example by storing in memory the previous position.

In the closed and locked position, just like in the unlocked position, there is no electrical consumption because of the presence of the lock switch 200-202-140.

If, over time, the performance of the switch were to deteriorate, the operation of the electronic appliance would not be affected until the first unlocking operation after the failure. The appliance could then no longer be restored to operation, except if the effect of the contacts being self-cleaned during the manipulation in the two directions of the lock were to allow correct operation of the lock switch 200-202-140 again.

On the other hand, the safety function inherent in the switch is not provided during the first unlocking operation after the failure.

The embodiment illustrated in FIG. 91 et seq. will now be described, this embodiment making it possible to know, at any time, the position of the lock and the direction of its movement (locking or unlocking movement) and providing the user with a number of lock switches which he may combine as he so chooses, depending on the applications and requirements for the operation of the appliance.

According to this fifth embodiment, a third lock switch contact blade 400 is provided, whereas the first and second blades 200 and 202 are similar to those described and shown previously in the case of the fourth embodiment.

The switch blade is only slightly modified as regards its attachment and its electrical connection, in order to allow the third lock switch blade 400 to be fitted, which in this case is a so-called "common" blade which is always in electrical contact with the lower face 190 of the tab 174 of the lock, its output or connection tab 406 thus forming a point common to the various lock switches.

The common contact blade 400 has, for this purpose, a contact tab 402 bent through 90°, with a contact boss 404 which is always in contact with the tab 174, 190, that is to say whatever the longitudinal position of the lock with respect to the base 36 and therefore with respect to the common blade 400, 404.

Thus, in the unlocked position of the lock 140 corresponding to FIG. 82, the switch formed by the blades 202 and 400 closes the electrical circuit between the outputs 232 and 406, this circuit opening when the lock reaches and then goes beyond the position in FIG. 88. It is thus a switch of the NC type.

This switch 202-400 also makes it possible to detect that the cover 36 is closed.

If the switch formed by the combination of blades 200 and 400 is used in the unlocked position of the lock 140, corresponding to FIG. 82, the switch formed by the blades 200 and 400 "opens" the electrical circuit between the outputs 230 and 406, which closes when the lock reaches and then goes beyond the position in FIG. 86. It is thus a switch of the NO type.

If the switch formed by the blades 200 and 202 is used, this is again the pulse-type switch corresponding to the fourth embodiment and allowing an open-closed-open sequence to be produced.

If the third blade 400 is also used, it is then possible to discriminate between the directions of movement of the lock, while still providing a delay in combination with the NO-type switch (200-400) so as no longer to consume current during operation, knowing that the function with the NC-type switch (202-400), without the associated delay, allows the direction of movement to be detected.

The invention is not limited to the embodiments and variants which have just been described or mentioned.

For example, it is possible for the moving locking member to be made of plastic with a layer of metallization on its functional surfaces contributing to the lock switch function.

Nor is the invention limited to the cases in which the lock is a locking bar mounted so as to pivot longitudinally on the cover.

The principle according to the invention of detecting the locked position of the cover-locking member, whether or not in combination with detection of the end of closure travel of the cover, can be applied to other known designs of means for locking the cover or cap in the closed position.

What is claimed is:

1. A smart card connector which includes a base with opposite sides, the base having an insulative base frame with an upper surface, and the base having a plurality of contacts mounted on the base frame and having pad-engaging contact parts projecting above the base frame upper surface, the connector having a cover which holds a smart card that has a lower face with contact pads, the cover having opposite sides and being pivotally connected to the base to pivot from an open portion wherein the card is spaced from the base to a closed position wherein the card contact pads move against said pad-engaging parts of said contacts, wherein:

the cover has a cover frame with opposite sides, and the cover has an electrically conductive locking member with side portions at said cover frame opposite sides, said locking member being slideable on the frame between locked and unlocked positions;

the base frame has largely downwardly-facing base shoulders at opposite sides of the base, and the side portions of the locking member have lock parts that slide to a position under the base shoulders when the locking member moves to said locked position; and including a pair of resilient switch blades located at opposite sides of the base and positioned to engage the side portions of the locking member when the cover is pivoted to its closed position and the locking member is slid between said unlocked and locked positions.

2. The smart card connector described in claim 1 wherein:

said base and cover each have front and rear ends, and said pivotal connection of said cover to said base lies at the rear ends of both of them;

said cover frame has a top wall that lies over a portion of a card that lies in the cover but not over another portion of the card and said locking member comprises a piece of sheet metal that has a plate-like portion that lies over a portion of the card that is not covered by the cover frame.

3. The smart card connector described in claim 1 wherein:

said switch blades have tabs that are positioned to be vertically deflected by said side portions of said locking member.

4. The smart card connector described in claim 1 wherein:

said switch blades have tabs that are positioned to be horizontally deflected by said side portions of said locking member.

5. A smart card connector which includes a base with opposite sides that is mounted on a circuit board, the base having an insulative base frame with an upper surface, and the base having a plurality of contacts mounted on the base frame and having pad-engaging contact parts projecting above the base frame upper surface, the connector having a cover which holds a smart card that has a lower face with contact pads, the cover having opposite sides and being pivotally connected to the base to pivot from an open portion wherein the card is spaced from the base to a closed position wherein the card contact pads move against said pad-engaging parts of said contacts, wherein:

the cover has a cover frame with opposite sides, and the cover has a locking member with side portions at said cover frame opposite sides, said locking member being slideable on the frame between locked and unlocked positions;

the base frame has largely downwardly-facing base shoulders at opposite sides of the base frame, and the side portions of the locking member have lock parts that slide to a position under the base shoulders when the locking member moves to said locked position;

said circuit board has a plurality of conductive switching traces and said cover has a plurality of resilient tabs that slide over and against said switching traces with at least one of said tabs making and breaking engagement with one of said switching tabs as said locking member move between said locked and unlocked positions.

6. The connector and circuit board described in claim 5 wherein:
said locking member is formed of electrically conductive material, said plurality of switching traces include first and second switch traces that lie at said opposite sides of said base, and each of said locking member side portions includes a tab that is biased against said circuit board to engage one of said traces in at least one position of said locking member.

7. A smart card connector that includes a base with contacts and a cover that holds a smart card, the base having opposite sides with largely downwardly facing base shoulders and the cover having a locking member that can be moved from an unlocked to a locked position wherein opposite side portions of the locking member move under the base shoulders, the improvement comprising:
conductive switching elements located at opposite sides of the base;
said side portions of said locking members are each positioned to engage one of said switching elements in at least one of said positions of said locking member.

8. The connector described in claim 7 wherein:
at least one of said switching elements is a sheet metal member that is mounted on said base and that has a tab that is resiliently deflected and thereby firmly engaged with one of said locking member side portions in at least one of said locking member positions.

9. The connector described in claim 7 including a circuit board, said base being mounted on said circuit board, wherein:
at least one of said switching elements is a conductive trace on said circuit board.

10. A smart card connector that has a base with front and rear portions and laterally-spaced opposite sides, the base having a base frame and a plurality of contacts mounted on the base frame, and the connector has a cover with a rear portion pivotally connected to the base about a laterally-extending axis to allow the cover to pivot between closed and open positions, the cover having a cover frame with laterally opposite sides and the cover having a card-holding region for holding a smart card, wherein:
said base has a pair of largely downwardly-facing base shoulders at laterally opposite sides of the base;
said cover has a locking member with laterally opposite side portions that form lock parts, said locking member being moveable on the cover frame between locked and unlocked positions to move each of said side portions along a path, wherein when the cover is closed and said locking member is in said locked position said lock parts of said locking member lie under said base shoulders to lock the cover closed, and in said unlocked position said lock parts of said locking member do not lie under said shoulders;
said locking member is formed of electrically conductive material; and including
a pair of switch blades at opposite sides of said base, each switch blade each having an active part that is positioned to be deflected by one of said side portions as the lock parts slide under the base shoulders.

11. The smart card connector described in claim 10 wherein:
said switch blade active parts each lies adjacent to the path of one of said locking member side portions and is positioned to be vertically deflected by the corresponding side portion.

12. The smart card connector described in claim 10 wherein:
said switch blade active parts each lies beside the path of one of said locking member side portions to be laterally deflected by the corresponding side portion.

13. The smart card connector described in claim 10 wherein:
each of said switch blades has a switch blade tab lying under the base shoulder, so each lock part moves between a base shoulder and a switch blade tab when the locking member moves to the locked position.

14. The smart card connector described in claim 13 including:
a circuit board with upper and lower board faces, said base being mounted on said circuit board upper face;
said switch blade tabs lie above said board upper face at least when said locking member is in said unlocked position, so said switch blade tabs can be downwardly deflected as said locking member moves to said locked position.

15. The smart card connector described in claim 10 wherein:
said locking member is slideable in forward and rearward directions;
each of said switch blades is elongated and has a rear part fixed to the base rear portion, a middle part, and a front part, the middle parts of the switch blades being spaced laterally inward of the corresponding locking member side portions to avoid contact therewith, and the front parts of the switch blades extend laterally outward of said middle parts to engage said side portions when the side portions slide forward.

16. A smart card connector that has a base with front and rear portions and laterally-spaced opposite sides, the base having a base frame and a plurality of contacts mounted on the base frame, and the connector has a cover with a rear portion pivotally connected to the base about a laterally-extending axis to allow the cover to pivot between closed and open positions, the cover having a cover frame with laterally opposite sides and the cover having a card-holding region for holding a smart card, wherein:
said base has a pair of largely downwardly-facing base shoulders at laterally opposite sides of the base;
said cover has a locking member with laterally opposite side portions that form lock parts, said locking member being moveable on the cover frame between locked and unlocked positions to move each of said side portions along a path, wherein when the cover is closed and said locking member is in said locked position said lock parts of said locking member lie under said base shoulders to lock the cover closed, and in said unlocked position said lock parts of said locking member do not lie under said shoulders; and including
switch means lying in the path of at least one of said side portions of said locking member, for detecting the position of the locking member;
a circuit board, said switch means includes a plurality of conductive switching traces on said circuit board including at least a first switching trace lying at at least a first of said base sides;
a first of said locking member side portions has a resilient tab that engages and disengages one of said switching traces as said locking member moves between said locked and unlocked positions.

17. The smart card connector described in claim 16 wherein:

said circuit board has a second switching trace at said first base side;

said first and second switching traces are positioned one forward of the other so first side portion breaks engagement with said first switching trace and engages said second switching trace as the locking member moves between said locked and unlocked positions.

18. A smart card connector that has a base with front and rear portions and laterally-spaced opposite sides, the base having a base frame and a plurality of contacts mounted on the base frame, and the connector has a cover with a rear portion pivotally connected to the base about a laterally-extending axis to allow the cover to pivot between closed and open positions, the cover having a cover frame with laterally opposite sides and the cover having a card-holding region for holding a smart card, wherein:

said base has a pair of largely downwardly-facing base shoulders at laterally opposite sides of the base;

said cover has a locking member with laterally opposite side portions that form lock parts, said locking member being moveable on the cover frame between locked and unlocked positions to move each of said side portions along a path, wherein when the cover is closed and said locking member is in said locked position said lock parts of said locking member lie under said base shoulders to lock the cover closed, and in said unlocked position said lock parts of said locking member do not lie under said shoulders; and including switch means lying in the path of at least one of said side portions of said locking member, for detecting the position of the locking member;

a circuit board, said switch means includes first and second switching traces at opposite sides of said base;

said locking member side portions each has a resilient tab for engaging said switching traces, with at least one of said resilient tabs engaging and disengaging a corresponding one of said switching traces as said locking member moves between said locked and unlocked positions.

\* \* \* \* \*